United States Patent [19]
Wada et al.

[11] Patent Number: 5,313,445
[45] Date of Patent: May 17, 1994

[54] REPRODUCING APPARATUS WITH SUSPENSION SUPPORTING A FLOATING-TYPE HEAD WITH A BEVELLED SLIDER

[75] Inventors: Katsuo Wada, Yao; Miyuki Onishi, Higashiosaka; Junichiro Nakayama, Shiki; Tomoyuki Miyake; Takashi Iwaki, both of Nara; Takeshi Yamaguchi, Sakai, all of Japan

[73] Assignee: Sharp Kabushiki Kaisha, Osaka, Japan

[21] Appl. No.: 840,905

[22] Filed: Feb. 25, 1992

[30] Foreign Application Priority Data

| Mar. 1, 1991 | [JP] | Japan | 3-036336 |
| Mar. 5, 1991 | [JP] | Japan | 3-038714 |
| Mar. 13, 1991 | [JP] | Japan | 3-048386 |
| May 23, 1991 | [JP] | Japan | 3-118855 |
| May 31, 1991 | [JP] | Japan | 3-129727 |
| May 31, 1991 | [JP] | Japan | 3-129731 |
| May 31, 1991 | [JP] | Japan | 3-129741 |

[51] Int. Cl.$^5$ .................................. G11B 7/12
[52] U.S. Cl. ............................. 369/53; 360/75; 360/99.03; 360/103; 360/105; 360/114; 369/54; 369/215; 369/244
[58] Field of Search ............ 360/75, 99.03, 99.06, 360/99.07, 103, 105, 114; 369/13, 53–54, 215–216, 244–246

[56] References Cited

U.S. PATENT DOCUMENTS

| 3,678,482 | 7/1972 | Billawais . | |
| 5,077,713 | 12/1991 | Takizawa et al. | 360/114 X |
| 5,107,471 | 4/1992 | Miyake | 369/13 |
| 5,124,961 | 6/1992 | Yamaguchi et al. | 360/114 X |

FOREIGN PATENT DOCUMENTS

| 0072389 | 2/1983 | European Pat. Off. . |
| 3125355 | 5/1991 | Japan . |
| WO85/02483 | 6/1985 | PCT Int'l Appl. . |

OTHER PUBLICATIONS

"Experiment of Landing on–off Flying Head Slider" (a digest C–27 of the Spring–time National Convention of the Institute of Electronics, Information and Communication Engineers of Japan, 1989).

"Flying Head Slider for Landing on–off" (a digest C–474 of the Institute of Electronics, Information and Communication Engineers of Japan, 1990).

*Primary Examiner*—W. R. Young
*Attorney, Agent, or Firm*—David G. Conlin; Robert F. O'Connell

[57] ABSTRACT

An information reproducing apparatus which has a rotating driver for rotating a disc-shaped recording medium, a floating-type head for reproducing information recorded in the recording medium while floating above the disc-shaped recording medium that is being rotated by the rotating driver, and a suspension, made of an elastic member, for supporting the floating-type head. The information reproducing apparatus is characterized in that the floating-type head has a slider which is floated by an air flow that is directed near the surface of the rotating disc-shaped recording medium, and that the slider has a bevelled portion at one side that faces the outer edge of the disc-shaped recording medium such that any contact between the slider and the ridge that exists along the outer edge area of the disc-shaped recording medium is virtually eliminated. Since the slider is virtually free from contacting the ridge that exists along the outer edge area of the disc-shaped recording medium, the storage capacity of the disc-shaped recording medium can be more effectively used.

16 Claims, 46 Drawing Sheets

DISK CENTER DIRECTION

FIG. 38

| PERIOD | CARTRIDGE ATTACHING PERIOD | | | MOTOR ACCELERATING PERIOD | | HEAD MOVING PERIOD | | MAGNETIC HEAD LOWERING PERIOD | MAGNETIC FLOATING PERIOD (RELEASE OF LOCK) | (OPERATING) |
|---|---|---|---|---|---|---|---|---|---|---|
| TIME | $t_0$ | $t_1$ | $t_2$ | $t_3$ | $t_4$ $t_5$ | $t_6$ $t_7$ | $t_8$ $t_9$ | | $t_{10}$ | $t_{11}$ |
| DISK CARTRIDGE | INSERTED | DRAWN | | LOWERED ONTO SPINDLE MOTOR | PLACED ON MOTOR | | | | | |
| SHUTTER | OPENING | | HALF-OPEN | | FULL-OPEN | | | | | |
| SPINDLE MOTOR | STOP | | | | ACCELERATING ROTATION | NORMAL ROTATION (3600 rpm) | | | | |
| MOVABLE INTEGRAL HEAD | LOCKED AT STAND-BY POSITION | | | | | MOVING TO (R40) | STOPPED /LOCKED AT R40 | | RELEASE OF LOCK | OPERATING MOVABLE (FROM R40 – R21) |
| FLOATING-TYPE MAGNETIC HEAD | HELD IN LIFTED-UP STATE | | | | | | LOWERED TOWARD DISK | | FLOATING | |
| CORRESPONDING FIGURE | FIG. 40 | | | | FIG. 41 | | FIG. 42 | | FIGS. 43 AND 44 | |

FIG. 39

| PERIOD | MAGNETIC HEAD FLOATING PERIOD (OPERATING) (HEAD LOCKED) | | MAGNETIC HEAD RAISING PERIOD | HEAD RETRACTING PERIOD | MOTOR STOPPING PERIOD | | CARTRIDGE EJECTING PERIOD | | | |
|---|---|---|---|---|---|---|---|---|---|---|
| TIME | $t_0'$ | $t_1'$ | $t_2'$ | $t_3'$ | $t_4'\ t_5'$ | $t_6'\ t_7'$ | $t_8'$ | $t_9'$ | $t_{10}'$ |
| DISK CARTRIDGE | PLACED ON MOTOR | | | | | | DETACHED FROM MOTOR | RETRACT-ING | | EJECT |
| SHUTTER | FULL-OPEN | | | | | | | | HALF CLOS-ING | OPEN-ING |
| SPINDLE MOTOR | NORMAL ROTATION (3600 rpm) | | | | DECELERATING | STOP | | | | |
| MOVABLE INTEGRAL HEAD | OPERATING MOVABLE (R40 ~ R21) | RETURNING TO LOADING POSITION (R40) | STOPPED/ LOCKED AT R40 | RETRACTING TO (R55) | | LOCKED AT STAND-BY POSITION (R55) | | | | |
| FLOATING-TYPE MAGNETIC HEAD | FLOATING | | RAISED FROM DISK | HELD IN LIFTED-UP STATE | | | | | | |
| CORRESPONDING FIGURE | FIGS. 43 AND 44 | | FIG. 42 | FIG. 41 | | | FIG. 40 | | | |

FIG. 40
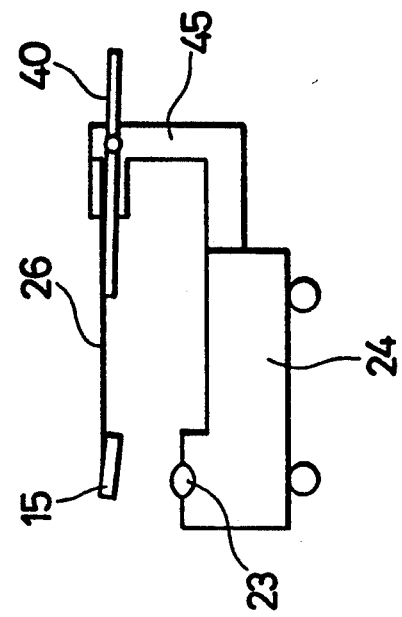
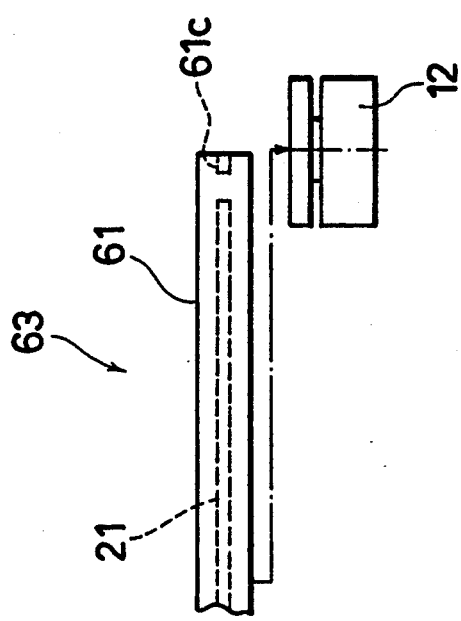

FIG. 56
FIG. 57
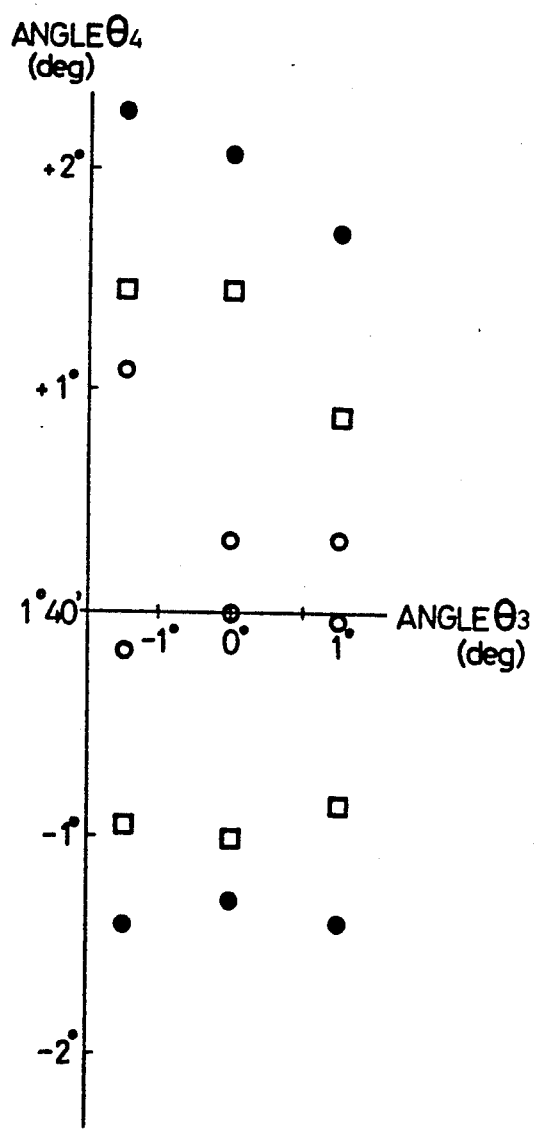
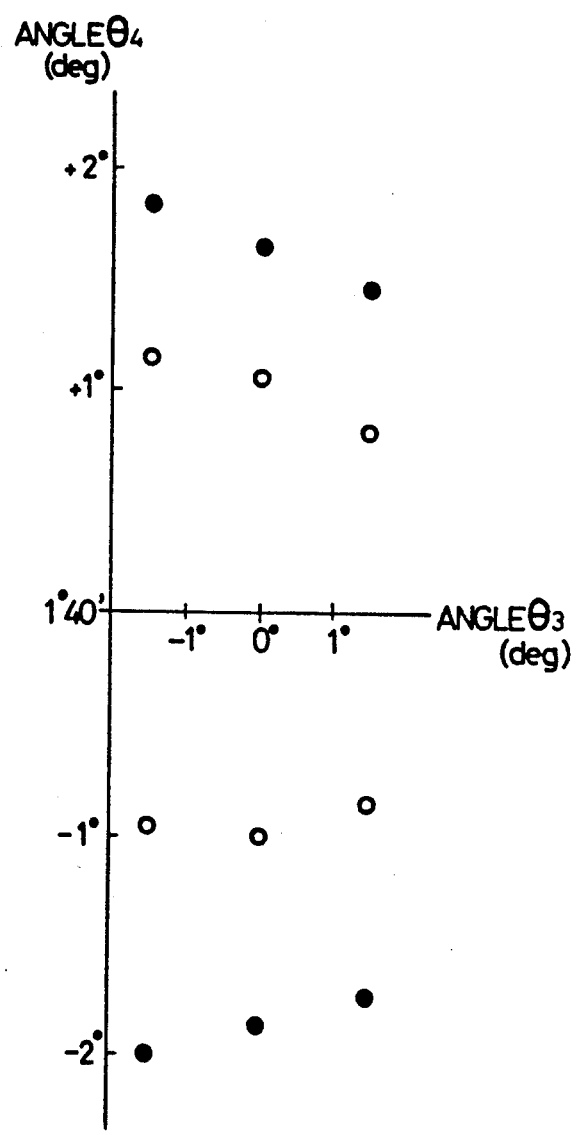

FIG. 58
FIG. 59
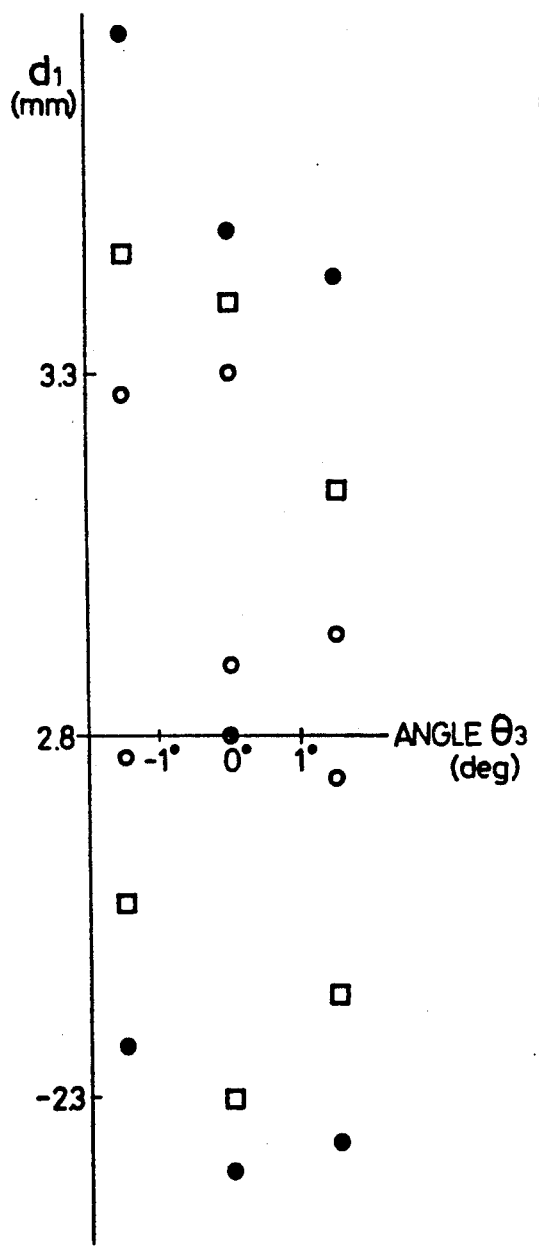
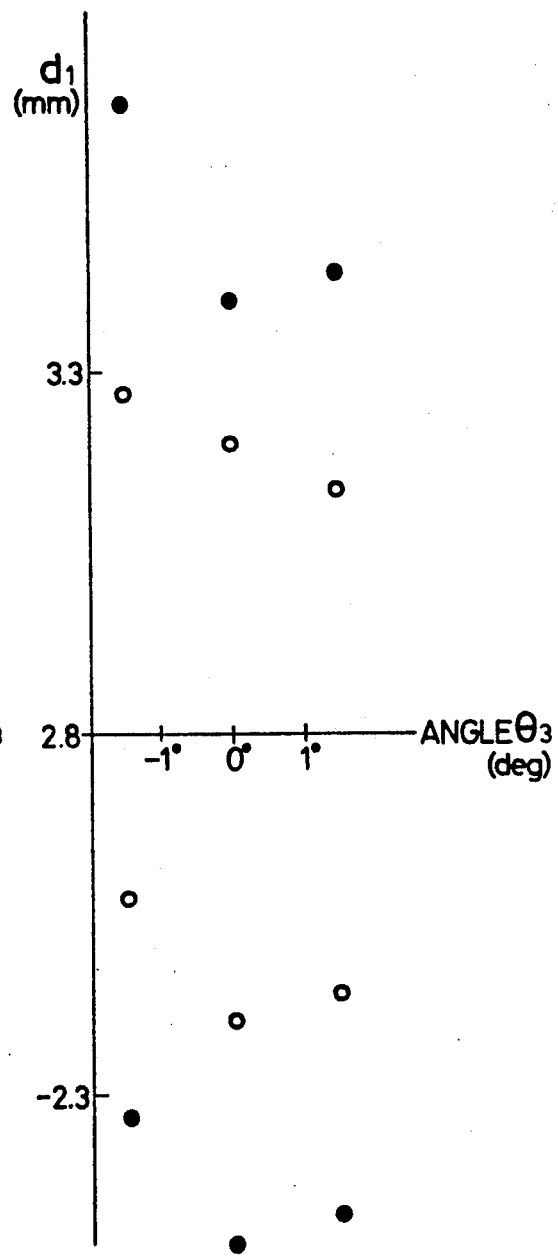

REPRODUCING APPARATUS WITH SUSPENSION SUPPORTING A FLOATING-TYPE HEAD WITH A BEVELLED SLIDER

FIELD OF THE INVENTION

The present invention relates to an information reproducing apparatus that is provided with a floating-type head, i.e., a floating-type magnetic head or a floating-type optical head, and more specifically to the shape of the slider of the floating-type head and the raising and lowering operations thereof.

BACKGROUND OF THE INVENTION

Recently, magneto-optical disks have been developed for use as optical memory elements that can record, reproduce, and erase information. The magneto-optical disk is constituted of a vertically magnetized film and a protective layer, formed on a substrate. Information recording on the magneto-optical disk is executed as follows: A light beam is projected onto the vertically magnetized film, causing a temperature rise at the illuminated area, and thus the magnetic coercive force of the area is lowered. In this state, an external magnetic field is applied onto the vertically magnetized film in such a manner that the direction of magnetization at the area where the coercive force lowered is inverted and aligned in the same direction as the external magnetic field, thereby permitting information to be recorded.

Recording methods in the magneto-optical disks are roughly classified into two methods: the light modulation method wherein recording is executed by modulating the intensity of a light beam in accordance with information to be recorded while simultaneously applying an external magnetic field in a constant direction; and the magnetic field modulation method, wherein recording is executed by inverting the direction of the external magnetic field in accordance with information to be recorded while applying a light beam of a constant intensity.

Here, the magnetic field modulation method is considered to be the most prospective as a method for achieving the so-called overwriting technique, wherein rewriting process allows new information to be written directly onto the previous information without the necessity of any erasing process. In adopting this overwriting technique, it is necessary to lower the inductance of the magnetic head with a view to increasing the switching speed of the external magnetic field direction and thereby enhancing the transfer rate. However, simultaneously, as the inductance of the magnetic head is lowered, the intensity of the magnetic field is also lowered and this necessitates that the magnetic head be disposed as close as possible to the magneto-optical disk.

When a resin such as polycarbonate is used as a substrate of the magneto-optical disk, considerable unevenness on the surface of the substrate can appear; that is, there exist protrusions and recessions in the circumferential direction. Because of this unevenness, if the magnetic head is located too close to the magneto-optical disk, the magnetic head might come into contact with the magneto-optical disk, causing damage to the magnetic head or the magneto-optical disk. Therefore, a certain amount of gap should be provided between the magnetic head and the magneto-optical disk, and this presents a problem in that it is difficult to obtain sufficient intensity of the magnetic field. Further, since the distance between the magnetic head and the vertically magnetized film is varied due to the unevenness, the intensity of the magnetic field tends to vary.

For this reason, as shown in FIGS. 48 and 49, a magneto-optical recording-reproduction apparatus, wherein a floating-type magnetic head 1 is adopted, has been proposed.

A floating-type magnetic head 1 is constituted by a magnetic head 8 (shown by hatching in FIG. 49) and a slider 7 which is provided with a magnetic head 8 and designed to glide above the magneto-optical disk 3.

The slider 7 is secured to the tip of a suspension 6 that is composed of plate springs, and is pressed toward the magneto-optical disk 3 by the suspension 6. The base of the suspension 6 is secured to a fixing member 5. The slider 7 is disposed so as to face the top surface of the magneto-optical disk 3, which is rotated by the spindle motor 2, and in this position, the magnetic head 8 is located to face an optical head 4, which is disposed below the bottom surface of the magneto-optical disk 3.

Seen from above, the slider 7 has a rectangular shape, and the magnetic head 8 is fixed to the rear end thereof. The size of the slider 7 is, for example, 5 mm long in the radial direction of the magneto-optical disk 3, and 7 mm long in the circumferential direction.

When the magneto-optical disk 3 rotates, an air flow is produced between the surface of the magneto-optical disk 3 and the floating-type magnetic head 1. Thus, the floating-type magnetic head 1 floats up to a height at which an upward floating force, caused by the air flow, and a downward pressing force, created by the suspension 6, balance with each other. With this arrangement, the gap between the floating-type magnetic head 1 and the magneto-optical disk 3 is kept virtually constant; therefore, the intensity of the magnetic field applied from the magnetic head 1 is not affected by the unevenness of the magneto-optical disk 3. Thus, stable recording operation can be performed on the magneto-optical disk 3.

However, in the case where the so-called CSS(Constant Start and Stop) method is adopted, wherein the floating-type magnetic head 1 comes into contact with the magneto-optical disk 3 upon floating or landing, problems are encountered in that the magneto-optical disk 3 and floating-type magnetic head 1 might be worn away or damaged due to repetitive CCS operations and, furthermore, the floating-type magnetic head 1 may stick to the magneto-optical disk 3, with the result that the spindle motor 2 is unable to rotate the magneto-optical disk 3.

These problems become more serious if the floating-type magnetic head 1 is used in a magneto-optical disk cartridge that is manufactured according to the ISO standard, a standard which is to be defined without anticipating the use of the floating-type magnetic head 1.

Furthermore, as shown in FIGS. 50 and 51, in the case where a ridge 3a exists near the outer edge of the magneto-optical disk 3, the movement of the floating-type magnetic head 1 is limited since it cannot pass the ridge 3a to the outer edge of the magneto-optical disk 3; thus, a problem is encountered whereby the storage capacity of the magneto-optical disk 3 is virtually reduced.

The ridge 3a occurs when a protective layer is formed through the spin-coat method. For example, a plurality of substrates made up of polycarbonate, each having 3.5 inches in diameter, are initially produced. Then, protective layers are formed on the respective substrates through the spin-coat method, and surface dimensions near the outer edge of each substrate are measured. The following FIGS. 52 through 55 show the results of the measurements.

In the magneto-optical disk 3 of FIG. 52, a ridge starts from a radial position of 41.5 mm from the center, and a maximum height of the ridge 3a is 16 μm.

In the magneto-optical disk 3 of FIG. 53, a ridge starts from a radial position of 41.6 mm from the center, and a maximum height of the ridge 3a is 14 μm.

In the magneto-optical disk 3 of FIG. 54, a ridge starts from a radial position of 41.6 mm from the center, and a maximum height of the ridge 3a is 12 μm.

In the magneto-optical disk 3 of FIG. 55, a ridge starts from a radial position of 41.7 mm from the center, and a maximum height of the ridge 3a is 12 μm.

Since the floating-type magnetic head 1 floats with a small gap from the surface of the magneto-optical disk 3, the floating-type magnetic head 1 comes into contact with the ridge 3a when it is used with the above magneto-optical disk 3 and moved to a radial position in the proximity of 41 mm (see FIGS. 50 and 51).

Additionally, in order to solve the above-mentioned problem of sticking, attempts such as providing a special texture treatment on the surface of the magneto-optical disk 3 or applying a lubricant thereto have been made.

Moreover, it has been reported in a digest C-27 of the Spring-time National Convention of the Institute of Electronics, Information and Communication Engineers of Japan, "Experiment of Landing on-off Flying Head Slider", and in a digest C-474 of the same convention (1990), "Flying Head Slider for Landing on-off", that the front and rear portions of the slider bottom surface were spherically machined in order to permit the floating head to land on/off without contacting against the disk.

SUMMARY OF THE INVENTION

It is an object of the present invention to provide an information reproducing apparatus wherein the storage capacity of a disc-shaped recording medium can be more effectively used.

In order to achieve this objective, the information reproducing apparatus of the present invention, which includes a rotative driving means for rotating a disc-shaped recording medium, a floating-type head for reproducing information recorded in the recording medium while floating above the disc-shaped recording medium that is being rotated by the rotative driving means, and a suspension, made of an elastic member, for supporting the floating-type head, is characterized in that the floating-type head has a slider which is floated by an air flow that occurs near the surface of the rotating disc-shaped recording medium, and that the slider has a bevelled portion at one side that faces the outer edge of the disc-shaped recording medium in such a manner that any contact between the slider and the ridge that exists along the outer edge area of the disc-shaped recording medium is virtually eliminated.

With this arrangement, since the bevelled portion is provided at one side of the slider, facing the outer edge of the disc-shaped recording medium, the slider is virtually free from contacting the ridge that exists along the outer edge area of the disc-shaped recording medium. Therefore, the floating-type head is allowed to move further close to the outer edge of the disc-shaped recording medium, and thus the storage capacity of the disc-shaped recording medium is more effectively used.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a schematic elevation showing a magnetic disk device provided with a floating-type magnetic head.

FIG. 2 is a flow chart explaining a lowering operation of the floating-type magnetic head when it starts floating in the magnetic disk device of FIG. 1.

FIG. 3 is a flow chart explaining a raising operation of floating-type magnetic head during the stopping of the rotative movement of the magnetic disk in the magnetic disk device of FIG. 1.

FIG. 4 is a flow chart explaining a raising operation of the floating-type magnetic head in the case where the rotating speed of the magnetic disk is reduced to not more than a predetermined value due to a machine malfunction or the like when the floating-type magnetic head is in close proximity to the magnetic disk.

FIG. 5 is a schematic elevation showing the operation of a raising and lowering member of a magneto-optical disk device that is provided with a floating-type magnetic head.

FIG. 6 is a schematic side view explaining the behavior of the floating-type magnetic head during its raising and lowering operations in the magneto-optical disk device of FIG. 5.

FIG. 7 is a schematic front view explaining the behavior of the floating-type magnetic head during its raising and lowering operations in the magneto-optical disk device of FIG. 5.

FIG. 8 is a schematic elevation showing a magneto-optical disk device that is provided with a floating-type magnetic head.

FIG. 9 is a schematic plan view showing the floating-type magnetic head in the magneto-optical disk device of FIG. 8.

FIG. 10 is a schematic side view showing the floating-type magnetic head in the magneto-optical disk device of FIG. 8.

FIGS. 11 through 23 and FIGS. 56 through 59 show the third embodiment of the present invention.

FIG. 11 is a schematic elevation showing the operation of a raising and lowering member of a magneto-optical disk device that is provided with a floating-type magnetic head.

FIG. 12 is a schematic elevation showing an assembling adjustment of the floating-type magnetic head in the magneto-optical disk device of FIG. 11.

FIG. 13 is a schematic elevation showing a specific example of a raising and lowering member of the magneto-optical disk device of FIG. 11.

FIG. 14 is an explanatory drawing which shows possible contact of the floating-type magnetic head against the magneto-optical disk, when it is repeatedly raised and lowered from and toward the magneto-optical disk, by using the relationship between the inclination of the suspension with respect to the magneto-optical disk and the pressing load of the suspension.

FIG. 15 is an explanatory drawing which shows possible contact of the floating-type magnetic head against the magneto-optical disk, when it is repeatedly raised and lowered from and toward the magneto-optical disk, by using the relationship between the height of a fixing member and the inclination of the fixing member with respect to the magneto-optical disk.

FIG. 16 shows waveforms of AE signals that were obtained when the raising and lowering speed of the floating-type magnetic head was set to 11.5 mm/sec in a magneto-optical disk device, which had been assembled under the conditions of $P_{11}$ of FIG. 15.

FIG. 17 shows waveforms of AE signals that were obtained when the raising and lowering speed of the floating-type magnetic head was set to 38 mm/sec in a magneto-optical disk device, which had been assembled under the conditions of $P_{11}$ of FIG. 15.

FIG. 18 shows waveforms of AE signals that were obtained when the raising and lowering speed of the floating-type magnetic head was set to 11.5 mm/sec in a magneto-optical disk device, which had been assembled under the conditions of $P_{12}$ of FIG. 15.

FIG. 19 shows waveforms of AE signals that were obtained when the raising and lowering speed of the floating-type magnetic head was set to 4.8 mm/sec in a magneto-optical disk device, which had been assembled under the conditions of $P_{12}$ of FIG. 15.

FIG. 20 shows waveforms of AE signals that were obtained when the raising and lowering speed of the floating-type magnetic head was set to 11.5 mm/sec in a magneto-optical disk device, which had been assembled under the conditions of $P_{13}$ of FIG. 15.

FIG. 21 shows waveforms of AE signals that were obtained when the raising and lowering speed of the floating-type magnetic head was set to 4.8 mm/sec in a magneto-optical disk device, which had been assembled under the conditions of $P_{13}$ of FIG. 15.

FIG. 22 shows waveforms of AE signals that were obtained when the raising and lowering speed of the floating-type magnetic head was set to 9.2 mm/sec in a magneto-optical disk device, which had been assembled under the conditions of $P_{13}$ of FIG. 15.

FIG. 23 shows waveforms of AE signals that were obtained when the raising and lowering speed of the floating-type magnetic head was set to 11.5 mm/sec in a magneto-optical disk device, which had been assembled under the conditions of $P_{14}$ of FIG. 15.

FIGS. 56 and 57 are explanatory drawings which show possible contact of the floating-type magnetic head against the magneto-optical disk, when it is repeatedly raised and lowered from and toward the magneto-optical disk, by using the relationship between the inclination of the suspension with respect to the magneto-optical disk and the inclination of the fixing member.

FIGS. 58 and 59 are explanatory drawings which show possible contact of the floating-type magnetic head against the magneto-optical disk, when it is repeatedly raised and lowered from and toward the magneto-optical disk, by using the relationship between the height of a fixing member and the inclination of the fixing member with respect to the magneto-optical disk.

FIG. 25 is a schematic vertical sectional view showing a magneto-optical disk with a floating-type magnetic head.

FIG. 26 is a schematic front view showing a magneto-optical disk device that is provided with the floating-type magnetic head of FIG. 25.

FIG. 27 is a schematic side view showing the magneto-optical disk device of FIG. 26.

FIG. 28 is a graph indicating possible contact of a slider of FIG. 25 against the magneto-optical disk, which was obtained by varying the inclination of the slider and the height of the slider from the surface of the magneto-optical disk when it is released.

FIG. 31 is a schematic side view showing a floating-type magnetic head of a magneto-optical disk device.

FIG. 32 is a schematic plan view showing the floating-type magnetic head of the magneto-optical disk device of FIG. 31.

FIG. 33 is a waveform drawing showing an AE signal and a timing signal which were obtained when the floating-type magnetic head of FIG. 31 was raised and lowered near a ridge of the magneto-optical disk.

FIG. 34 is a waveform drawing showing an AE signal and a timing signal which were obtained when a floating-type magnetic head without a bevelled portion in its slider was raised and lowered near a ridge of the magneto-optical disk.

FIG. 35 is a schematic side view showing a floating-type magnetic head of a magneto-optical disk device.

FIG. 36 is an enlarged plan view of the slider of the floating-type magnetic head in the magneto-optical disk device of FIG. 35.

FIGS. 38 through 47 show the eleventh embodiment of the present invention.

FIG. 38 is a process drawing which shows a loading method of a magneto-optical disk cartridge in a magneto-optical disk device.

FIG. 39 is a process drawing which shows an unloading method of the magneto-optical disk cartridge in the magneto-optical disk device.

FIG. 40 is a schematic side view showing a loading process of the magneto-optical disk cartridge of FIG. 38.

FIG. 41 is a schematic side view showing a rotative accelerating process of a spindle motor and an inserting process of the floating-type magnetic head in the magneto-optical disk cartridge of FIG. 38.

FIG. 42 is a schematic side view showing a lowering process of the floating-type magnetic head of FIG. 38.

FIG. 43 is a schematic side view showing a raising process of the floating-type magnetic head of FIG. 38.

FIG. 44 is a schematic side view showing an accessing process of the floating-type magnetic head of FIG. 38 to a recording position.

FIG. 45 is a perspective view of the magneto-optical disk cartridge.

FIG. 46 is a perspective exploded view of the magneto-optical disk cartridge.

FIG. 47 is a perspective view of a cartridge holder in which the magneto-optical disk cartridge is inserted.

FIG. 48 is a schematic side view showing a magneto-optical recording-reproduction apparatus that is provided with a floating-type magnetic head.

FIG. 49 is a schematic plan view showing the floating-type magnetic head of FIG. 48.

FIG. 50 is a schematic side view showing a state of the floating-type magnetic head of FIG. 48 when it is located near a ridge that exists along the outer edge area of the magneto-optical disk.

FIG. 51 is a schematic plan view showing a state of the floating-type magnetic head of FIG. 48 when it is located near a ridge that exists along the outer edge area of the magneto-optical disk.

FIG. 52 is a graph showing data of measurements with respect to the disk height near a ridge that exists along the outer edge area of a magneto-optical disk.

FIG. 53 is a graph showing data of measurements with respect to the disk height near a ridge that exists along the outer edge area of another magneto-optical disk.

FIG. 54 is a graph showing data of measurements with respect to the disk height near a ridge that exists along the outer edge area of still another magneto-optical disk.

FIG. 55 is a graph showing data of measurements with respect to the disk height near a ridge that exists along the outer edge area of another magneto-optical disk.

DESCRIPTION OF THE EMBODIMENTS

Referring to FIGS. 1 through 4, the following description will discuss the first embodiment of the present invention.

Figure 1:
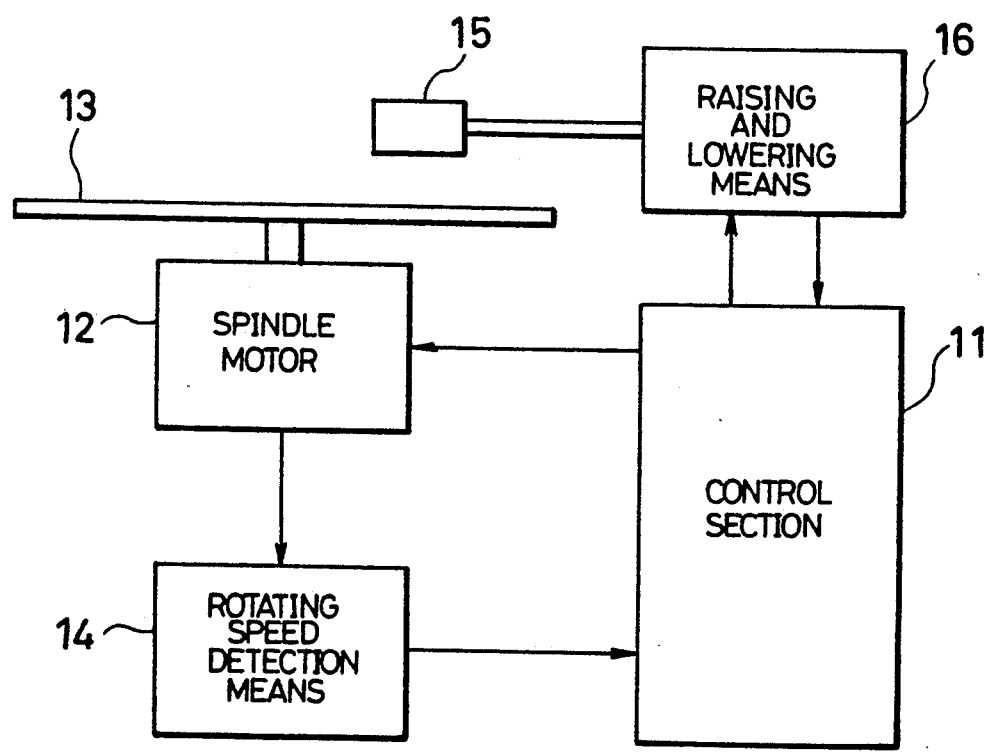
FIGS. 1 through 4 show the first embodiment of the present invention.

As shown in FIG. 1, a magnetic disk device of the present embodiment is provided with a floating-type magnetic head 15 located above a magnetic disk 13 (disc-shaped recording medium), a raising and lowering means 16 for raising or lowering the floating-type magnetic head 15 in the vertical direction with respect to the surface of the magnetic disk 13 and a position sensor (position detecting means) for detecting whether the floating-type magnetic head 15 is located in the proximity of the magnetic disk 13 or not. Here, the position sensor is not shown in FIG. 1.

The floating-type magnetic head 15 is constituted of, for example, a magnetic head (not shown), a slider (not shown) to which the magnetic head is secured. The floating-type magnetic head 15 is supported by a suspension (not shown) and pressed toward one surface of the magnetic disk 13 by the suspension.

When the rotation speed of the magnetic disk 13 becomes not less than a predetermined value, a floating force is produced by an air flow between the bottom surface of the slider and the surface of the magnetic disk 13. This floating force balances a pressing force that is given by the suspension, thereby permitting the floating-type magnetic head 15 together with the slider to float stably above the magnetic disk 13 with a substantially constant gap from the magnetic disk 13.

Further, the floating-type magnetic head 15 is moved by a driving means such as a linear motor (not shown) in the radial direction of the magnetic disk 13.

The magnetic disk device also includes a spindle motor 12 (rotative driving means) for rotatively driving the magnetic disk 13, a rotating speed detection means 14 for detecting the rotating speed of the magnetic disk 13, that is, the number of rotations per unit time, and a control section 11 (control means) for controlling raising and lowering operations of the floating-type magnetic head 15 that are be executed by a raising and lowering means 16 and the rotation of the spindle motor 12, based on signals from a position sensor and the rotating speed detection means 14.

For example, a pulse generator, which is constituted of a piece of magnet secured to the rotation shaft of the spindle motor 12 and a fixed magnetic head, or a frequency generator is used as the rotating speed detection means 14.

With the above arrangement, the floating-type magnetic head 15, while floating above the magnetic disk 13, records information by applying a magnetic field onto the magnetic disk 13 and reproduces information by detecting leakage flux from the magnetic disk 13.

Additionally, in the case of using a magneto-optical disk instead of the magnetic disk 13, the optical head is arranged so that it faces the floating-type magnetic head 15 with the magneto-optical disk located in between.

Figure 2:
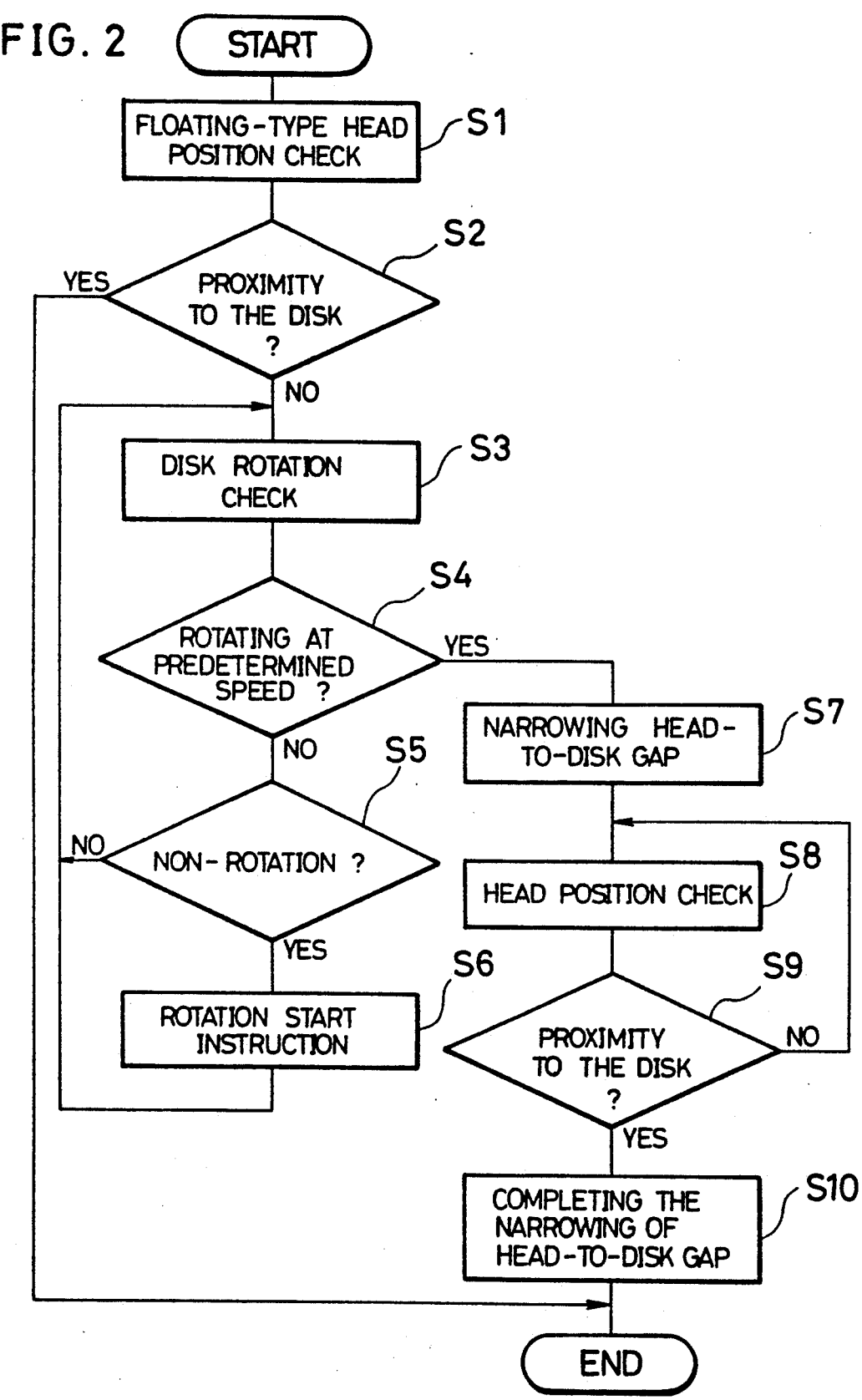

Referring to a flow chart of FIG. 2, the following description will discuss raising and lowering operations of the floating-type magnetic head 15 in recording or reproducing on or from the magnetic disk 13 in the magnetic disk device of the present invention.

When information is recorded or reproduced on or from the magnetic disk 13, in the first step (hereinafter denoted by S), position-identifying information of the floating-type magnetic head 15, which is detected by the position sensor, is read by the control section 11 in order to check to see whether or not the floating-type magnetic head 15 is located at a position (height) where information recording or reproducing is operable with respect to the magnetic disk 13, that is, whether or not the floating-type magnetic head 15 is in close proximity (in a floating state) to the magnetic disk 13.

According to this position-identifying information, it is recognized in the control section 11 whether or not the floating-type magnetic head 15 is in close proximity to the magnetic disk 13 (S2).

If the floating-type magnetic head 15 is in close proximity to the magnetic disk 13, the sequence proceeds to END.

If the floating-type magnetic head 15 is not in close proximity, rotating speed information of the magnetic disk 13 is read from the rotating speed detection means 14 by the control section 11 in order to check to see a rotation condition of the magnetic disk 13 (S3).

In the control section 11, it is recognized whether or not the magnetic disk 13 is rotating at not less than a predetermined rotating speed, based on the rotating speed information (S4).

If the magnetic disk 13 has not reached the predetermined rotating speed, it is recognized in the control section 11 whether or not the magnetic disk 13 is in stoppage (S5). If the magnetic disk 13 is in stoppage, the control section 11 permits the spindle motor 12 to rotate (S6). Then, the sequence is returned to S3. If the magnetic disk 13 is in motion, the sequence is returned to S3, and the steps S3 to S5 are repeated until the magnetic disk 13 has reached the predetermined rotating speed.

After the magnetic disk 13 has reached the predetermined rotating speed, the control section 11 allows the raising and lowering means 16 to start lowering the floating-type magnetic head 15 such that the floating-type magnetic head 15 is gradually brought closer to the magnetic disk 13 (S7). Then, position-identifying information of the floating-type magnetic head 15, which is detected by the position sensor, is read by the control section 11 in order to check to see whether or not the floating-type magnetic head 15 is in close proximity to the magnetic disk 13 (S8).

According to the position-identifying information, it is recognized in the control section 11 whether or not the floating-type magnetic head 15 is in close proximity to the magnetic disk 13 (S9).

If the floating-type magnetic head 15 is in close proximity to the magnetic disk 13, the control section 11 allows the raising and lowering means 16 to stop lowering the floating-type magnetic head 15 (S10), and thus the lowering operation is completed.

If the floating-type magnetic head 15 is not in close proximity, the sequence is returned to S8, and the steps S8 to S9 are repeated until the floating-type magnetic head 15 has brought in close proximity to the magnetic disk 13.

As described above, the magnetic disk device of the present embodiment is arranged such that after the floating-type magnetic head 15 has reached a predetermined rotating speed, the floating-type magnetic head 15 is brought closer to the magnetic disk 13; therefore, the floating-type magnetic head 15 is inevitably subject to a predetermined floating force produced by the rotation of the magnetic disk 13. Thus, accidental contact of the floating-type magnetic head 15 with the magnetic disk 13 can be virtually eliminated. Therefore, damage to the floating-type magnetic head 15 or the magnetic disk 13 and sticking of the floating-type magnetic head 15 to the magnetic disk 13 can be prevented.

Moreover, since the position sensor for detecting whether or not the floating-type magnetic head 15 is located in close proximity to the magnetic disk 13 is provided, the floating-type magnetic head 15 is accurately lowered by the closed loop control.

Figure 3:
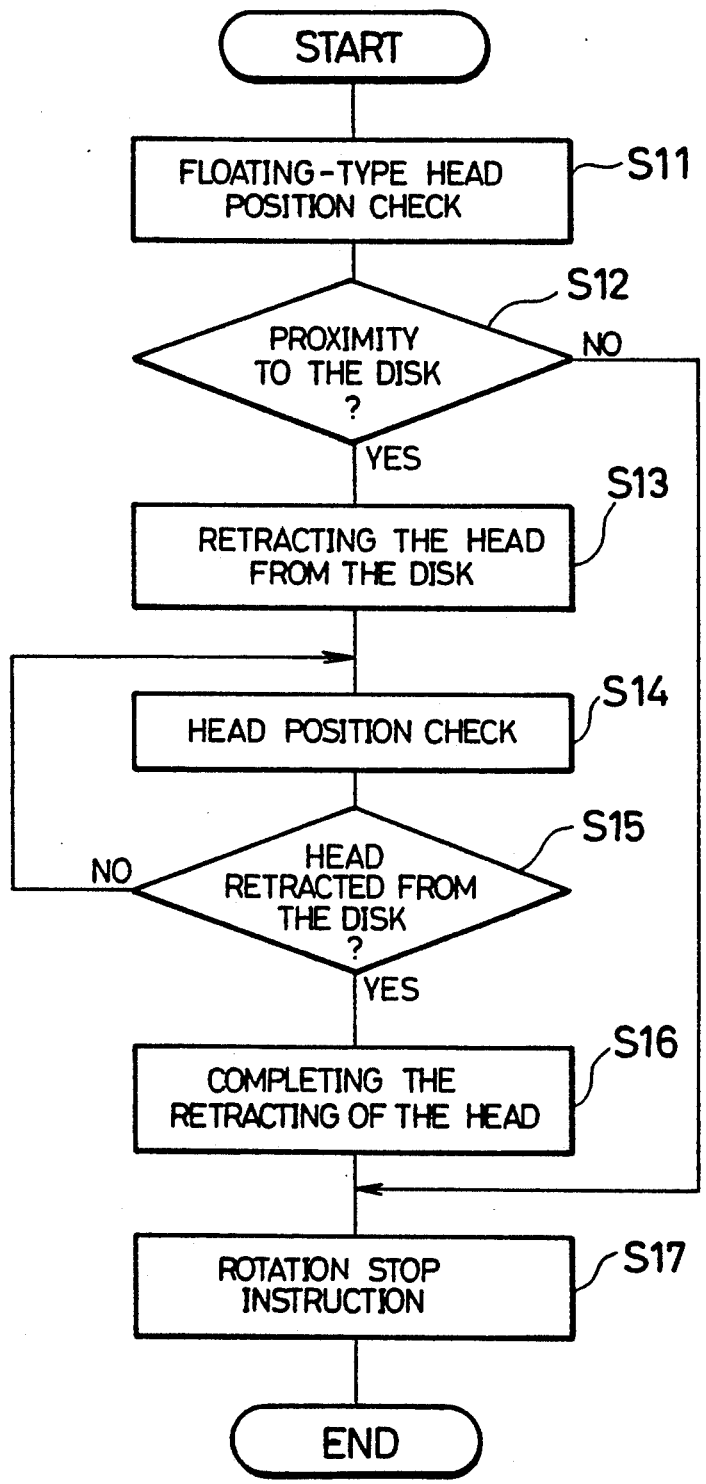

Next, referring to a flow chart of FIG. 3, the following description will discuss raising and lowering operations of the floating-type magnetic head 15 on stopping rotative driving of the magnetic disk 13 in the magnetic disk device.

On stopping rotative driving of the magnetic disk 13, position-identifying information of the floating-type magnetic head 15, which is detected by the position sensor, is read by the control section 11 in order to check to see whether or not the floating-type magnetic head 15 is located at a position where information recording or reproducing is operable with respect to the magnetic disk 13, that is, whether or not the floating-type magnetic head 15 is in close proximity to the magnetic disk 13 (S11).

According to this position-identifying information, it is recognized in the control section 11 whether or not the floating-type magnetic head 15 is in close proximity to the magnetic disk 13 (S12).

If the floating-type magnetic head 15 is not in close proximity to the magnetic disk 13, the control section 11 stops the rotation of the magnetic disk 13 by shutting off the spindle motor 12 (S17), thereby terminating the sequence.

If the floating-type magnetic head 15 is in close proximity to the magnetic disk 13, the control section 11 permits the raising and lowering means 16 to start raising the floating-type magnetic head 15 so as to move the floating-type magnetic head 15 away from the magnetic disk 13 (S13). Then, position-identifying information of the floating-type magnetic head 15, which is detected by the position sensor, is again read by the control section 11 in order to check to see whether or not the floating-type magnetic head 15 is in close proximity to the magnetic disk 13 (S14).

According to this position-identifying information, it is recognized in the control section 11 whether or not the floating-type magnetic head 15 is in close proximity to the magnetic disk 13 (S15).

If the floating-type magnetic head 15 is in close proximity, the sequence is returned to S4. Then, the steps S4 to S5 are repeated until the floating-type magnetic head 15 has been brought to a position that is no longer in close proximity to the magnetic disk 13, that is, a position having not less than a predetermined gap from the magnetic disk 13.

After the floating-type magnetic head has been brought not less than a predetermined space away from the magnetic disk 13, the control section 11 allows the raising and lowering means 16 to stop raising the floating-type magnetic head 15 (S16). The control section 11 stops the rotation of the magnetic disk 13 by shutting off the spindle motor 12 (S17), thereby terminating the sequence.

As described above, the magnetic disk device of the present embodiment is arranged such that after the magnetic disk 13 has been separated away from the magnetic disk 13, the spindle motor 12 is shut off to stop the rotation of the magnetic disk 13; therefore, on stopping rotative driving of the magnetic disk 13, accidental contact of the floating-type magnetic head 15 with the magnetic disk 13 can be virtually eliminated. Thus, damage to the floating-type magnetic head 15 or the magnetic disk 13 and sticking of the floating-type magnetic head 15 to the magnetic disk 13 can be prevented.

Figure 4:
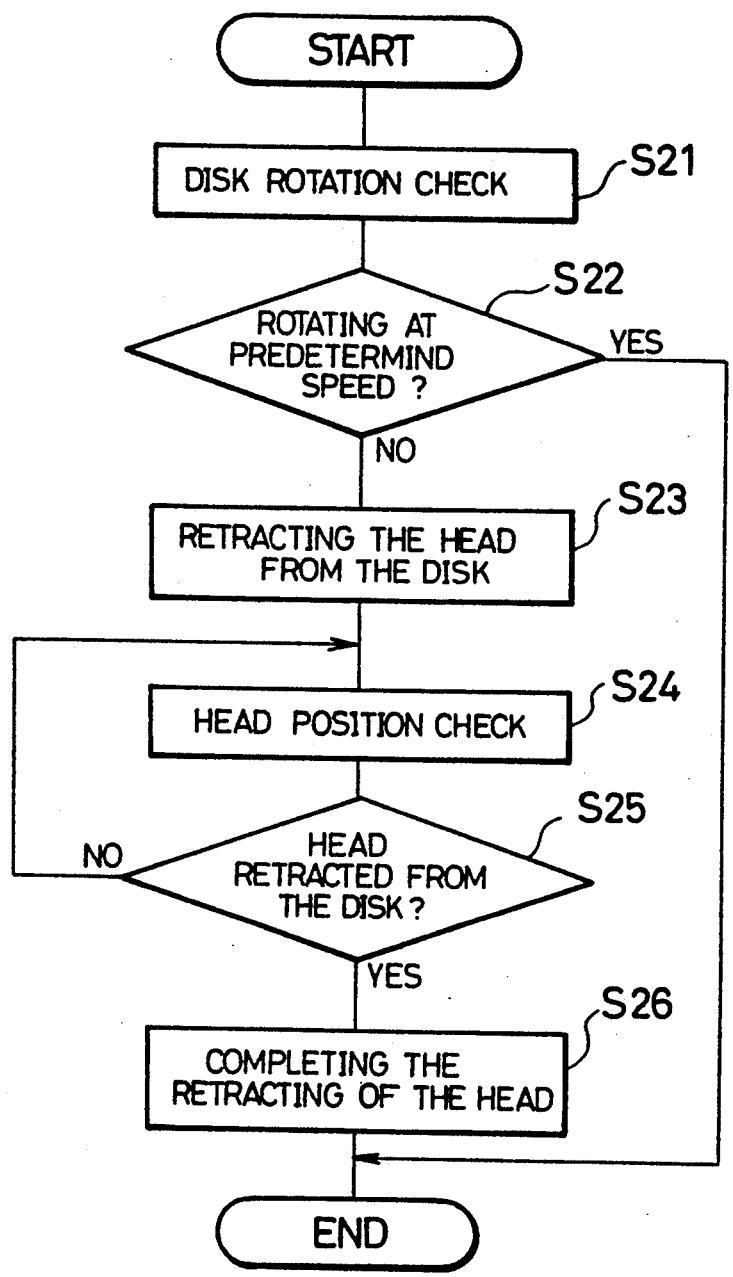

Referring to a flow chart of FIG. 4, the following description will discuss raising and lowering operations of the floating-type magnetic head 15 in the case where the rotating speed of the magnetic disk 13 becomes not more than a predetermined value due to a machine malfunction or the like when the floating-type magnetic head 15 is in close proximity to the magnetic disk 13.

The control section 11 constantly reads rotating speed information of the magnetic disk 13 from the rotating speed detection means 14 by interruption processing or the like, in order to check to see the rotation condition of the magnetic disk 13 (S21). Thus, the control section 11 always recognizes whether or not the magnetic disk 13 is rotating at not less than a predetermined rotating speed (S22).

If the rotating speed of the magnetic disk 13 is not less than the predetermined value, the sequence is terminated without executing any step.

On the other hand, if the rotating speed is not more than the predetermined value, the control section 11 at once permits the raising and lowering means 16 to start raising the floating-type magnetic head 15, and the floating-type magnetic head 15 is moved away from the magnetic disk 13 (S23).

Then, position-identifying information of the floating-type magnetic head 15, which is detected by the position sensor, is read by the control section 11 in order to check to see whether or not the floating-type magnetic head 15 is in close proximity to the magnetic disk 13 (S24). According to this position-identifying information, the control section 11 recognizes whether or not the floating-type magnetic head 15 is in close proximity to the magnetic disk 13 (S25).

If the floating-type magnetic head 15 is in close proximity, the sequence is returned to S24. Then, the steps S24 to S25 are repeated until the floating-type magnetic head 15 has been brought to a position that is no longer in close proximity to the magnetic disk 13.

After the floating-type magnetic head 15 has been brought to the position that is no longer in close proximity to the magnetic disk 13, the control section 11 allows the raising and lowering means 16 to stop raising the floating-type magnetic head 15 (S26), thereby terminating the sequence.

As described above, the magnetic disk device of the present embodiment is arranged such that, when the floating-type magnetic head 15 is in close proximity to the magnetic disk 13, the rotation condition of the magnetic disk 13 is constantly checked and, if the rotating speed of the magnetic disk 13 becomes not more than a predetermined value due to a certain reason, the floating-type magnetic head 15 is at once moved away from the magnetic disk 13.

Thus, accidental contact of the floating-type magnetic head 15 with the magnetic disk 13 due to a machine malfunction or the like can be virtually avoided. Therefore, damage to the floating-type magnetic head 15 or the magnetic disk 13 and sticking of the floating-type magnetic head 15 to the magnetic head 13 can be prevented.

Moreover, since the position sensor for detecting whether or not the floating-type magnetic head 15 is in close proximity to the magnetic disk 13 is provided, it becomes possible to accurately recognize the fact that the floating-type magnetic head 15 is separated away from the magnetic disk 13.

In the above embodiment, although explanation is given of the magnetic disk device provided with the floating-type magnetic head 15, the present invention is also applicable to information reproducing-reproduction apparatuses such as magneto-optical disk devices. Further, the present invention is applicable not only to the floating-type magnetic head 15 but also to various floating-type heads such as floating-type optical heads.

Referring to FIGS. 5 through 10, the following description will discuss the second embodiment of the present invention. Here, for convenience of explanation, those of the members having the same functions and described in the first embodiment are indicated by the same reference numerals and the description thereof is omitted.

Figure 8:
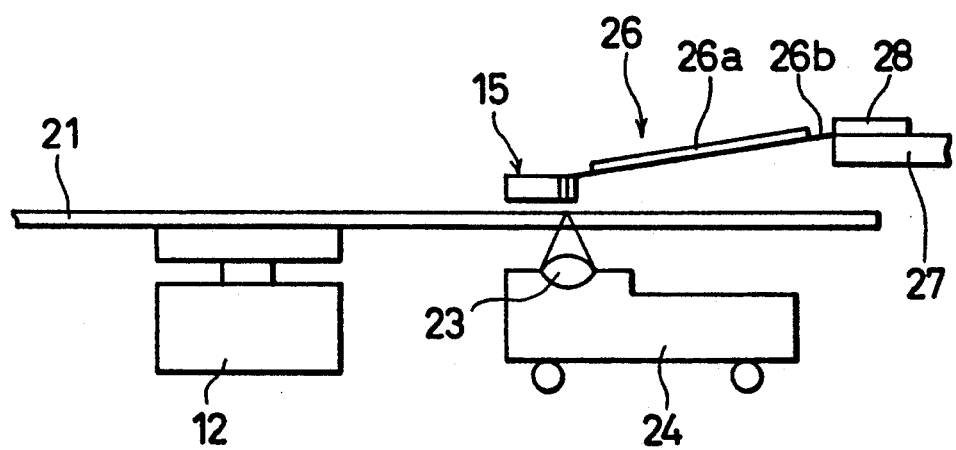

As shown in FIG. 8, a magnetic disk device of the present embodiment is provided with a spindle motor 12 for rotatively driving a magneto-optical disk 21 (disc-shaped recording medium), an optical head 24, located facing one surface of the magneto-optical disk 21 (bottom surface in the drawing), for projecting a light beam onto the magneto-optical disk 21 through an objective lens 23 as well as for conducting reproduction of information or other operation according to light reflected off from the magneto-optical disk 21, and a floating-type magnetic head 15, located at such a position on the other surface of the magneto-optical disk 21 (top surface in the drawing) as operable with the objective lens 23, for applying a magnetic field onto the magneto-optical disk 21.

Further, the optical head 24 is moved by a driving means such as a linear motor (not shown) in the radial direction of the magneto-optical disk 21.

One end of a suspension 26 composed of plate springs is secured to the horizontal face of a fixing member 27, and the floating-type magnetic head 15 is supported by the other end of the suspension 26. The fixing member 27 is moved in the radial direction of the magneto-optical disk 21 by a shifting means that is different from the shifting means for the optical head 24.

Figure 9:
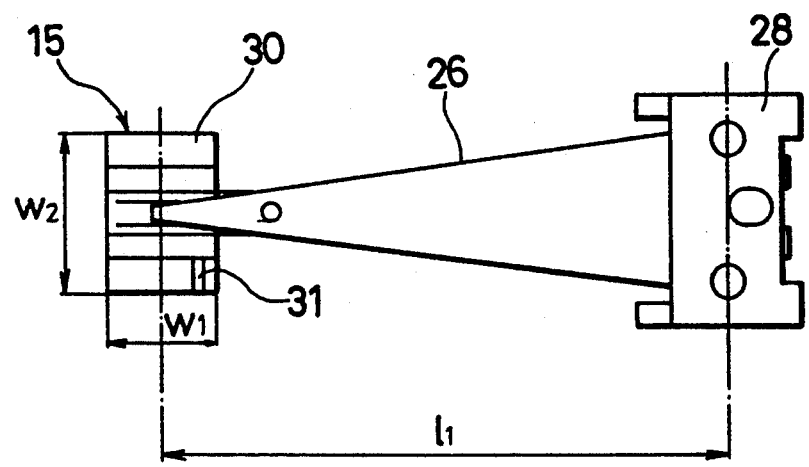
Figure 10:
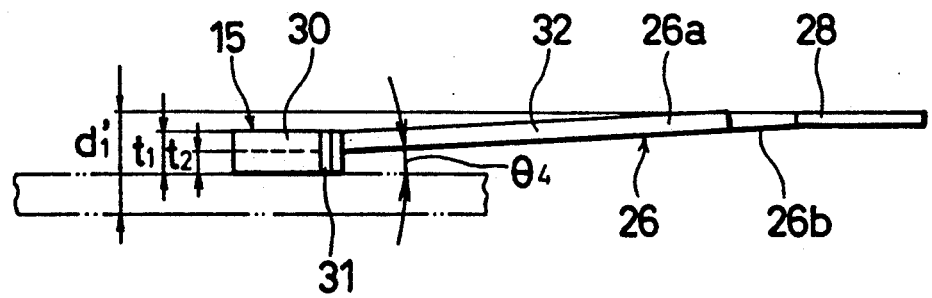

Referring to FIGS. 9 and 10, the following description will discuss the suspension 26 for use in the above magneto-optical disk device.

The suspension 26 is made of stainless steel with a thickness of substantially 70 μm, and the width of the suspension 26 narrows from the base to the end where the floating-type magnetic head 15 is located. The length $l_1$ of the suspension 26 (the distance from the center of a slider 30 of the floating-type magnetic head 15 to the center of a metal plate 28) is 26.41 mm.

The metal plate 28 is welded to the wider end of the suspension 26 to form a connecting section to the fixing member 27. The size of the metal plate 28 is 6 mm wide in the radial direction of the magneto-optical disk 21, 10.2 mm long in the circumferential direction of the magneto-optical disk 21, and 0.5 mm thick.

A magnetic head 31 is fixed to one corner of the slider 30, which corner is located at the outer side of the magneto-optical disk 21. The length $w_1$ of the slider 30 in the radial direction of the magneto-optical disk 21 is 5 mm; the length $w_2$ in the circumferential direction is 7 mm; the whole thickness $t_1$ of the slider 30 is 2 mm; and the thickness $t_2$ from the surface facing the magneto-optical disk 21 to the face whereto the suspension 26 is bonded is 0.82 mm.

The bottom surface of the floating-type magnetic head 15, that is, the surface of the floating-type magnetic head 15 facing the magneto-optical disk 21, has a sloped portion (with an angle of inclination of, for example, 0.5°) with a width of substantially 1 mm in the circumferential direction of the magneto-optical disk 21 at the edge portion from which air flows in by the rotation of the magneto-optical disk 21.

There are flanges 32, bent upward, formed on both edges of the suspension 26 in the width direction. The suspension 26 is less flexible at an area 26a where the flanges 32 are formed than at the other area 26b where the flanges 32 are not formed.

The length of the area 26b is determined so that the floating-type magnetic head 15 can be pressed toward magneto-optical disk 21 at 1 to 10 gf, and in the present embodiment, it is set to 3 to 5 mm.

Assuming that the bottom surface of the floating-type magnetic head 15 is parallel to the surface of the magneto-optical disk 21, the angle $\theta_4$ made by the bottom surface and the suspension 26 is conventionally set to 2.2° while the distance $d_1'$ between the bottom surface and the top surface of the metal plate 28 is set to 2.54 mm.

Figure 5:
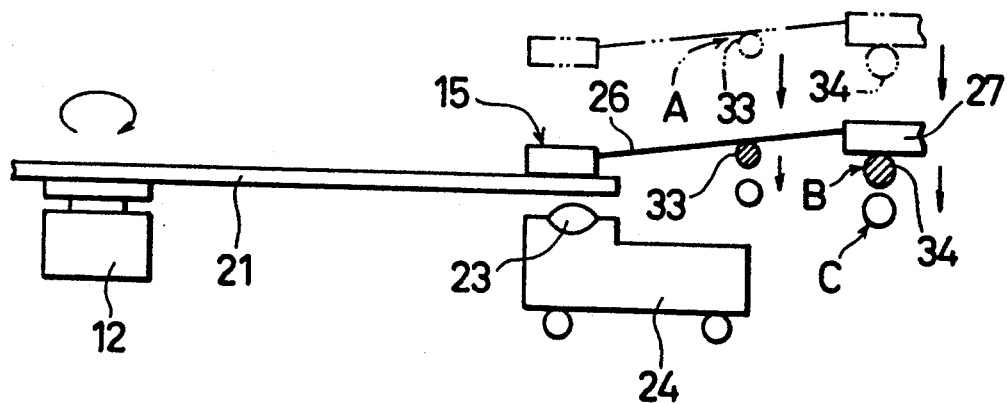
FIGS. 5 through 10 show the second embodiment of the present invention.

In the present embodiment, as shown in FIG. 5, a first raising and lowering member 33 is provided below the suspension 26 and, by contacting it at the area 26a from under, supports the suspension 26 so as to permit it to freely move upward or downward. Further, a second raising and lowering member 34 is disposed below the fixing member 27 and, by contacting it from under, supports the fixing member 27 so as to permit it to freely move upward or downward. The raising and lowering members 33 and 34 are simultaneously raised or lowered.

The raising and lowering members 33 and 34 are positioned at level A in FIG. 5 above the magneto-optical disk 21 such that the floating-type magnetic head 15 is kept away from the surface of the magneto-optical disk 21 during the stoppage of the rotation of the magneto-optical disk 21.

When the magneto-optical disk 21 starts rotating, the raising and lowering members 33 and 34 move downward to lower the floating-type magnetic head 15 toward the magneto-optical disk 21. At this time, the relationship of levels among the floating-type magnetic head 15, the suspension 26 and the fixing member 27 is maintained constant.

Figure 6:
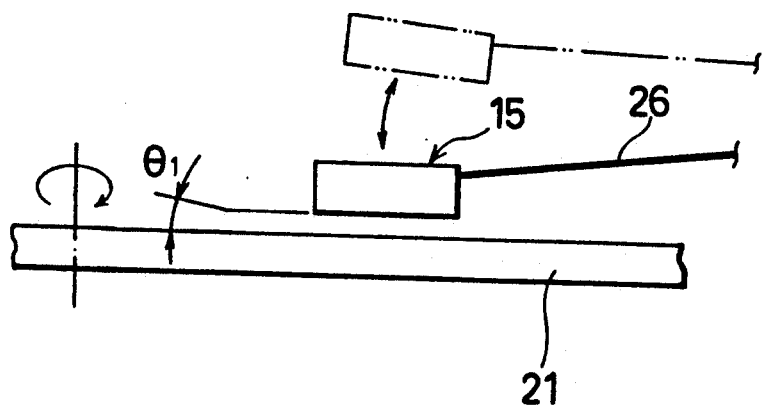
Figure 7:
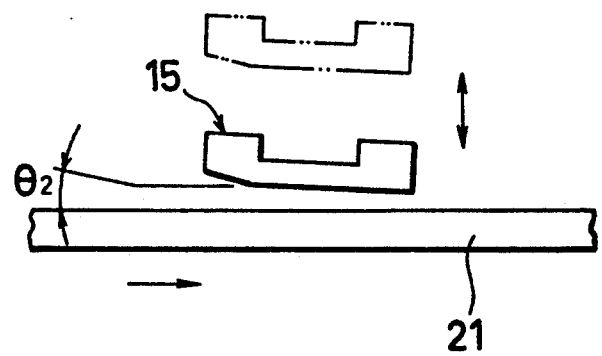

Moreover, inclination of the floating-type magnetic head 15 is adjusted so that during the lowering operation of the floating-type magnetic head 15, as shown in FIG. 6, the angle $\theta_1$ made by the magneto-optical disk 21 and the floating-type magnetic head 15 in the radial direction substantially becomes 0° while, as shown in FIG. 7, the angle $\theta_2$ made by the magneto-optical disk 21 and the floating-type magnetic head 15 in the circumferential direction also substantially becomes 0°.

At the time when the gap between the bottom surface of the floating-type magnetic head 15 and the surface of the magneto-optical disk 21 reaches a predetermined value, that is to say, when the raising and lowering members 33 and 34 are lowered to level B, the lowering operation of the fixing member 27 is stopped, and then the fixing member 27 is moved only in the radial direction of the magneto-optical disk 21.

The raising and lowering member 33 and 34 are further lowered from the level B to level C. Thus, simultaneously as the support of the suspension 26 by the raising and lowering member 33 is released, the floating-type magnetic head 15 is permitted to float above the surface of the magneto-optical disk 15 with a predetermined gap in between.

On the other hand, when the floating operation of the floating-type magnetic head 15 is stopped, the raising and lowering members 33 and 34, while following reversed steps to those of the above-mentioned, are raised from the level C and contact the suspension 26 and the fixing member 27 at the level B. Further, when the raising and lowering members 33 and 34 are raised to the level A, the floating-type magnetic head 15 is maintained in the position away from the magneto-optical disk 21. Then, the rotation of the magneto-optical disk 21 is stopped.

As described above, the floating-type magnetic head 15 is lowered with the bottom surface kept substantially parallel to the surface of the magneto-optical disk 21; therefore, when the raising and lowering member 33 is moved away from the suspension 26 and thus the floating-type magnetic head 15 starts floating by receiving air pressure, accidental contact of the floating-type magnetic head 15 with the magneto-optical disk 21 can be minimized.

Further, sticking of the floating-type magnetic head 15 to the magneto-optical disk 21 can be prevented since contact of the floating-type magnetic head 15 with the magneto-optical disk 21 is minimized.

Additionally, in this embodiment, since the fixing member 27 is raised and lowered by the raising and lowering member 34, another shifting means that is different from the shifting means for the optical head 24 is needed for shifting the fixing member 27 in the radial direction of the magneto-optical disk 21. However, another arrangement may be adopted, wherein the fixing member 27 is removably coupled to the shifting member for the optical head 24 by a coupling means.

Referring to FIGS. 11 through 23 as well as FIGS. 56 through 59, the following description will discuss the third embodiment of the present invention. Here, for convenience of explanation, those of the members having the same functions and described in the first embodiment are indicated by the same reference numerals and the description thereof is omitted.

Figure 11:
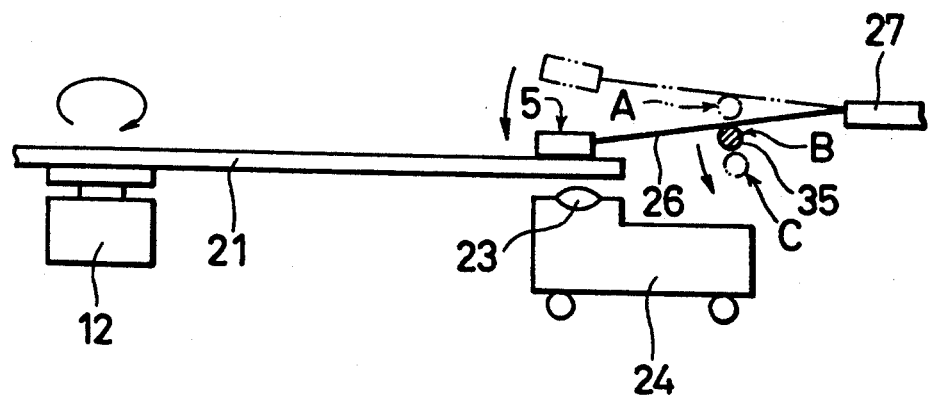

As shown in FIG. 11, a magneto-optical disk device of the present embodiment is different from that of the second embodiment in that the fixing member 27 is positioned at a fixed level.

A raising and lowering member 35 is arranged to come into contact with the area 26a (see FIG. 10) of the suspension 26 from under, and thus the area 26b of the suspension 26 is elastically deformed by raising and lowering operations of the raising and lowering member 35 between the levels A and C. With this arrangement, the floating-type magnetic head 15 can be raised and lowered with respect to the magneto-optical disk 21.

As with the aforementioned embodiment, in the present embodiment, inclination of the floating-type magnetic head 15 is adjusted so that the bottom surface of the floating-type magnetic head 15 is kept substantially parallel to the surface of the magneto-optical disk 21 when the floating-type magnetic head 15 is lowered and the raising and lowering member 35 is separated from the suspension 26 at the level B.

In the present embodiment, only one raising and lowering member 35 is enough to be provided since it is not necessary to raise and lower the fixing member 27. Further, it is possible to combine the fixing member 27 and the optical head 24 into one integrated unit. In other words, the floating-type magnetic head 15 can be shifted in the radial direction of the magneto-optical disk 21 by the use of the shifting means for the optical head 24.

Experiments were conducted, wherein the raising and lowering member 35 was repeatedly moved upward and downward such that raising and lowering operations of the floating-type magnetic head 15 were repeated. Through the experiments, possible contact of the floating-type magnetic head 15 and the magneto-optical disk 21, the behavior of the floating-type magnetic head 15, and pressing load of the floating-type magnetic head 15 toward the magneto-optical disk 21 were tested for their relationships.

In the experiments, a floating-type magnetic head 15, which measured 5 mm in length in the radial direction of the magneto-optical disk 21, 7 mm in length in the circumferential direction and 2 mm in thickness, was employed. Further, a suspension 26 was employed, which had the same shape as that used in the aforementioned embodiment (see FIGS. 9 and 10) and marked a pressing load of substantially 9 gf when $d_1=2.54$ mm (where $d_1$ represents the height of the fixing member 27 with respect to the magneto-optical disk 21).

Figure 12:
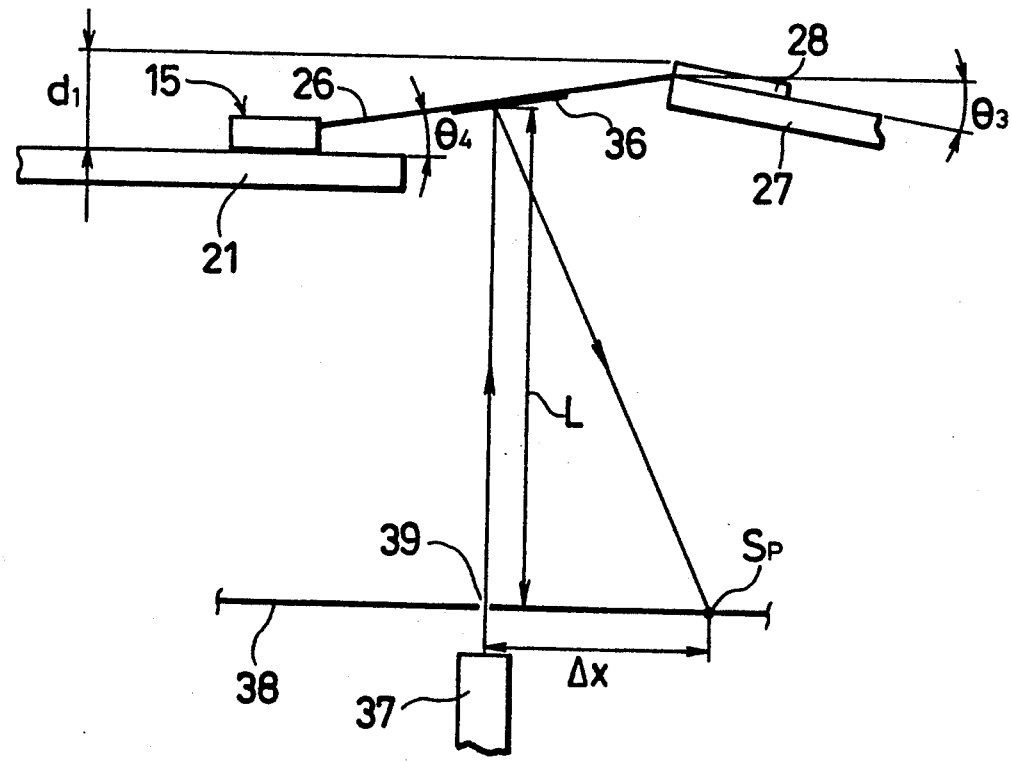

As shown in FIG. 12, the position of the floating-type magnetic head 15 was adjusted by varying $d_1$ and the angle $\theta_3$ of the fixing member 27 with respect to the radial direction. Further, the angle $\theta_2$ with respect to the circumferential direction (see FIG. 7) was substantially set to 0° by keeping horizontal the inclination of the fixing member 27 with respect to circumferential direction.

A glass plate of diameter 86 mm without grooves, coating or other processing applied thereto, was employed as the magneto-optical disk 21. The magneto-optical disk 21 rotated 3000 rpm. The floating-type magnetic head 15 was repeatedly raised and lowered at a position 33 mm away from the center of the magneto-optical disk 21 in the radial direction. The speed of the raising and lowering operations of the floating-type magnetic head 15 was set to 11.5 mm/s in both the raising and lowering operations. Each of the raising and lowering operations was conducted every two seconds.

Figure 13:
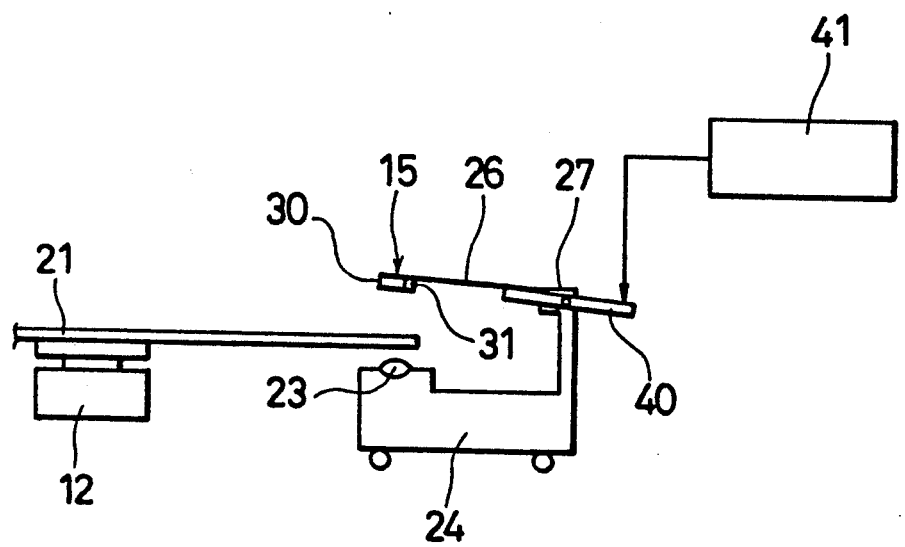

As shown in FIG. 13, a lever 40, which was pivotally supported by a shaft on the fixing member 27, was used as the raising and lowering member 35. One end of the lever 40 was adapted to contact the suspension 26 from under, while the other end of the lever 40 is moved upward and downward by a driving device 41. As the lever 40 is pivoted on the shaft by the driving device 41, the suspension 26 is moved upward and downward by the end of the lever 40. With this arrangement, the floating-type magnetic head 15 that is secured to the end of the suspension 26 can be raised and lowered.

Possible contact of the floating-type magnetic head 15 and the magneto-optical disk 21 was detected by an AE (Acoustic Emission) sensor manufactured by Fuji Electric Co., Ltd., which was bonded to the floating-type magnetic head 15. The floating-type magnetic head 15 floats stably without contacting the magneto-optical disk 21 except when it is in a raising or lowering operation; therefore, AE signals (contact signals) detected by the AE sensor are considered to be resulted from contact of the floating-type magnetic head 15 and the magneto-optical disk 21 in raising and lowering operations.

Figure 14:
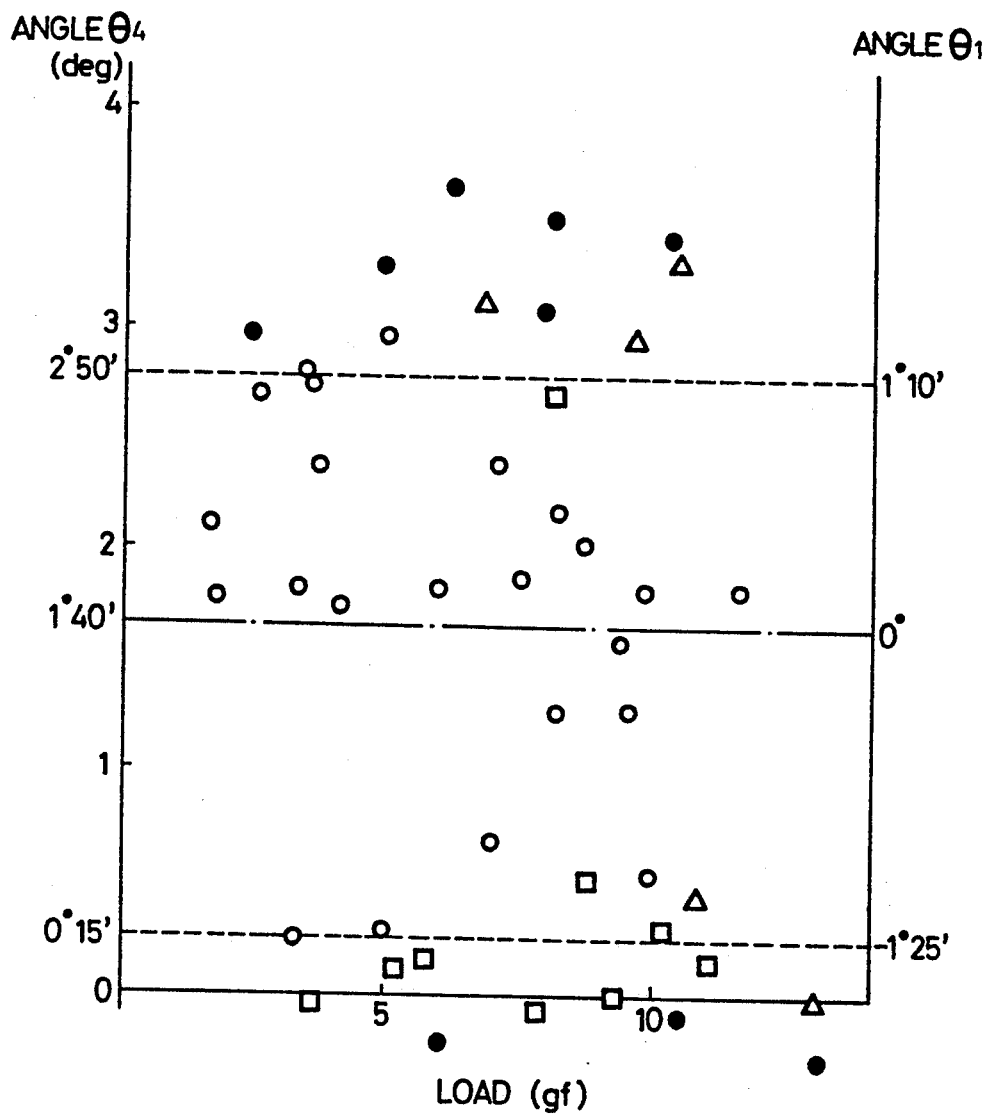
Figure 15:
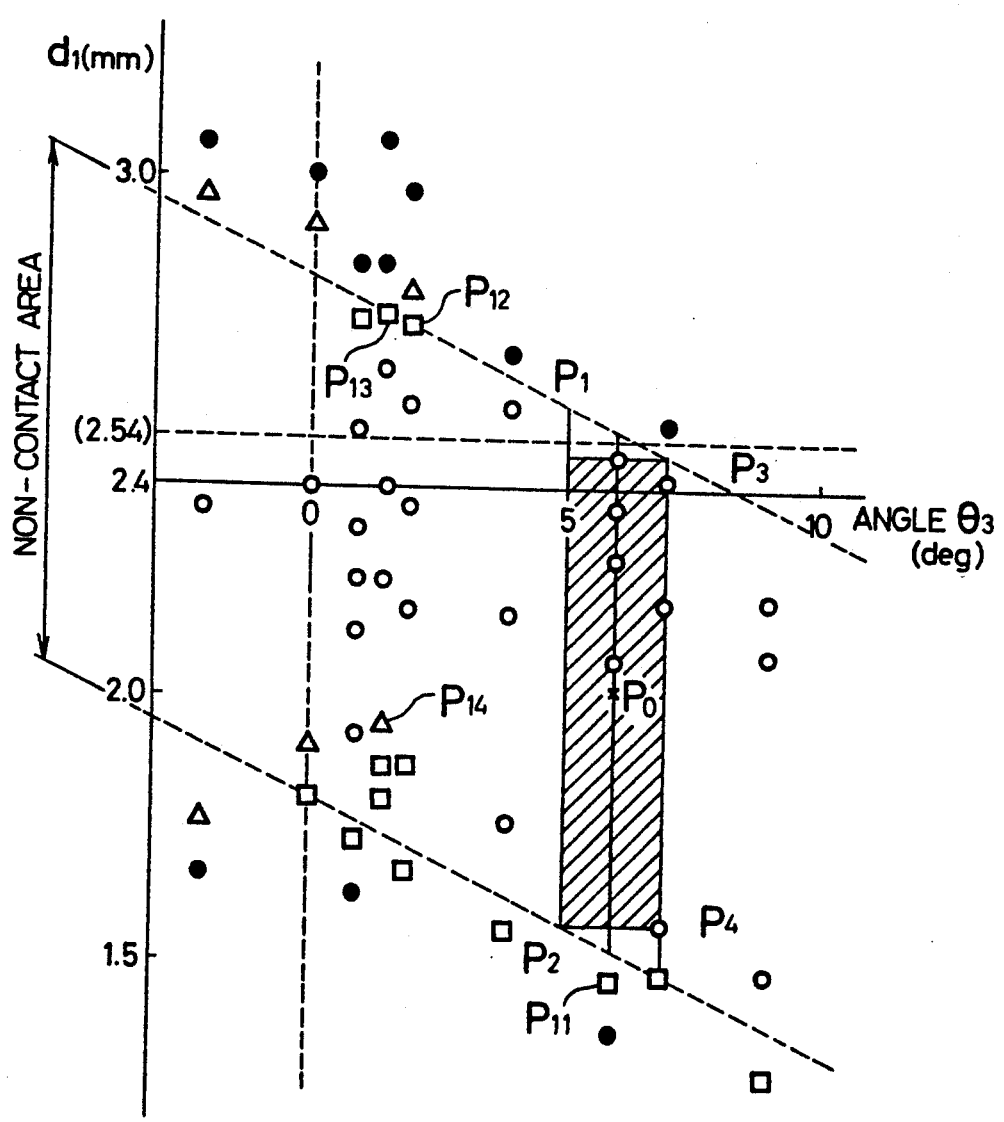

The experimental results are shown in FIGS. 14 and 15. Here, open circles represent that no AE signals were detected, while triangles represent that AE signals were occasionally detected. Moreover, open squares represent that, although an AE signal was always detected in either raising or lowering operation of the floating-type magnetic head 15, the level of the signal was comparatively low. On the other hand, solid squares represent that AE signals were detected every time in both raising and lowering operations.

As aforementioned, in the experiments, the height $d_1$ and the angle $\theta_3$ of the fixing member 27 were varied in order to adjust the position of the floating-type magnetic head 15 (see FIG. 12). Then, after actually measuring a pressing load of the floating-type magnetic head 15 toward the magneto-optical disk 21 in each position, possible contact therebetween was examined by repeatedly conducting raising and lowering operations.

Further, the angle $\theta_4$, which is made by the suspension 26 and the magneto-optical disk 21 in a floating state of the floating-type magnetic head 15 was measured.

As shown in FIG. 12, light beams were used in order to measure the angle $\theta_4$. More specifically, a reflective section 36 was formed at the area 26a of the suspension 26; (for example, a reflective tape was affixed thereto), and a light beam was applied onto the reflective section 36 perpendicularly from under.

A laser light source 37 was placed behind a screen 38, and the light beam, which had passed through a fine hole 39 that was made in the screen 38, was reflected off from the reflective section 36 to produce a light spot Sp on the screen 38. Here, the following equation holds:

$$\Delta x = L \tan 2\theta_4,$$

which is rearranged to read:

$$\theta_4 = (\tfrac{1}{2}) \cdot \tan^{-1}(\Delta x / L),$$

where $\Delta x$ represents the distance between the center of the hole 39 from which the light beam is projected and the spot Sp produced by the reflected light beam, and L represents the distance from the screen 38 to the reflective section 36. Therefore, when the value of L is predetermined, the value of $\theta_4$ can be obtained by measuring $\Delta x$.

The results of the above experiments are shown in FIG. 14, where the vertical axis represents values of $\theta_4$ and the horizontal axis represents pressing loads.

It is found that, when the pressing load is within 1 to 14 gf, the floating-type magnetic head 15 can be raised and lowered without contacting the magneto-optical disk 21 if the value of $\theta_4$ is set within 0° 15' to 2° 50'. Therefore, in adjusting the position of the floating-type magnetic head 15, if the setting value of $\theta_4$ is kept within 1° 35' to 1° 40', the tolerances of ±1° 10' can be obtained.

Moreover, in the state where the floating-type magnetic head 15 floated above the magneto-optical disk 21, the angle made by the bottom surface of the floating-type magnetic head 15 and the area 26a of the suspension 26 was 1° 40'. Here, when $\theta_4$ in the vertical axis is replaced by $\theta_1$ (see FIG. 6), as shown on the right side of FIG. 14, it is found that no contact occurs within a range of $\theta_1$ from −1° 25' to 1° 10' having a central range of −0° 05' to 0°.

In actual assembly processes of the magneto-optical disk device, these adjustments are often carried out by setting target values of $\theta_3$ and $d_1$ that are shown in FIG. 12. Here, FIG. 15 shows the experimental results that are plotted with respect to $\theta_3$ and $d_1$.

According to FIG. 15, it is found that there is an area where no contact occurs (non-contact area), which has a belt-like shape going diagonally down to the right with a width of substantially 1 mm in $d_1$.

Referring to FIG. 15, the following description will discuss a specific example for setting optimum values (target values) and tolerances of $d_1$ and $\theta_3$. When the pressing load to the floating-type magnetic head 15, created by the suspension 26, is set to 5 gf, the optimum value of $\theta_3$ has been given as approximately 6° by way of the pressing load data preliminarily measured. When $\theta_3 = 6°$, $d_1 = 2.02$ mm at the center $P_0$ of the non-contact area $d_1$. Therefore, the optimum value of $\theta_3 = 6°$, while that of $d_1 = 2.02$ mm.

Next, in the adjusting process, explanation is given of the case where the maximum tolerances of ±1° in $\theta_3$ are adopted. Perpendicular lines are drawn through the respective points, $\theta_3 = 5°$ and $\theta_3 = 7°$, and as shown in FIG. 15, respective intersections made by those lines and the upper and lower limit lines of the non-contact area are indicated as $P_1$ through $P_4$. In this case, horizontal lines are respectively drawn through $P_2$ and $P_3$, and thus a tolerance range is given as an area shown by hatching, which includes $P_0$. In other words, $\theta_3$ is within $5°\pm1°$, while $d_1$ is within $2.02$ mm $\pm0.45$ mm.

On the other hand, the raising and lowering operations of the floating-type magnetic head 15 were repeatedly conducted ten thousand times with respect to a magneto-optical disk 21 that was made of a polycarbonate substrate. The other experimental conditions were the same as those employed in the aforementioned magneto-optical disk 21 that was made of the glass substrate. The results of the experiments, wherein $\theta_3$ and $d_1$ were varied, shows that, even if $d_1$ is further deviated upward from the non-contact area of FIG. 15 on the order of 0.2 mm, the depths of scratches formed on the surface of the magneto-optical disk 21 are no more than 0.2 μm, causing no damage to the recorded information.

Therefore, if contact between the floating-type magnetic head 15 and the magneto-optical disk 21 is further allowed, the tolerances of $d_1$ can be further increased.

Moreover, the same experiments as shown in the above were conducted with respect to a suspension 26 which showed a pressing load of approximately 5 gf when $d_1=2.94$. The experimental results are shown in FIGS. 56 through 58. Here, data shown in FIGS. 56 and 59 were obtained when the magneto-optical disk 21 was rotated at 3000 rpm, while those shown in FIGS. 57 and 59 were obtained when the magneto-optical disk 21 was rotated at 3600 rpm. The floating-type magnetic head 15 was repeatedly raised and lowered at a radial position of 40 mm away from the center of the magneto-optical disk 21.

In those experiments, the same results as those in the aforementioned experiments have been obtained. In other words, the non-contact area lies in the range of substantially $\pm1°$ with $\theta_4=1°\ 40'$ as its center.

During the assembling and adjusting processes of the magneto-optical disk, as shown in FIG. 12, the position adjustment of the floating-type magnetic head 15 can be performed accurately by adjusting $\theta_3$ and $d_1$ while the angle $\theta_4$ between the suspension 26 and the magneto-optical disk 21 is being detected by reflecting the light beam off from the reflective section 36.

More specifically, by setting L in FIG. 12 to be longer, the variation of $\Delta x$ becomes greater even if the variation of $\theta_4$ created by adjusting $d_1$ and $\theta_3$ is slight; therefore, the variation of $\theta_4$ can be detected with high sensitivity. The fixing member 27 is secured when $\Delta x$ has substantially approached the target value, thereby completing the adjustment.

Next, experiments were conducted, wherein the raising and lowering speed of the floating-type magnetic head 15 was varied in magneto-optical disk devices which had been assembled under conditions shown near the borders between the contact area and the non-contact area of FIG. 15.

More specifically, with respect to points $P_{11}$ through $P_{13}$, which were indicated by squares as the experimental results and located near the border in FIG. 15, as well as to a point $P_{14}$, which was indicated by a triangle as the experimental result although located within the non-contact area, possible contact was tested by using the AE sensor, while varying the raising and lowering speed.

The experimental results are shown in FIGS. 16 through 23.

In those drawings, waveforms shown below represent AE signals, while those shown above are timing signals. The horizontal axis represents time. The timing signal contains pulses which occur when the floating-type magnetic head 15 is raised. Accordingly, an AE signal observed before the pulse indicates that a contact has occurred in a raising operation of the floating-type magnetic head 15, and on the other hand an AE signal observed after the pulse indicates that a contact has occurred in a lowering operation of the floating-type magnetic head 15.

Figure 16:
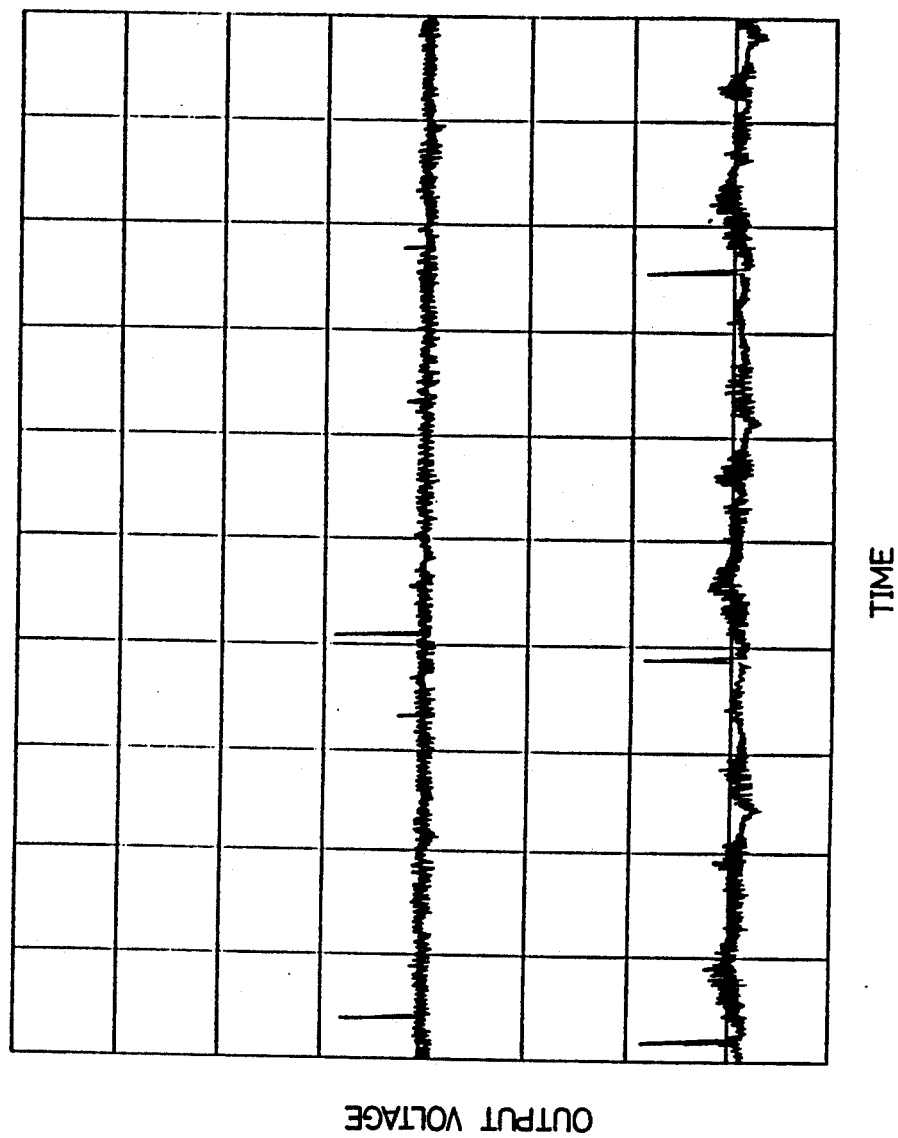

The waveforms shown in FIG. 16 were obtained when the raising and lowering speed of the floating-type magnetic head 15 was set to 11.5 mm/sec in a magneto-optical disk device, which had been assembled under the conditions of $P_{11}$. According to FIG. 16, the AE signals appear after the pulses of the timing signal; therefore, contact occurs in the lowering operation of the floating-type magnetic head 15. Further, although the cases are rare, contact also occurs in the raising operation.

Figure 17:
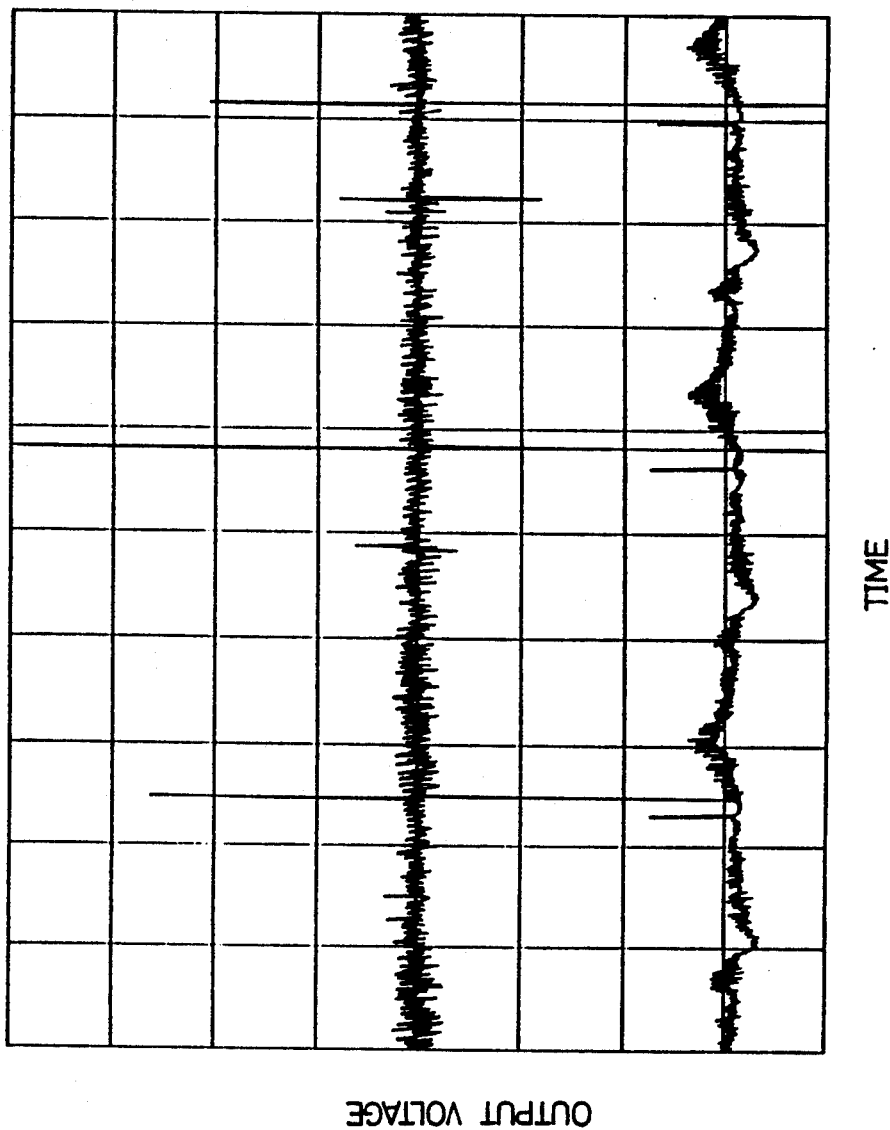

The waveforms shown in FIG. 17 were obtained when the raising and lowering speed of the floating-type magnetic head 15 was set to 38 mm/sec in the magneto-optical disk device, which had been assembled under the conditions of $P_{11}$. The levels of the AE signals in the raising operations of the floating-type magnetic head 15 become greater and the levels of the AE signals in the lowering operations also become remarkably greater, which shows that impacts upon contacting are considerably great.

Hereupon, the behavior of the floating-type magnetic head 15 was checked by applying a light beam onto a gliding surface of the slider 30 of the floating-type magnetic head 15 according to the setting of FIG. 12. Then, by observing the movements of the light spot on the screen 38, it was found that the floating-type magnetic head 15 was violently shaking during the raising operation as well as the lowering operation.

In addition, when the raising and lowering speed of the floating-type magnetic head 15 was set to 4.8 mm/sec, the signal level in the lowering operation of the floating-type magnetic head 15 became smaller.

Figure 18:
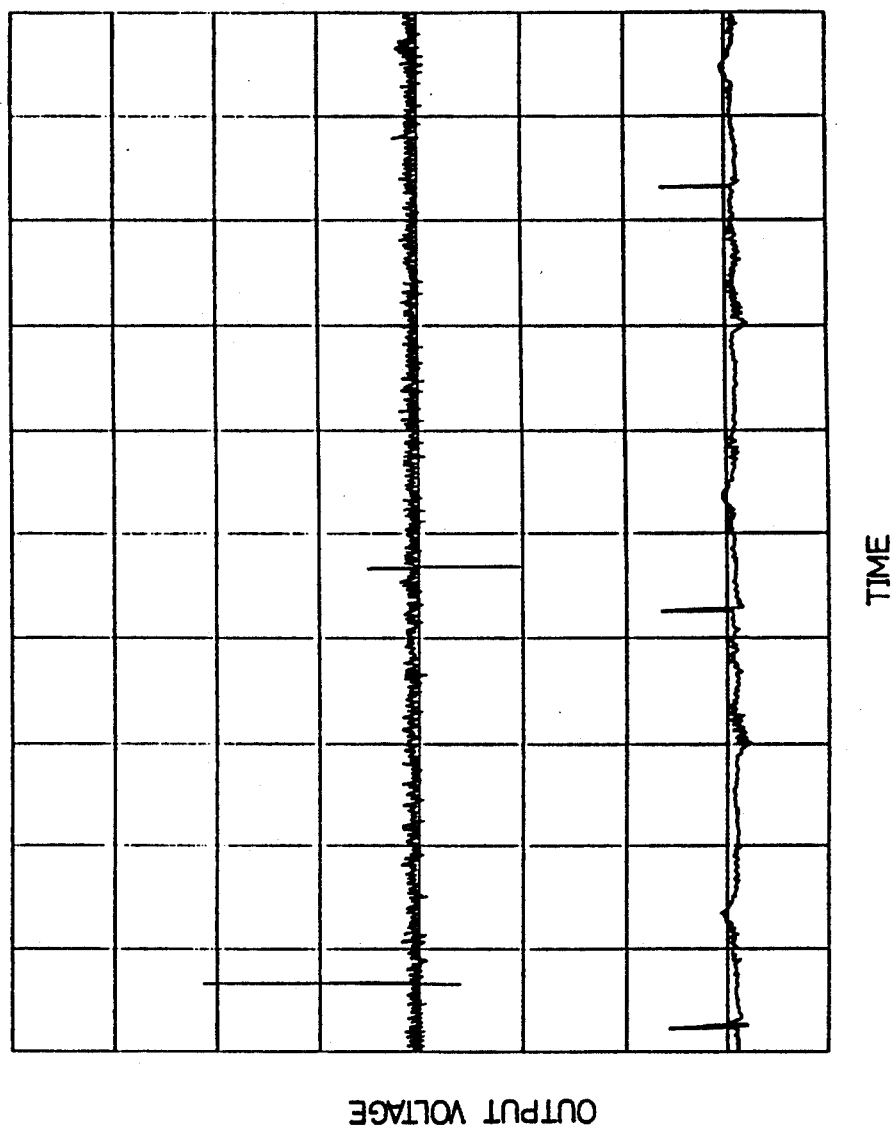

The waveforms shown in FIG. 18 were obtained when the raising and lowering speed of the floating-type magnetic head 15 was set to 11.5 mm/sec for use in a magneto-optical disk device, which had been assembled under the conditions of $P_{12}(d_1=2.75$ mm, $\theta_3=1.75°)$. In this case, AE signals with low levels occurred only in the lowering operations of the floating-type magnetic head 15.

Figure 19:
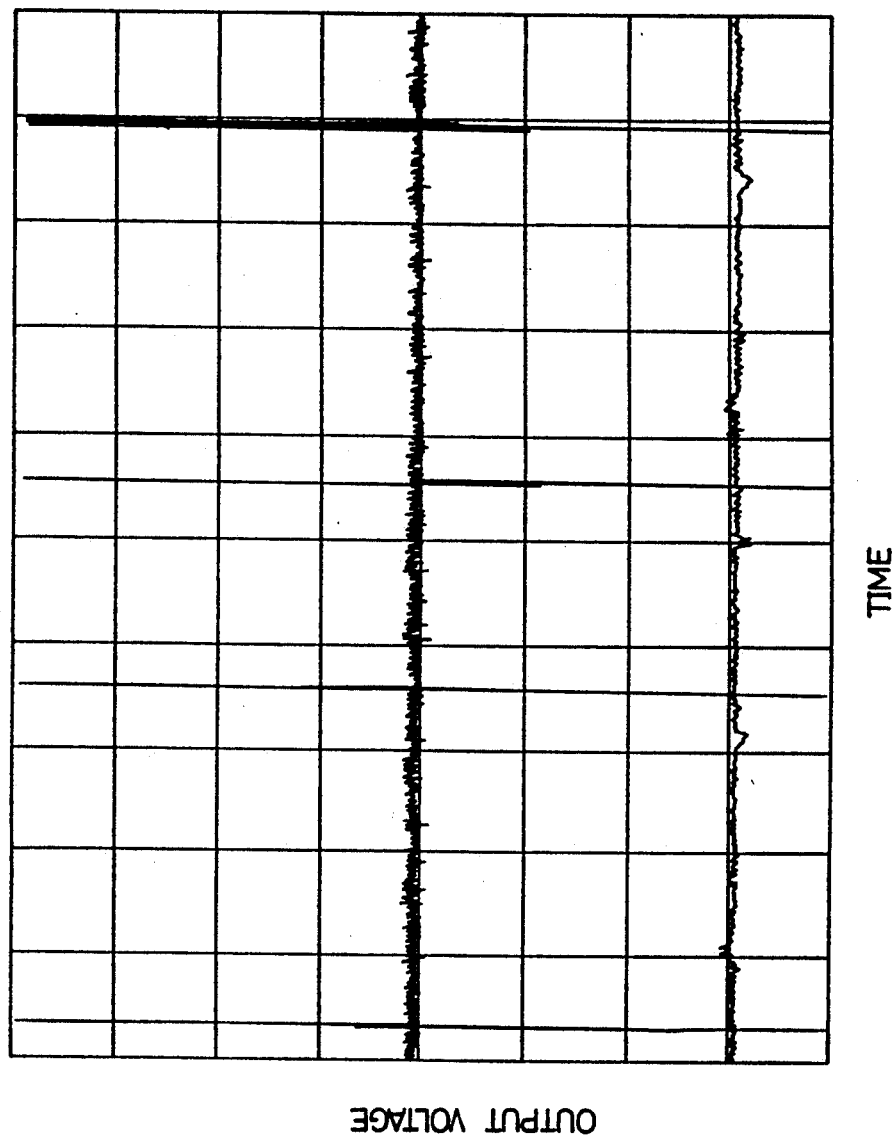

The waveforms shown in FIG. 19 were obtained when the raising and lowering speed of the floating-type magnetic head 15 was set to 4.8 mm/sec for use in the magneto-optical disk device, which had been assembled under the conditions of $P_{12}(d_1=2.75$ mm, $\theta_3=1.75°)$. In this case, an AE signal with high level occurred in every raising operation of the floating-type magnetic head 15. During the raising operations, the slider 30 shook violently, and the shaking remained in the following lowering operations, causing the AE signals to become great also in the lowering operations. On the other hand, in the case where the floating-type magnetic head was lowered from the top position after keeping a long interval, the AE signal did not occur, or, even if it occurred, the level was low.

Figure 20:
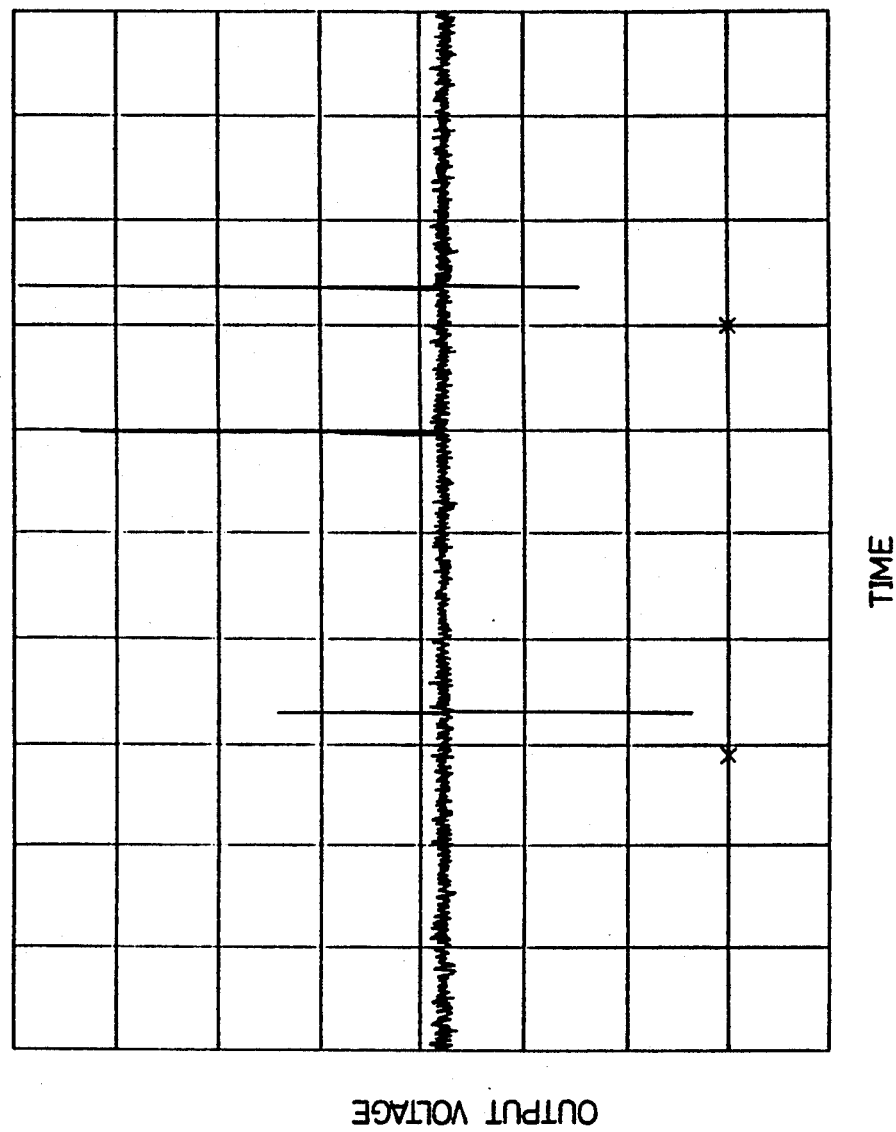

The waveform shown in FIG. 20 was obtained when the raising and lowering speed of the floating-type magnetic head 15 was set to 11.5 mm/sec for use in a magneto-optical disk device, which had been assembled under the conditions of $P_{13}$. Here, since the timing signal was not recorded, the positions of the pulses were shown with "cross mark". In this case, an AE signal occurred in every lowering operation of the floating-type magnetic head 15. In raising operations, AE signals occurred only occasionally.

Figure 21:
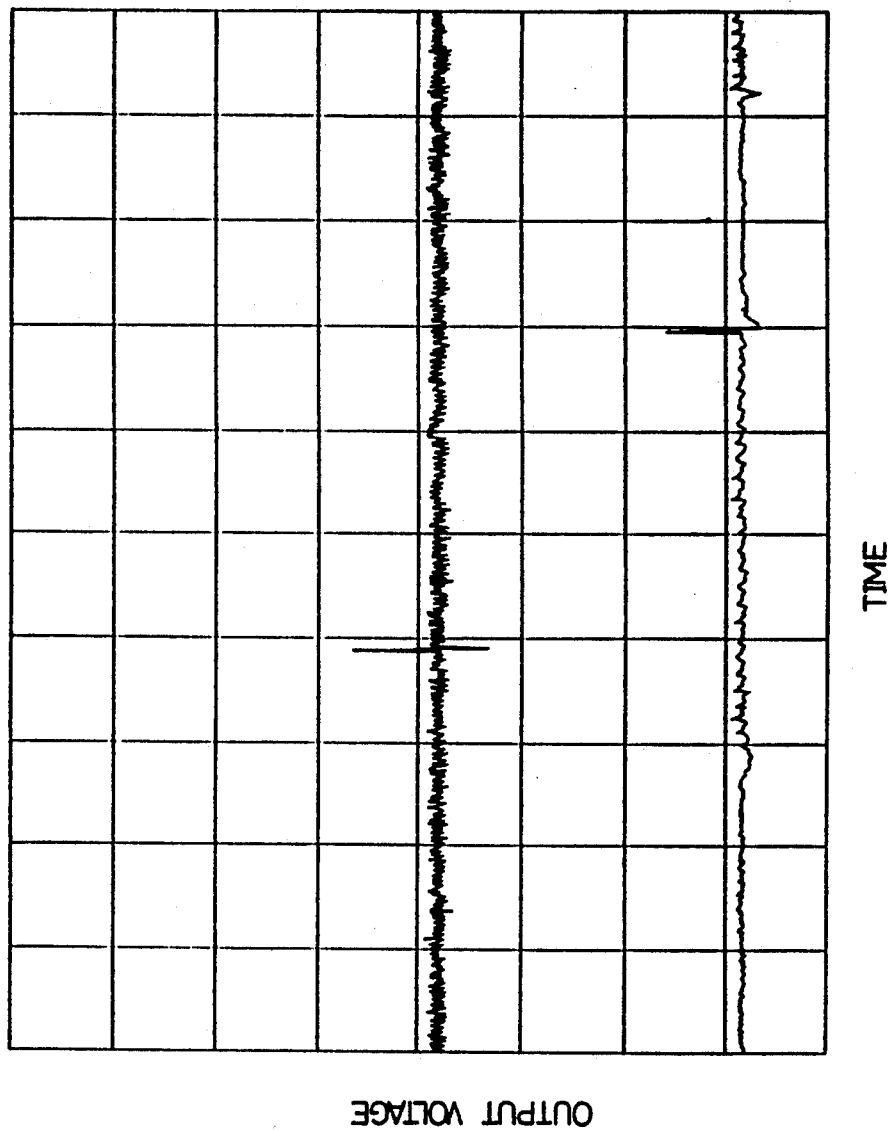

The waveforms shown in FIG. 21 were obtained when the raising and lowering speed of the floating-type magnetic head 15 was set to 4.8 mm/sec for use in the magneto-optical disk device, which had been assembled under the conditions of $P_{13}$. AE signals in the lowering operations of the floating-type magnetic head 15 disappeared, while in every raising operation, an AE signal with low level occurred.

Figure 22:
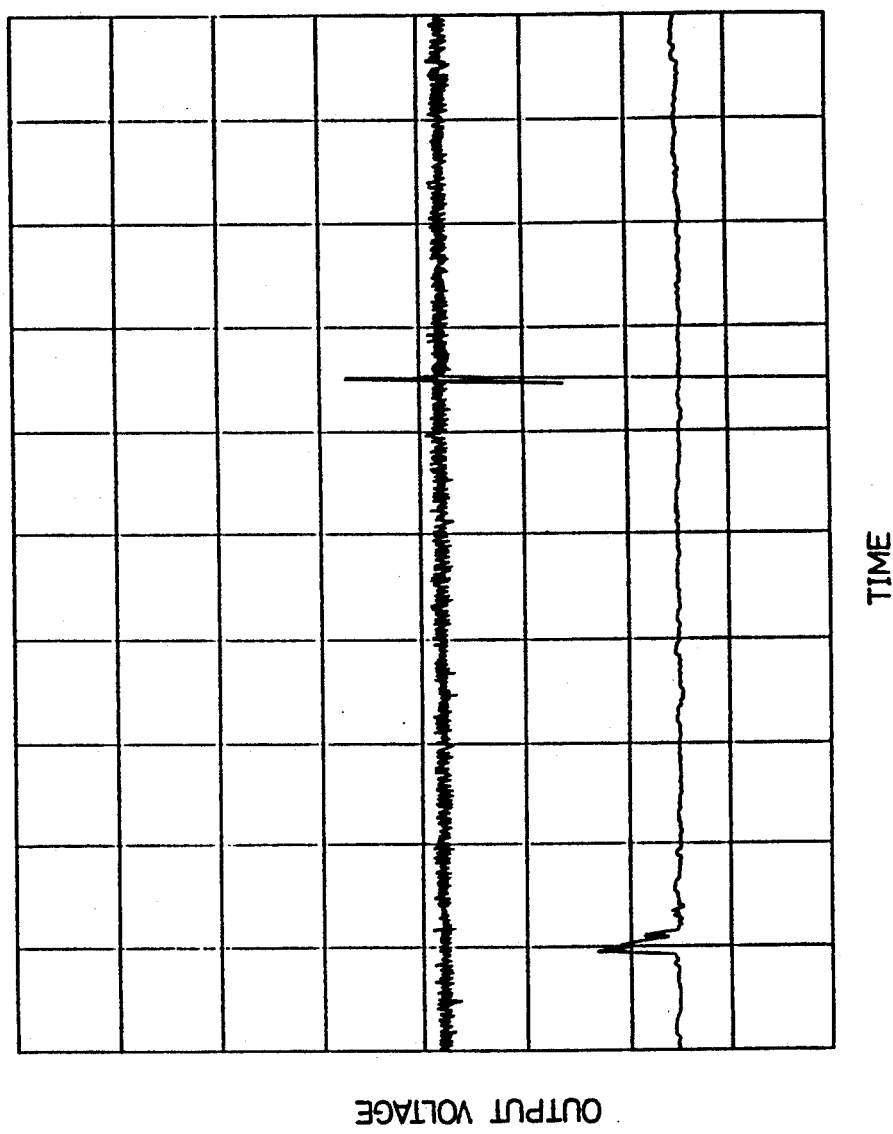

The waveforms shown in FIG. 22 were obtained when the raising and lowering speed of the floating-type magnetic head 15 was set to 9.2 mm/sec for use in the magneto-optical disk device, which had been assembled under the conditions of $P_{13}$. AE signals appeared in the lowering operations of the floating-type magnetic head 15.

Figure 23:
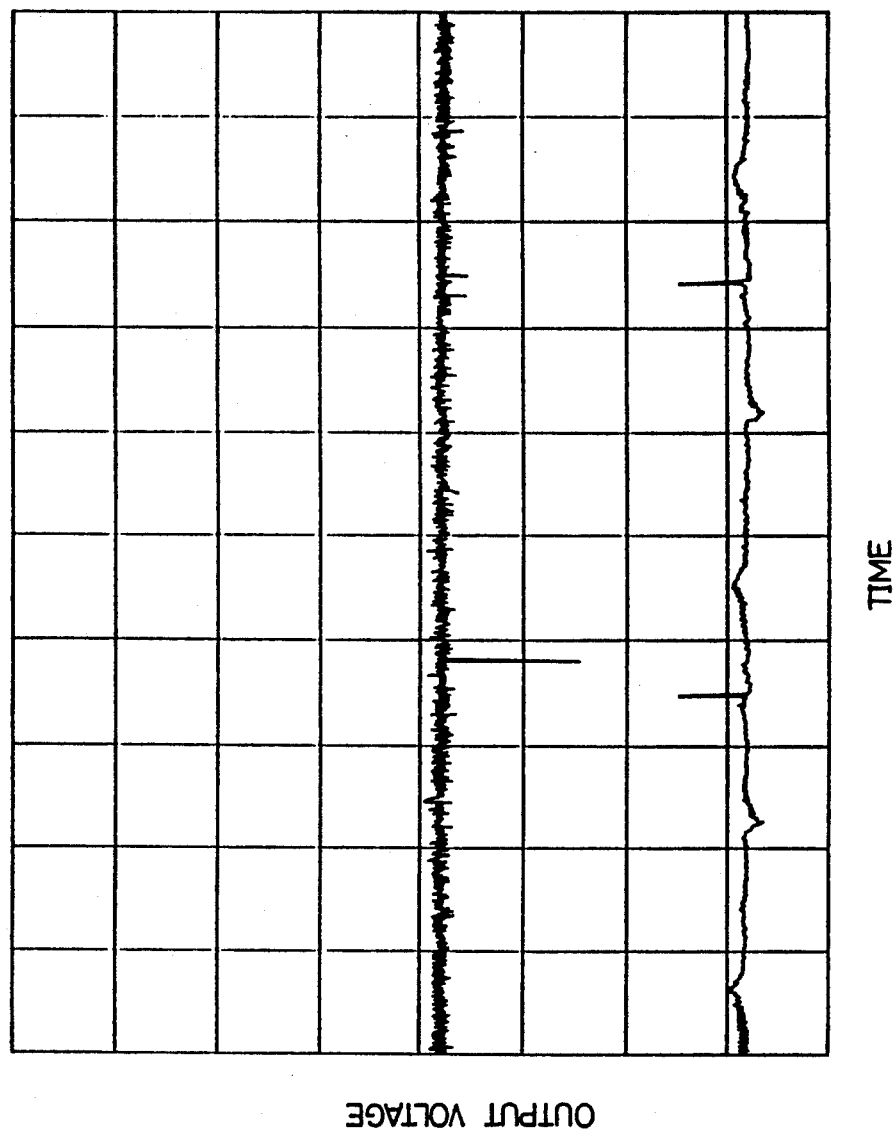

The waveforms shown in FIG. 23 were obtained when the raising and lowering speed of the floating-type magnetic head 15 was set to 11.5 mm/sec for use in a magneto-optical disk device, which had been assembled under the conditions of $P_{14}$. In this case, AE signals with low level occasionally occurred in the lowering operations of the floating-type magnetic head 15. Here, it has been found that if the raising and lowering speed was reduced to not more than 9 mm/sec, the AE signals would disappear.

Similarly, experiments were conducted by varying the raising and lowering speed of the floating-type magnetic head 15 under the conditions of each point that was marked by a square or a triangle, and the results showed the same tendency as described above. That is, as the raising and lowering speed of the floating-type magnetic head 15 was reduced, the AE signals that occurred in the lowering operations of the floating-type magnetic head 15 became low in their levels or disappeared; and this shows a tendency that contact no longer occur or, if any, the impact is small. Therefore, taking account of the above experimental results and actual time required for the disk cartridge to be loaded, the lowering speed of the floating-type magnetic head 15 is desirably set to 5 to 15 mm/sec.

On the other hand, when the raising and lowering speed of the floating-type magnetic head 15 was too low, the AE signals that occurred in the raising operations of the floating-type magnetic head 15 appeared more frequently and the levels of the AE signals became great; and this shows a tendency that contact to the disk occurs more frequently and the impact is great. Therefore, the raising speed of the floating-type magnetic head 15 is desirably set to not less than 12 mm/sec.

Furthermore, as shown in FIGS. 18 and 19, the shaking of the floating-type magnetic head 15, which had occurred in a raising operation, remained even in the following lowering operation, in the case of the lowering operation conducted immediately after the raising operation; therefore, it is effective to hold the following lowering operation of the floating-type magnetic head 15 until the shaking of the floating-type magnetic head 15 has stopped, after swiftly raising the floating-type magnetic head 15.

As a result, in the magneto-optical disk device of the present embodiment, it is desirable to drive the raising and lowering lever 40 by means of the driving device 41 so that the lowering speed may be set to not more than 10 mm/sec, when the floating-type magnetic head 15 is shifted to the floating position above the magneto-optical disk 21 in rotation, and so that the raising speed may be set to not less than 15 mm/sec, more preferably to not less than 12 mm/sec, when the floating-type magnetic head 15 is shifted away from the magneto-optical disk 21.

With the arrangement, since the tolerance range of $\theta_3$ and $d_1$ can be expanded, the allowable gap for avoiding contact between the floating-type magnetic head 15 and the magneto-optical disk 21 can be widened. That is to say, during assembling processes, the position adjustment of the magneto-optical disk device can be easily executed.

Figure 24:
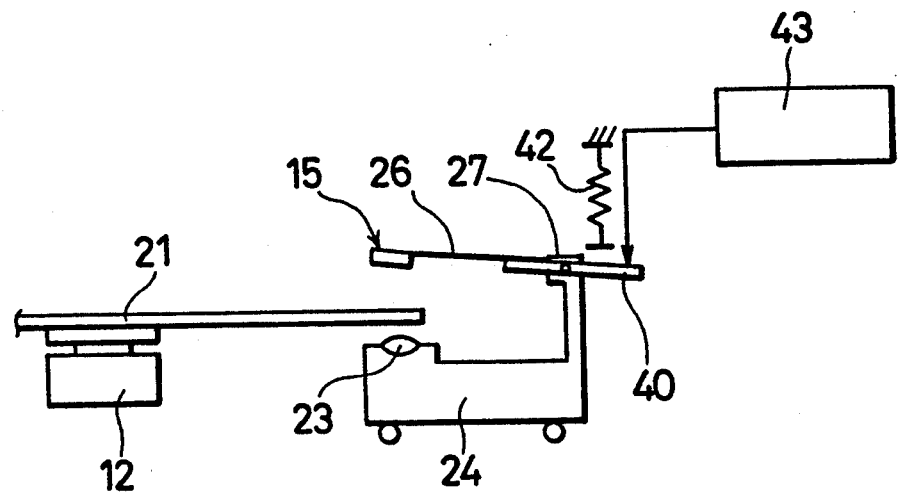
FIG. 24 is a schematic elevation showing a magneto-optical disk device that is provided with a floating-type magnetic head, and illustrates the fourth embodiment of the present invention.

Referring to FIG. 24, the following description will discuss the fourth embodiment of the present invention. Here, for convenience of explanation, those of the members having the same functions and described in the aforementioned embodiments are indicated by the same reference numerals and the description thereof is omitted.

As shown in FIG. 24, a magneto-optical disk device of the present embodiment is different from that of the third embodiment in that a driving device 43 for raising and lowering the lever 40 and a spring 42 for slowing down the lowering speed of the lever 40 compared with the raising speed, are separately installed.

By applying a driving force thereto, the driving device 43 permits the raising and lowering lever 40 to provide a constant raising and lowering speed of the floating-type magnetic head 15. When the floating-type magnetic head 15 is lowered by the driving force from the driving device 43, the lever 40 comes into contact with the spring 42 on the way of descending. After the contact, a force, which is obtained by subtracting a spring force of the spring 42 from the driving force of the driving device 43, is applied onto the lever 40. Thus, the lowering speed of the floating-type magnetic head 15 is decreased. On the other hand, when the magnetic head 15 is raised, the raising speed is increased with the receipt of the spring force from the spring 42.

Additionally, the same speed control as described above may be achieved by the use of cams.

Referring to FIGS. 25 through 28, the following description will discuss the fifth embodiment of the present invention. Here, for convenience of explanation, those of the members having the same functions and described in the aforementioned embodiments are indicated by the same reference numerals and the description thereof is omitted.

Figure 25:
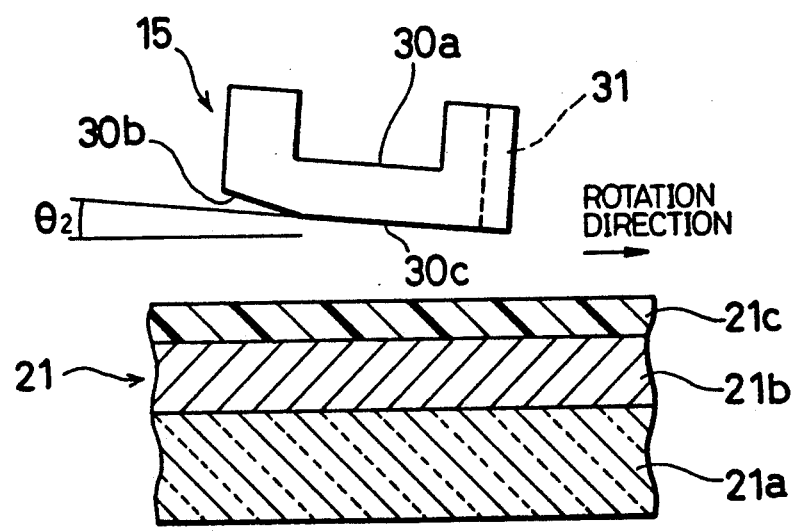
FIGS. 25 through 28 show the fifth embodiment of the present invention.

As shown in FIG. 25, a magneto-optical disk device of the present embodiment is different from that of the aforementioned embodiments in that the floating-type magnetic head 15 is raised in such a position that an inclined portion 30b of the slider 30 (an end from which air flows in) is kept slightly higher than the other portion, that is, $\theta_2$ is kept on the order of 1°.

Figure 26:
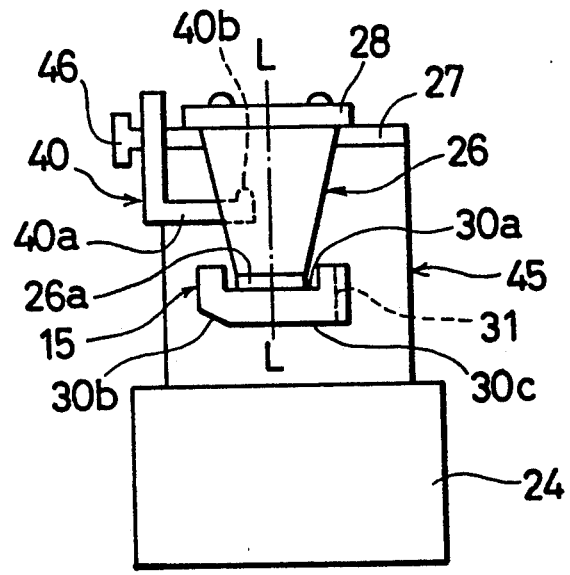
Figure 27:
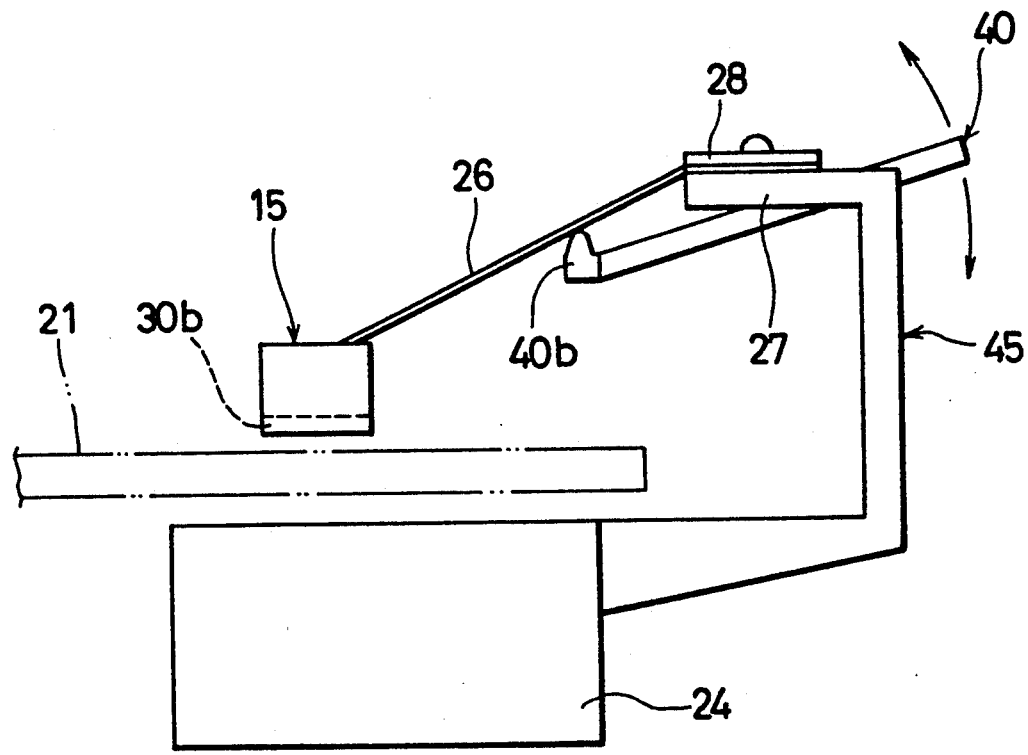

As shown in FIGS. 26 and 27, the magneto-optical disk device is provided with an optical head 24, an arm 45 for supporting a suspension 26, which is roughly U-shaped and secured to the optical head 24 at the lower end thereof, and the suspension 26 which, together with a metal plate 28, is fixed to a fixing section 27 of the upper end of the arm 45.

The end portion 26a of the suspension 26 is fixed to a grooved portion 30a provided on the upper part of the slider 30. The inclined portion 30b is formed in the bottom surface of the slider 30 at the front portion thereof, when seen from the rotation direction of the magneto-optical disk 21. The inclined portion 30b is followed by a flat portion 30c. Further, a magnetic head 31 is installed at the rear portion of the slider 30, when seen from the rotation direction of the magneto-optical disk 21.

A lever 40, which is roughly L-shaped and has a supporting portion 40a extending in substantially parallel with the surface of the magneto-optical disk 21, is freely pivotally supported to the arm 45 at the fixing section 27 by a machine screw 46. A projecting section 40b at the end of the supporting portion 40a is adapted to come into contact with the bottom surface of the suspension 26.

By pivoting the lever 40 on the machine screw 46 as a fulcrum, with the projecting section 40b contacting the bottom surface of the suspension 26, the suspension 26 is pivoted upward, thereby raising the slider 30 upward. Thus, the slider 30 can be maintained at a position were no contact occurs against the magneto-optical disk 21.

It is arranged that the projecting section 40b contacts the bottom surface of the suspension 26 at a position that departs from the center line L—L, drawn in the lengthwise direction of the suspension 26, toward the inclined portion 30b of the slider 30; therefore, as shown in FIG. 25, when the lever 40 lifts the slider 30 by way of the suspension 26, the slider 30 is raised in the position such that the end from which air flows in is kept slightly higher than the other portion.

In the case of raising the slider 30 in the position wherein the inclined portion 30b of the slider 30 is kept slightly higher than the other portion, the inclination $\theta_2$ of the flat portion 30c is preferably set to be on the order of 1°.

The magneto-optical disk 21 is constituted of, for example, a substrate 21a made of glass or a transparent resin such as polycarbonate, a magneto-optical recording medium 21b made of a rare earth-transition metal alloy thin film or the like, and a protective film 21c. As the protective film 21c, for example, a resin such as SD 301 manufactured by Dainippon Ink And Chemicals, Incorporated may be employed.

In the above arrangement, during stoppage of the rotation of the magneto-optical disk 21, as shown in FIG. 27, the slider 30 is maintained in the state where it is raised by the lever 40 through the suspension 26. Here, no contact exists between the slider 30 and the surface of the magneto-optical disk 21.

When recordings are to be made on the magneto-optical disk 21, the magneto-optical disk 21 is rotated by the spindle motor 12 (see FIG. 13) and, after the rotating speed of the magneto-optical disk 21 has reached a predetermined value, the lever 40 is pivoted upward. Thus, the slider 30 is released with a small gap from the magneto-optical disk 21.

In this case, the projecting section 40b has contacted the bottom surface of the suspension 26 at the position that departs from the center line L—L of the suspension 26 toward the inclined portion 30b, and thereby the slider 30 has been maintained in the position wherein the inclined portion 30b is kept slightly higher than the other portion; therefore, when released, the slider 30 receives a great floating pressure upon the whole flat portion 30c and floats above the magneto-optical disk 21 without contacting the surface of the magneto-optical disk 21.

Thereafter, a magnetic field that is inverted according to information to be recorded is applied from the magnetic head 31 onto the magneto-optical disk 21 at the same time that a light beam is projected from the optical head 24 onto the magneto-optical disk 21, thereby permitting the information to be magneto-optically recorded on the magneto-optical recording medium 21b. Moreover, when the recording has been completed, the lever 40 is again pivoted downward such that the slider 30 is raised through the suspension 26 and maintained at a level away from the magneto-optical disk 21, and then the rotation of the magneto-optical disk 21 is stopped.

In this manner, information is recorded without letting the slider 30 contact the surface of the magneto-optical disk 21.

On the other hand, during reproduction, a light beam is projected from the optical head 24 onto the magneto-optical disk 21, and by detecting the rotation of the polarization plane in the light reflected therefrom, the information is optically reproduced. Additionally, during reproduction, the slider may be constantly kept in the lifted state, for example, by means of the lever 40 through the suspension 26.

Figure 28:
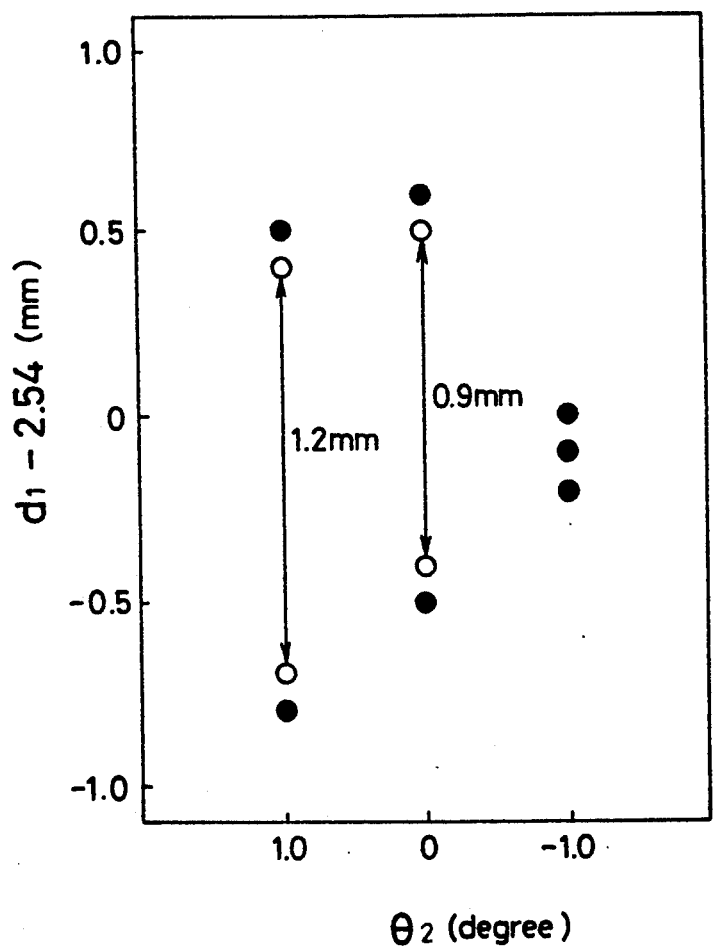

After observing the variation of the angle $\theta_2$ between the flat portion 30c and the surface of the magneto-optical disk 21, a range of [$d_1$ (the height from the bottom surface of the slider 30 to the fixing section 27)—2.54 mm], wherein the slider 30 can be raised and lowered without contact, is indicated in FIG. 28. In this case, the suspension 26 was employed, whereby the center of a non-contact area was represented by $d_1 = 2.54$ mm.

Here, the plus region in the horizontal axis represents that the flat portion 30c is inclined with the inclined portion 30b side higher than the magnetic head side, while the minus region therein represents that the flat portion 30c is inclined with the inclined portion 30b side lower than the magnetic head side.

In FIG. 28, open circles indicate the cases where, when released, the slider 30 is able to float above the magneto-optical disk 21 without contacting it. Solid circles indicate the cases where, when the slider 30 is released, contact occurs between the slider 30 and the magneto-optical disk 21 before the slider starts floating and comes into a stable floating state above the surface of the magneto-optical disk 21.

When $\theta_2 = 0°$ (that is, the slider 30 is released after keeping the state where the flat portion 30c of the slider 30 is parallel to the surface of the magneto-optical disk 21), the range of $d_1$, where the slider 30 is able to float without contacting the magneto-optical disk 21, is of the order of 0.9 mm. On the other hand, when $\theta_2 = 1°$ (that is, the slider 30 is released after keeping the state where the inclined portion 30b side is higher than the other side by 1°), the range of $d_1$ where the slider 30 is able to float without contacting the magneto-optical disk 21, is increased to the order of 1.2 mm.

On the contrary, when $\theta_2 = -1°$ (that is, the slider 30 is released after keeping the state where the inclined portion 30b side is lower than the other side by 1°), it becomes impossible to float the slider 30 without contact against the magneto-optical disk 21.

As described above, according to the present embodiment, compared with those conventionally used, the conditions under which the slider 30 can be floated without contact, are much more alleviated; and this results in an advantage that the mechanical design of the magneto-optical disk device equipped with the floating-type magnetic head 15 can be easily made.

Figure 29:
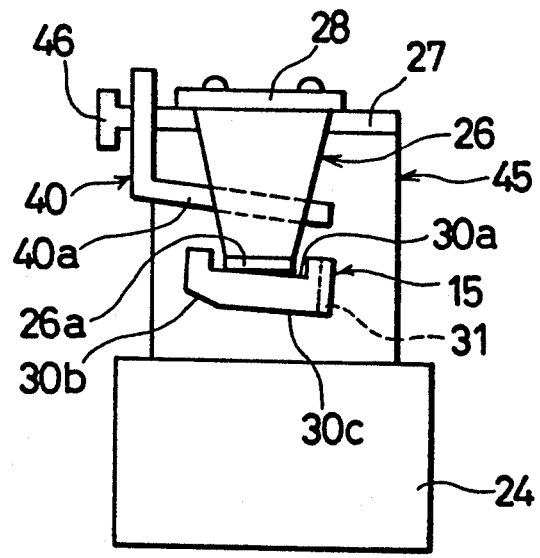
FIG. 29 is a schematic front view showing a magneto-optical disk device that is provided with the floating-type magnetic head, and illustrates the sixth embodiment of the present invention.

Referring to FIGS. 29, the following description will discuss the sixth embodiment of the present invention. Here, for convenience of explanation, those of the members having the same functions and described in the aforementioned embodiments are indicated by the same reference numerals and the description thereof is omitted.

As shown in FIG. 29, a magneto-optical disk device of the present embodiment is different from that of the fifth embodiment in that the supporting portion 40a of the lever 40 is inclined by approximately 1° with respect to the surface of the magneto-optical disk 21 so as to keep the inclined portion 30b side of the slider 30 higher than the other side thereof.

In the above arrangement, when the suspension 26 is raised and held by the lever 40, the slider 30 is maintained in such a position that the inclined portion 30b side is higher than the other side.

Additionally, the present embodiment is to give one example of the slider 30 wherein an inclined position of the slider 30 is achieved by devising the shape of the lever 40. Therefore, any shape of the lever 40 other than the one shown in FIG. 29 may be adopted as long as the slider 30 is maintained in the position such that the inclined portion 30b side is higher than the other side.

Figure 30:
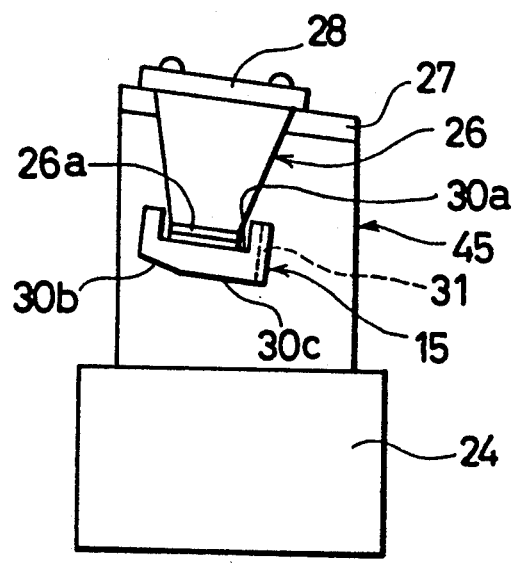
FIG. 30 is a schematic front view showing a magneto-optical disk device that is provided with the floating-type magnetic head, and illustrates the seventh embodiment of the present invention.

Referring to FIG. 30, the following description will discuss the seventh embodiment of the present invention. Here, for convenience of explanation, those of the members having the same functions and described in the sixth embodiment are indicated by the same reference numerals and the description thereof is omitted.

As shown in FIG. 30, a magneto-optical disk device of the present embodiment is different from that of the sixth embodiment in that the fixing member 27 of the arm 45 is inclined so as to keep the inclined portion 30b side of the slider 30 higher than the other side thereof.

In the above arrangement, when the slider 30 is held by the lever 40 (not shown) through the suspension 26 (for example, in an horizontal position), the slider 30 is maintained in such a position that the inclined portion 30b side is higher than the other side.

Additionally, the present embodiment is to give one example of the arrangement wherein an inclined position of the slider 30 can be achieved by inclining the base of the suspension 26. Therefore, another method such as to dispose an inclined spacer onto the fixing member 27 may be adopted in order to incline the base of the suspension 26.

Referring to FIGS. 31 through 34, the following description will discuss the eighth embodiment of the present invention. Here, for convenience of explanation, those of the members having the same functions and described in the aforementioned embodiments are indicated by the same reference numerals and the description thereof is omitted.

Figure 31:
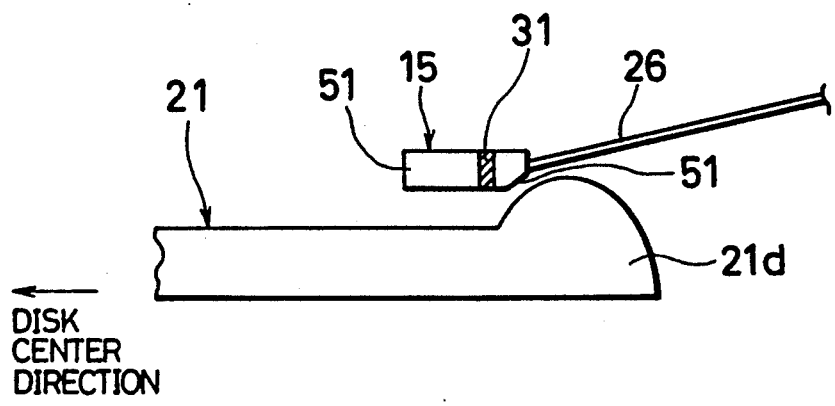
FIGS. 31 through 34 show the eighth embodiment of the present invention.

As shown in FIG. 31, a magneto-optical disk device of the present embodiment is different from that of the aforementioned embodiments in that a bevelled portion 51a is provided in the bottom surface of the slider 51 at the corner that faces the outer edge of the magneto-optical disk 21 in the floating-type magnetic head 15.

Figure 32:
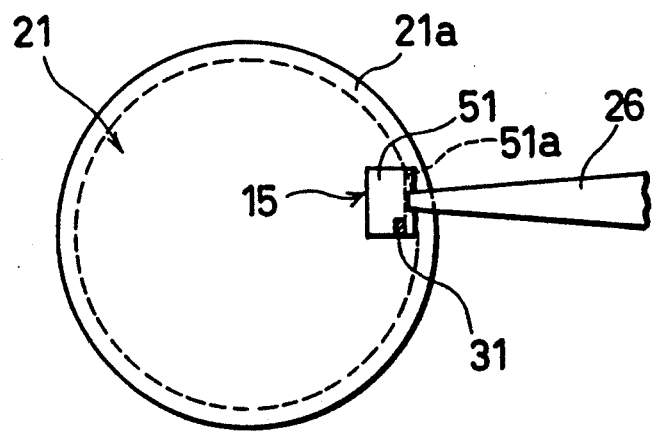

As shown in FIGS. 31 and 32, the floating-type magnetic head 15 is provided with the slider 51 and a magnetic head 31 (shown by hatching for convenience) that is secured to the rear end portion of the slider 51, when seen from the rotation direction of the magneto-optical disk 21.

The floating-type magnetic head 15, which is supported by the suspension 26 while receiving a force on the order of several grams toward the magneto-optical disk 21, is designed to float above the surface of the magneto-optical disk 21 with a gap of several $\mu$m as the magneto-optical disk 21 rotates (at a rotating speed of, for example, 1800 to 4000 rpm.)

The magneto-optical disk 21 is constituted of a substrate (for example, made of polycarbonate), a vertically magnetized film formed on the substrate, and a protective film made of resin which covers the vertically magnetized film. There exists a ridge 21d along the outer edge of the magneto-optical disk 21.

The corner between the bottom surface of the slider 51 and the side thereof facing the ridge 21d is chamfered such as to form the inclining bevelled portion 51a. With this structure, when the floating-type magnetic head 15 approaches the ridge 21d, it is allowed to move further to the outer edge of the magneto-optical disk 21, compared with the conventional ones, since the bevelled portion 51a makes it possible to avoid the ridge 21d. Thus, the storage capacity of the magneto-optical disk 21 can be virtually increased.

Here, experiments were conducted, wherein possible contact between the floating-type magnetic head 15 and the ridge 21d was detected by an AE sensor manufactured by Fuji Electric Co., Ltd, under the conditions that the floating-type magnetic head 15 was raised and lowered in a cycle of approximately 2 seconds at a radial position of 41 mm of a 3.5-inch magneto-optical disk 21 that was rotating at 3600 rpm.

Figure 33:
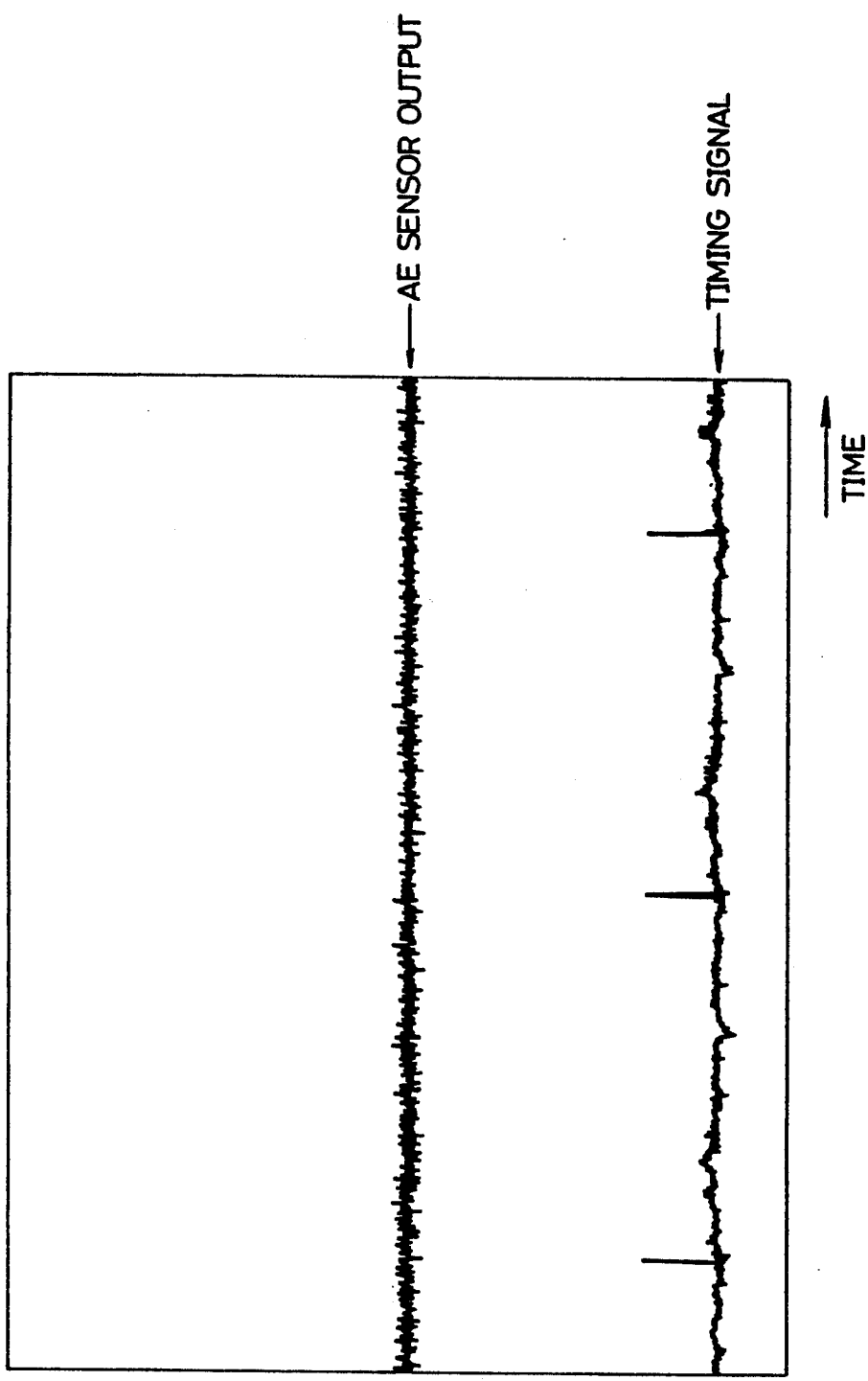

FIG. 33 shows the experimental results. In this drawing, waveforms shown above represent AE signals, while those shown below are timing signals.

Figure 34:
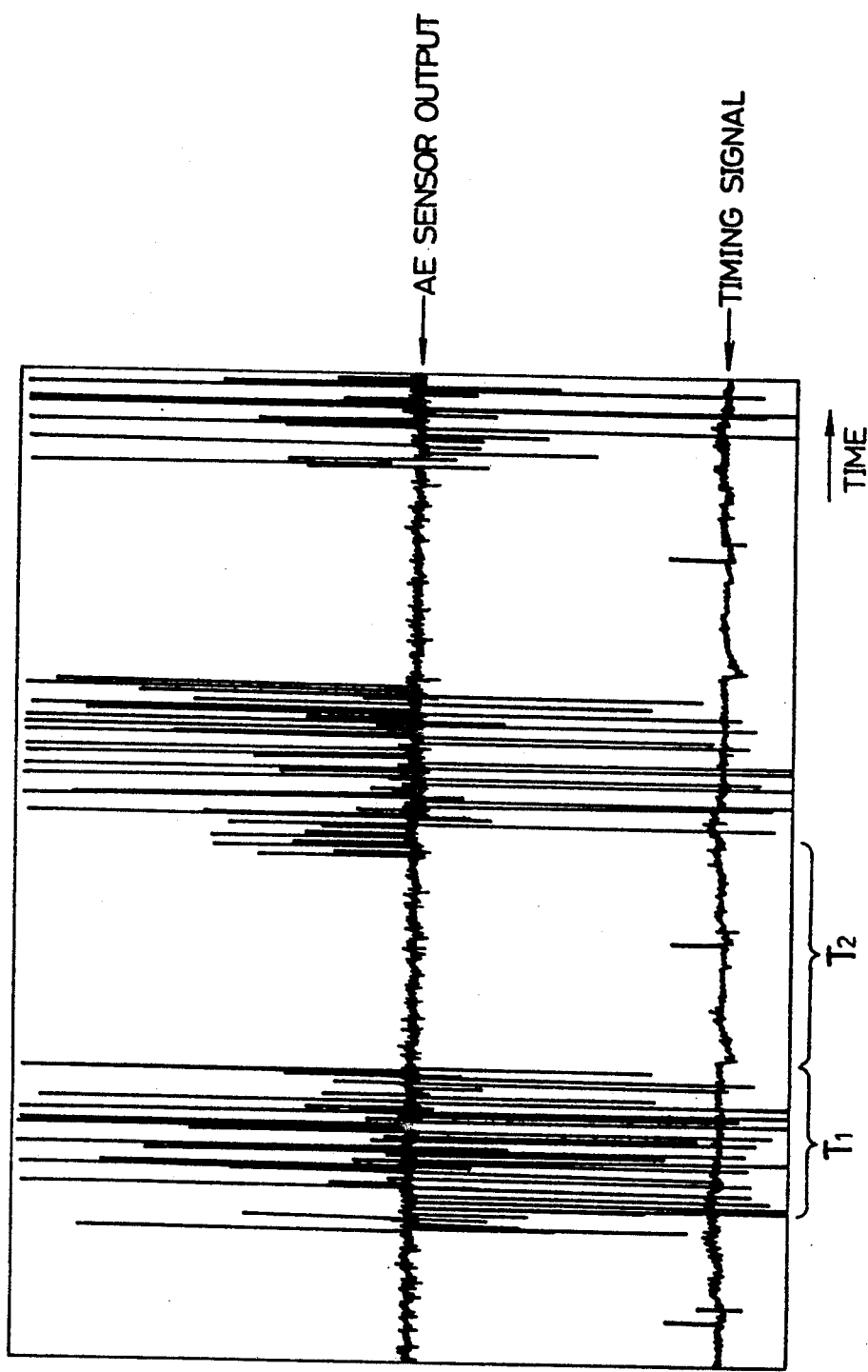

On the other hand, for comparison, the same experiments were conducted with respect to a floating-type magnetic head not provided with the bevelled portion 51a in its slider 51. FIG. 34 shows the experimental results.

In FIG. 34, during a time region $T_1$, the floating-type magnetic head was in close proximity to the magneto-optical disk 21, while during a time region $T_2$, the floating-type magnetic head was away from the magneto-optical disk 21. During the time region $T_1$, contact signals detected by the AE sensor were remarkably great; this shows that the floating-type magnetic head was contacting the ridge 21d.

On the contrary, as is understood by the waveforms of FIG. 33, in the case of the floating-type magnetic head 15 of the present embodiment, no contact occurred against the ridge 21d with the aid of the bevelled portion 51a, even during the close-proximity state to the magneto-optical disk 21.

Additionally, when the bevelled portion 51a is formed in the slider 51, the bottom surface area of the slider 51 is slightly decreased; however, it is assured as a result of computer simulations that a sufficient floating gap can be obtained. For example, when the size of the bottom surface area was 5 mm×7 mm and a pressing load of 5 gf was applied, the floating gap without the bevelled portion 51a was 5 $\mu$m while the floating gap with the bevelled portion 51a was 4.8 $\mu$m.

Figure 35:
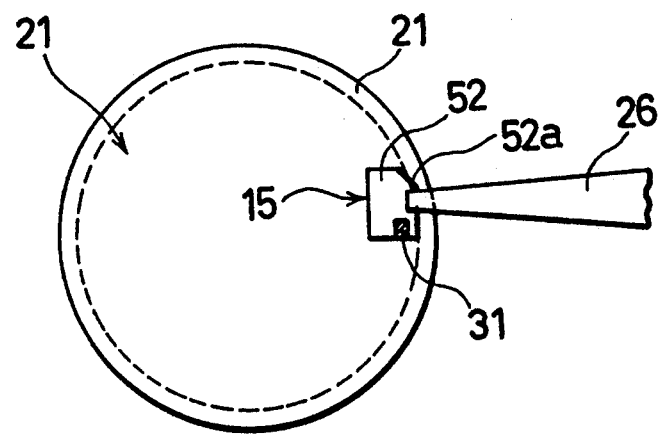
FIGS. 35 and 36 show the ninth embodiment of the present invention.
Figure 36:
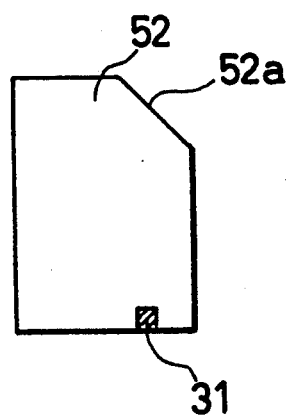

Referring to FIGS. 35 and 36, the following description will discuss the ninth embodiment of the present invention. Here, for convenience of explanation, those of the members having the same functions and described in the eighth embodiment are indicated by the same reference numerals and the description thereof is omitted.

As shown in FIGS. 35 and 36, a magneto-optical disk device of the present embodiment is different from that of the eighth embodiment in that, in the floating-type magnetic head 15, a straight bevelled portion 52a is formed in a slider 52 at the front corner that is closer to the outer edge of the magneto-optical disk 21.

The floating-type magnetic head 15 is provided with the slider 52 and the magnetic head 31 (indicated by hatching for convenience) that is secured to the rear end of the slider 52, when seen from the rotation direction of the magneto-optical disk 21. Since contact between the floating-type magnetic head 15 and the ridge 21d of the magneto-optical disk 21 tends to occur at the front corner of the slider 52 that is closer to the outer edge of the magneto-optical disk 21, the bevelled portion 52a is formed in this corner.

As with the aforementioned embodiment, experiments were conducted, wherein possible contact between the floating-type magnetic head 15 and the ridge 21d was detected by an AE sensor manufactured by Fuji Electric Co., Ltd.

As a result, it has been ensured that no contact occurred against the ridge 21d with the aid of the bevelled portion 52a, even during the close-proximity state to the magneto-optical disk 21.

Figure 37:
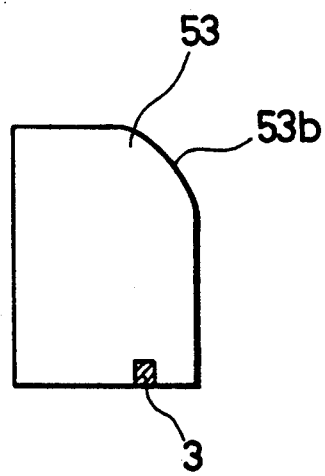
FIG. 37 is a schematic plan view showing a floating-type magnetic head of a magneto-optical disk device, and illustrates the tenth embodiment of the present invention.

Referring to FIG. 37, the following description will discuss the tenth embodiment of the present invention. Here, for convenience of explanation, those of the members having the same functions and described in the aforementioned embodiments are indicated by the same reference numerals and the description thereof is omitted.

As shown in FIG. 37, a magneto-optical disk device of the present embodiment is different from that of the aforementioned embodiments in that, in the floating-type magnetic head 15, a rounded bevelled portion 53a is formed in a slider 53 at the front corner thereof that is closer to the outer edge of the magneto-optical disk 21.

In the present embodiment, it has also been ensured that no contact occurred against the ridge 21d with the aid of the bevelled portion 53a, even during the close-range state to the magneto-optical disk 21.

Referring to FIGS. 38 through 47, the following description will discuss the eleventh embodiment of the present invention. Here, for convenience of explanation, those of the members having the same functions and described in the aforementioned embodiments are indicated by the same reference numerals and the description thereof is omitted.

A magneto-optical disk device of the present embodiment is different from those of the aforementioned embodiments in that a 3.5-inch magneto-optical disk cartridge is employed for use therein.

Figure 45:
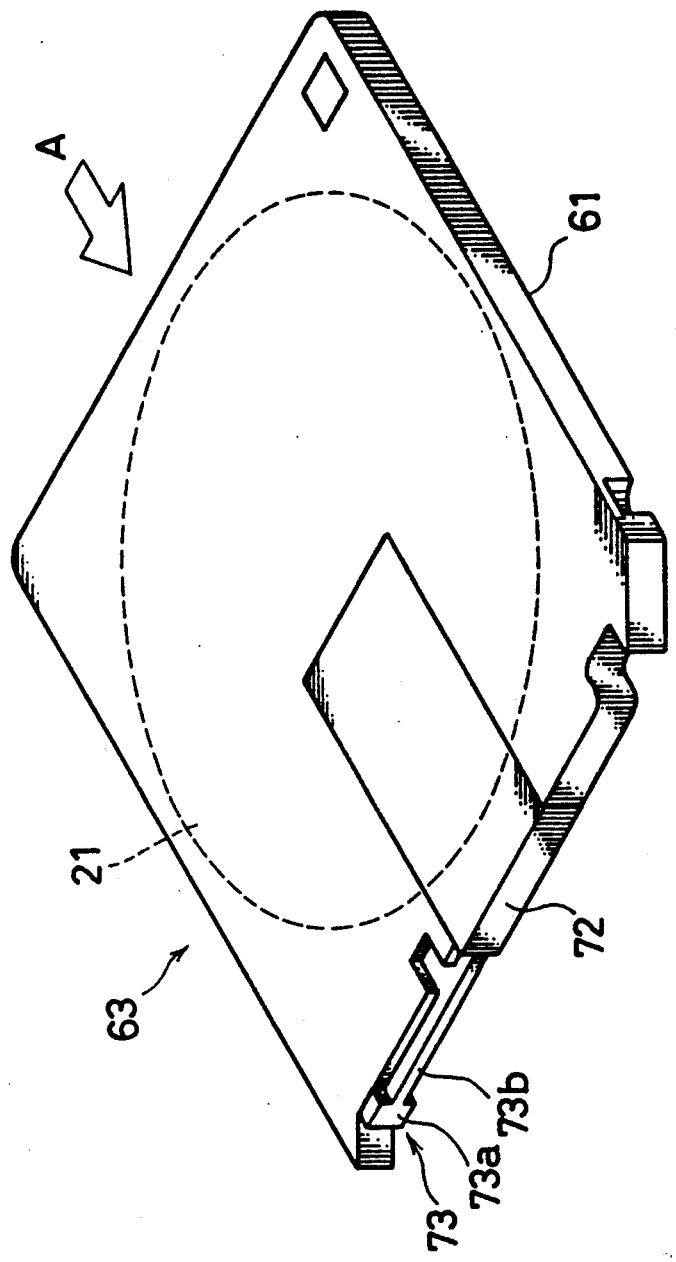
Figure 46:
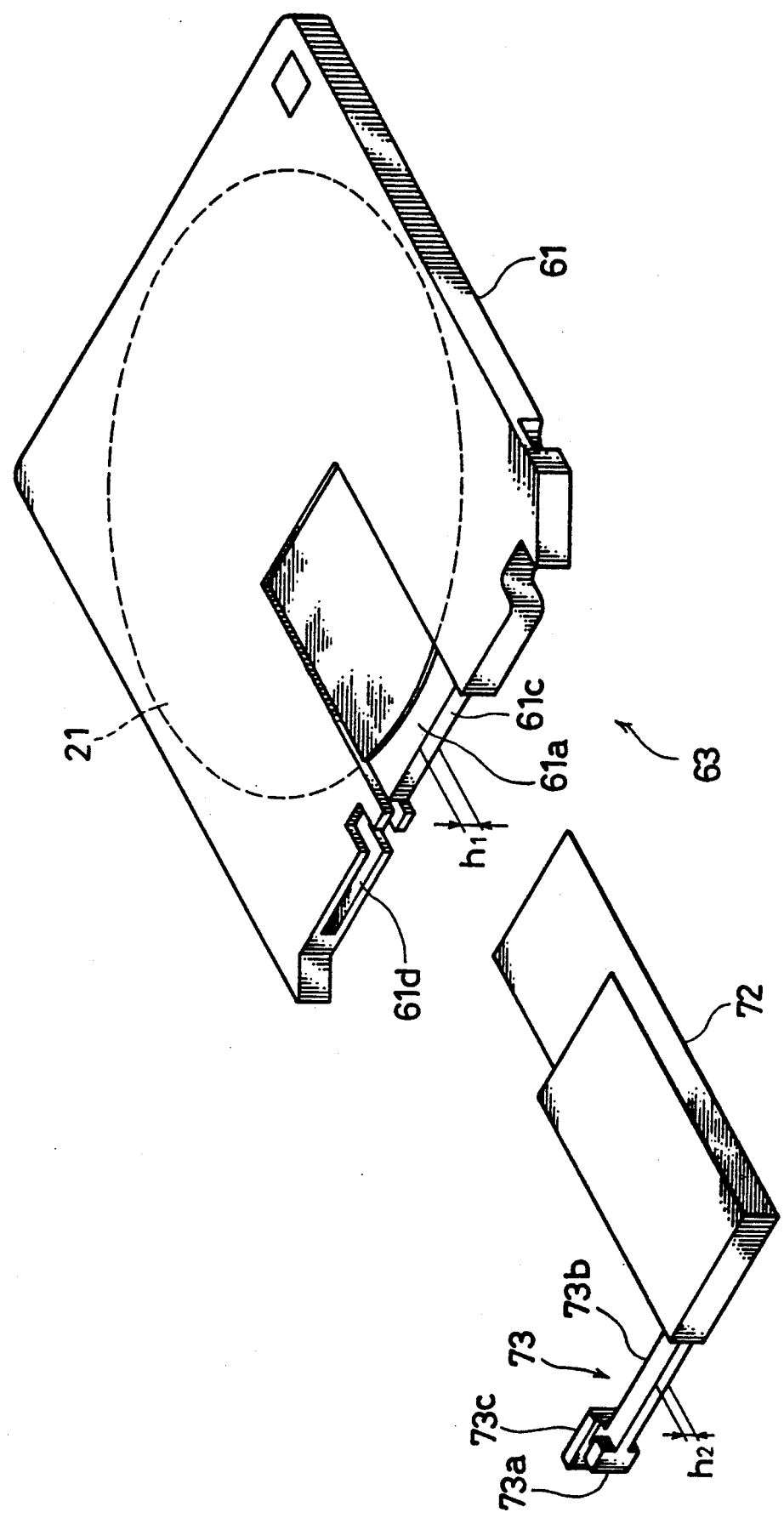

As shown in FIGS. 45 and 46, the magneto-optical disk 21 is placed into a case 61 of the magneto-optical disk cartridge 63. Openings 61a are formed in the top face and the bottom face of the case 61. In the case where the magneto-optical disk cartridge 63 is inserted into the magneto-optical disk device in a direction A (see FIG. 45), the openings 61a are formed in the end face of the case 61 at the inserting side.

A bridge section 61c is installed in the openings 61a with a view to increasing the strength of the case 61. Further, a groove 61d is formed in the end face at the inserting side, beside the openings 61a. As a sliding member 73 slides along the groove 61d, a shutter 72, which is provided as an integral part of the sliding member 73, is opened and closed.

The sliding member 73 is constituted by a fitting section 73c, which slides inside the groove 61d, an engaging section 73a, which slides along the wall of the groove 61d with the wall sandwiched between the fitting section 73c and itself, and a connecting section 73b for connecting the engaging section 73a and the fitting section 73c to the shutter 72, and all these sections are integrally formed. The width $h_1$ of the bridge section 61c and the width $h_2$ of the connecting section 73b are set to, for example, approximately 2 mm.

Figure 47:
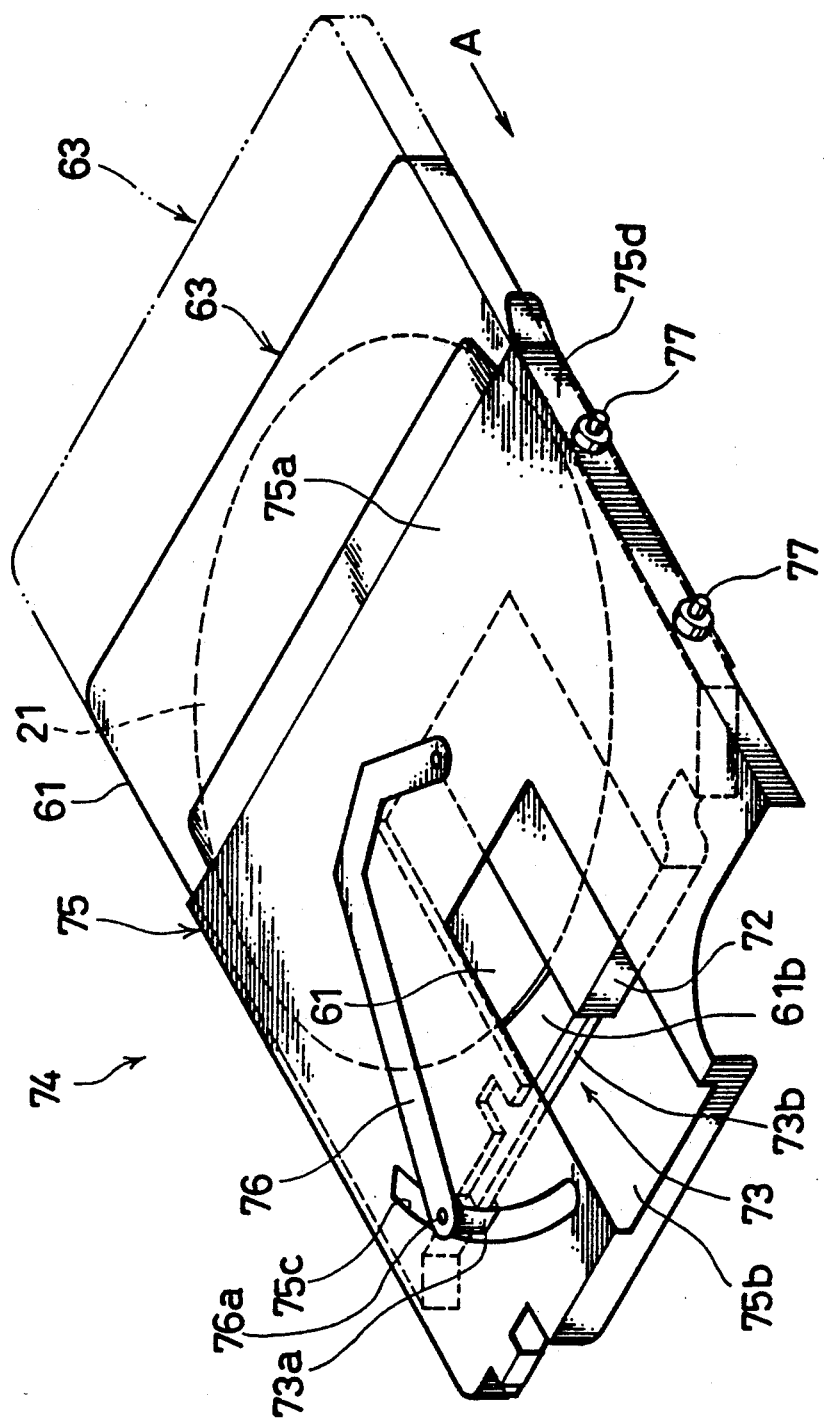
Figure 48:
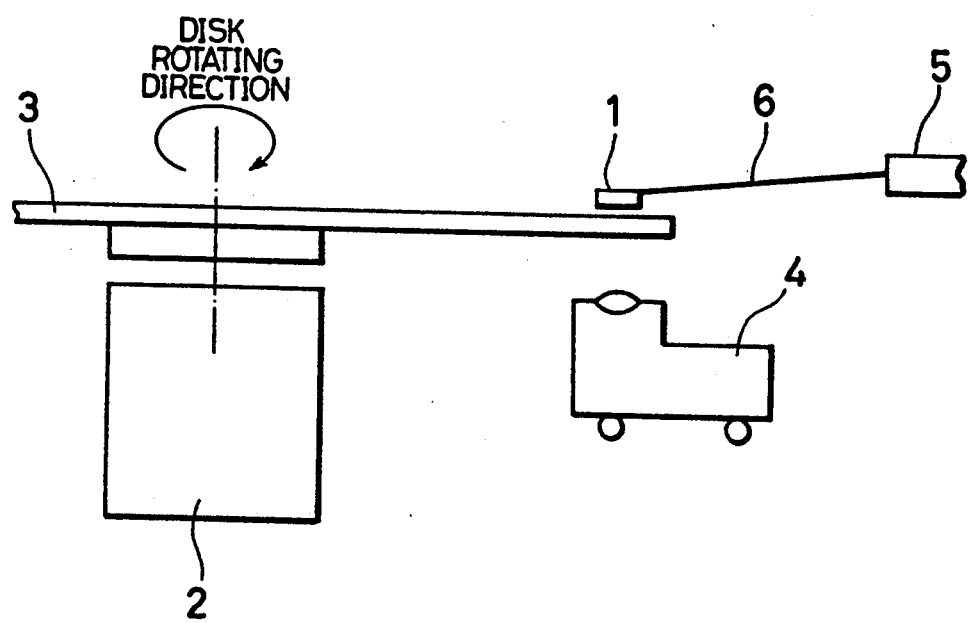
FIGS. 48 through 55 show the prior art.
Figure 49:
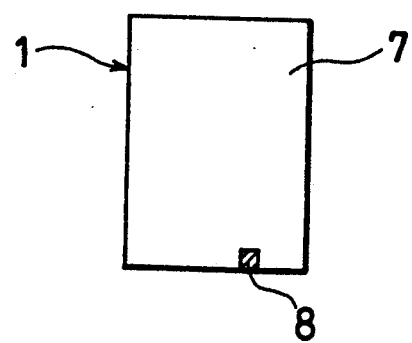
Figure 50:
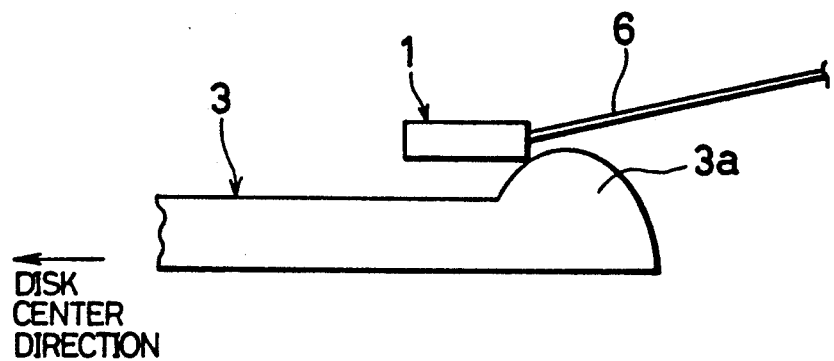
Figure 51:
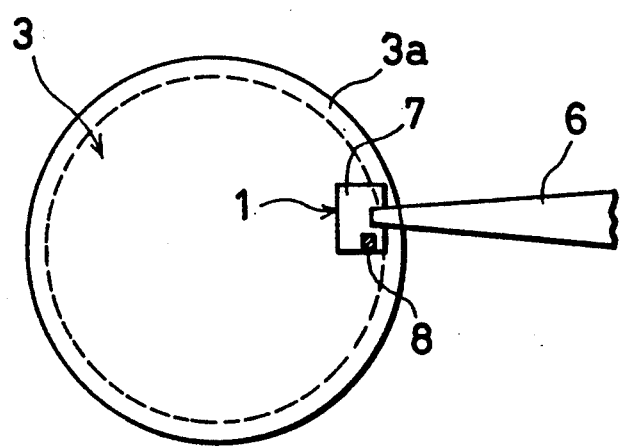
Figure 52:
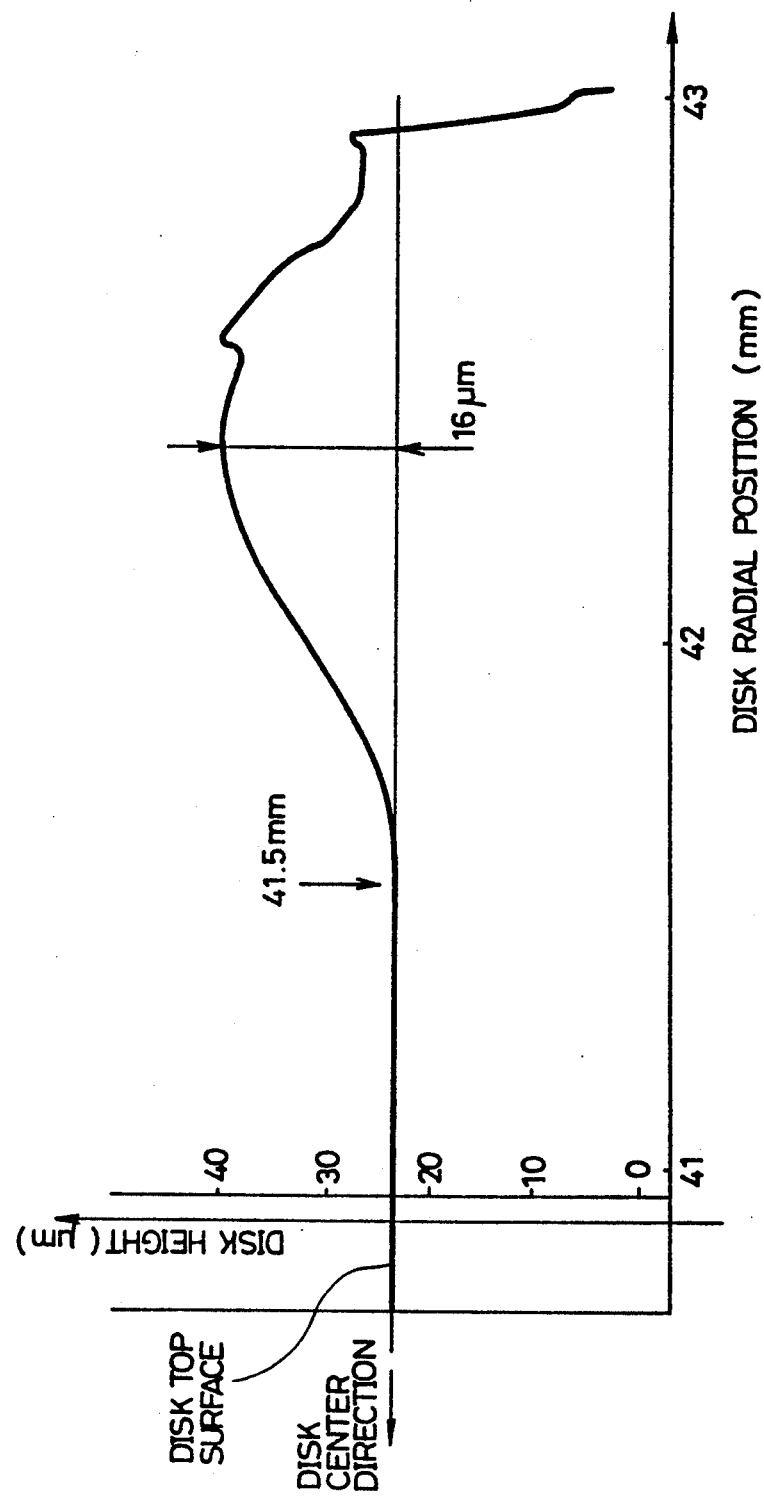
Figure 53:
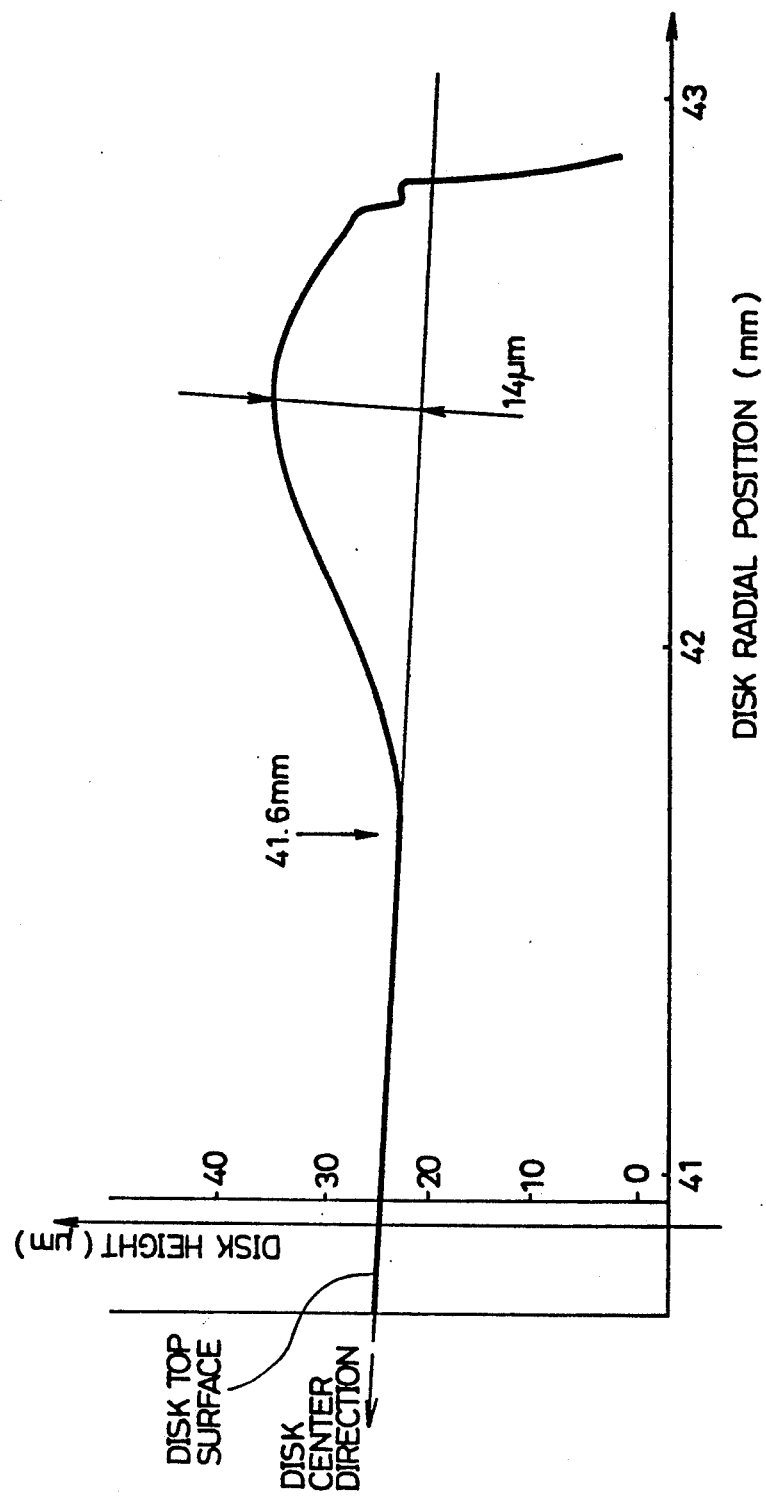
Figure 54:
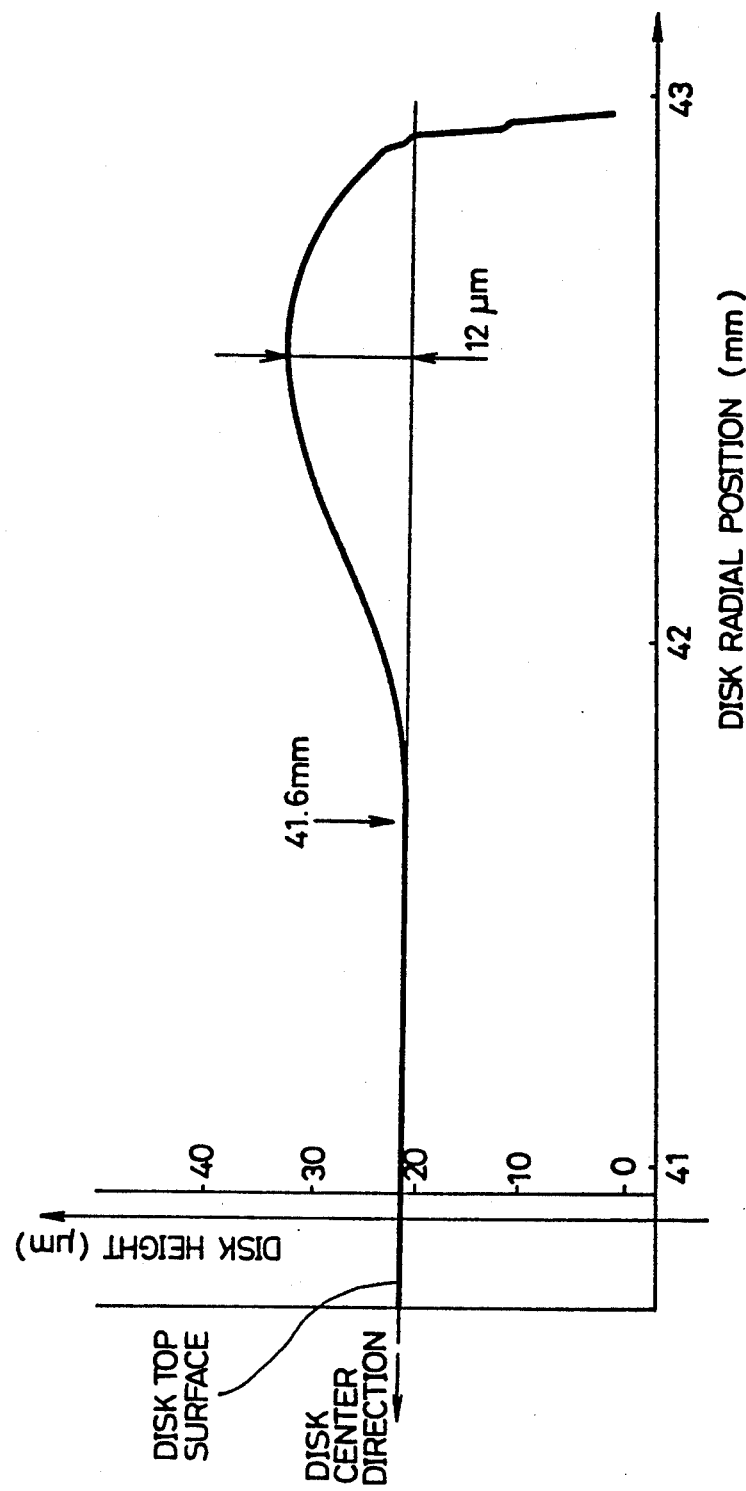
Figure 55:
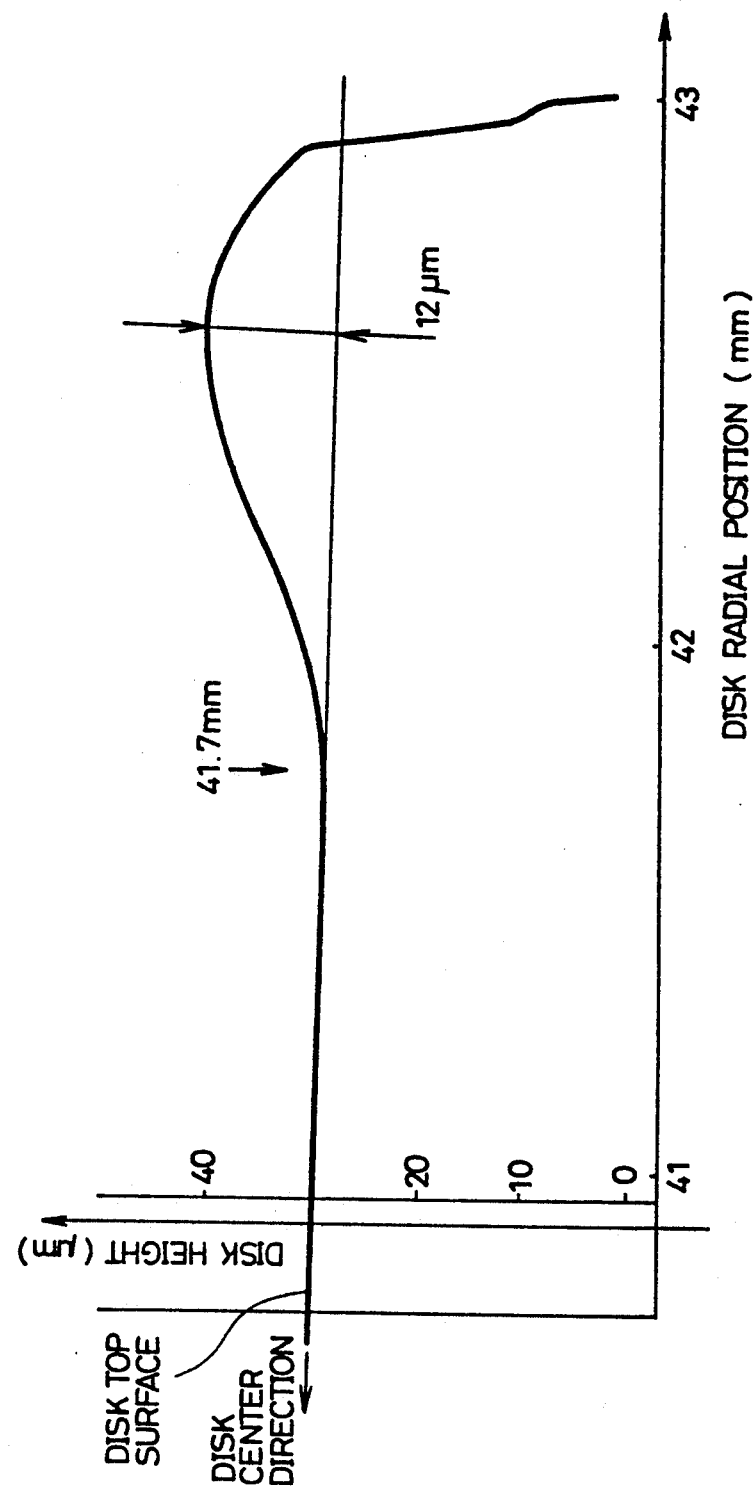

As shown in FIG. 47, a cartridge holder 74, which is provided in the magneto-optical disk device, has a holder frame 75 into which the magneto-optical disk cartridge 63 is inserted.

Guiding pins 77 for positioning the inserted magneto-optical disk carriage 63 are attached to a side face 75d of the holder frame 75. Further, the holder frame 75 has an opening 75b that is formed so as to match the opening 61a of the magneto-optical disk cartridge 63 which is to be inserted in the direction A.

Located beside the opening 75b, a guiding slit 75c is formed in such a manner that the sliding member 73 can be moved in the direction orthogonal to the inserting direction of the magneto-optical disk cartridge 63, which mechanism will be described later. An arm 76 is pivotally supported near the center of the top face of the holder frame 75, and a pin 76a is attached to the pivotal end of the arm 76 in such a manner as to project inside the guiding slit 75c.

When the magneto-optical disk cartridge 63 is inserted into the cartridge holder 74 in the direction A, the pin 76a comes into contact with the engaging section 73a of the incoming sliding member 73, and is moved along the guiding slit 75c. Thus, the arm 76 is pivoted.

When the arm 76 is pivoted, the engaging section 73a is pushed by the pin 76a in the direction orthogonal to the direction A. This causes the sliding member 73 to slide along the groove 61d with the result that the shutter 72 is opened. When the insertion of the magneto-optical disk cartridge 63 is stopped by the guiding pin 77, the shutter 72 is fully opened.

After the shutter 72 has been completely opened, the magneto-optical disk cartridge 63, together with the cartridge holder 74, is drawn into the magneto-optical disk device. Then, the cartridge holder 74 is lowered such that the magneto-optical disk 21 is chucked by the spindle motor 12 (see FIG. 41).

As shown in FIG. 40, in the magneto-optical disk device before the loading of the magneto-optical disk cartridge 63, the optical head 24 and the floating-type magnetic head 15 connected to the optical head 24 are located at a stand-by position where they are free from contacting with the incoming magneto-optical disk cartridge 63.

When the magneto-optical disk cartridge 63 is loaded, the shutter 72 is fully opened, as described earlier. Thus, the magneto-optical disk 21 is exposed through the openings 61a. Successively, a shown in FIG. 41, the cartridge holder 74 is lowered, and the magneto-optical disk 21 is chucked by the spindle motor 12.

Figure 42:
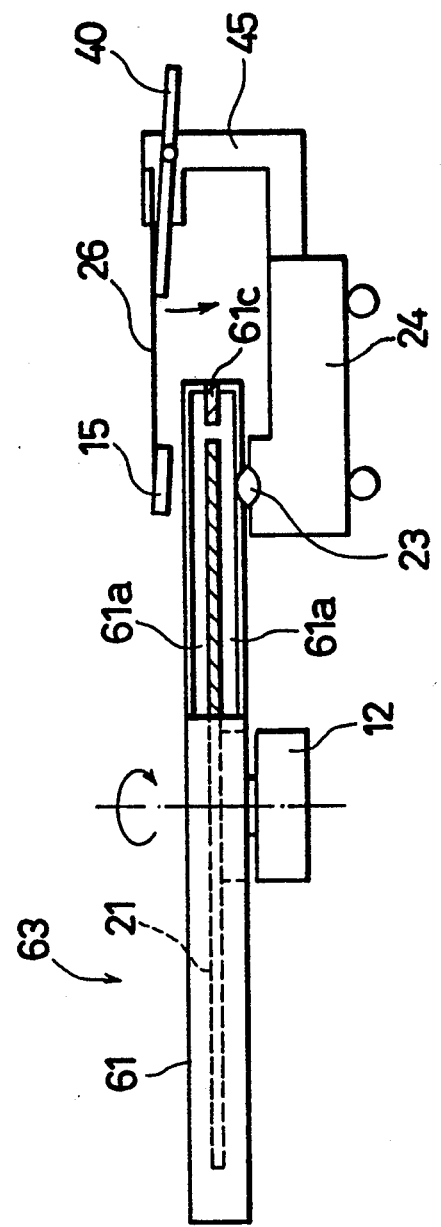
Figure 43:
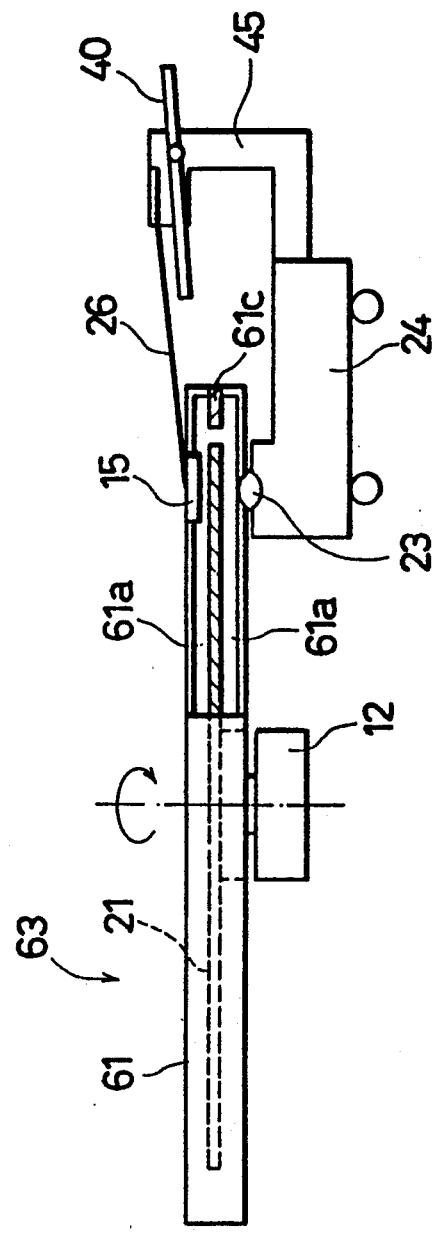

Thereafter, the magneto-optical disk 21 is rotatively driven by the spindle motor 12. After the magneto-optical disk 21 has reached a normal rotating speed, the floating-type magnetic head 15 and the optical head 24, as shown in FIG. 42, are moved to a predetermined radial position (hereinafter, referred to as descent position). Then, as shown in FIG. 43, the floating-type magnetic head 15 is lowered through the openings 61a toward the magneto-optical disk 21 by the pivotal movement of the lever 40, and thus floats above the magneto-optical disk 21 without contacting it.

The descent position is set to be located near the outermost track of the magneto-optical disk 21 so that the floating-type magnetic head 15 can receive the greatest lift from the air flow. This results in the most stable floating state of the floating-type magnetic head 15.

Figure 44:
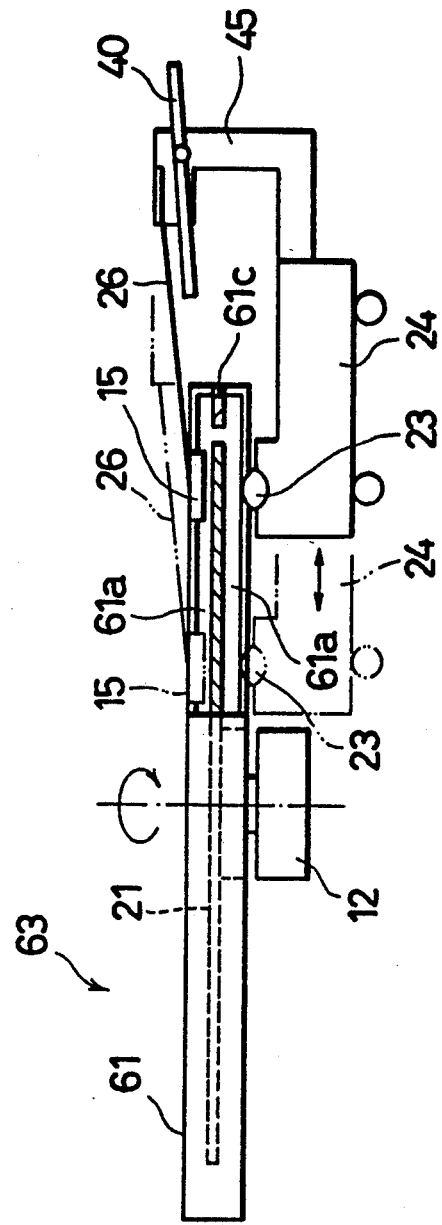

Thereafter, as shown in FIG. 44, the floating-type magnetic head 15 and the optical head 24 are moved to a desired access position on the magneto-optical disk 21 by the linear motor (not shown). Additionally, a driving means for moving the floating-type magnetic head 15 and the optical head 24 from the stand-by position to the descent position is installed as a separate means different from the above-mentioned linear motor.

Referring to FIG. 38 and FIGS. 40 through 44, the following description will discuss the loading method of the magneto-optical disk cartridge 63 more specifically. Additionally, in FIGS. 40 through 44, although the cartridge holder 74 is not illustrated, it is assumed that, in practice, the magneto-optical disk cartridge 63 is placed inside the cartridge holder 74.

Here, the period from the start of loading until the start of recording (or reproducing) is roughly divided into five periods. More specifically, a period of time, $t_0-t_4$, is referred to as an inserting period of the magneto-optical disk cartridge 63; a period of time, $t_4-t_7$, is referred to as an accelerating period of the rotation by the spindle motor 12; a period of time, $t_7-t_8$ is referred to as a moving period of the floating-type magnetic head 15 from the stand-by position to the descent position; a period of time, $t_8-t_{10}$, is referred to as a descending period of the floating-type magnetic head 15; and finally a period of time, $t_{10}$ and thereafter, is referred to as a floating period of the floating-type magnetic head 15.

At the initial state, time $t_0$, the shutter 72 of the disk cartridge 63 is closed, and the spindle motor 12 is stopped. As shown in FIG. 40, the floating-type magnetic head 15 and the optical head 24 are held at the stand-by position with a distance of, for example, 55 mm between the central axis of an objective lens 23 and the central axis of the spindle motor 12. Here, the floating-type magnetic head 15 remains raised by the lever 40, (where in the case of the distance, 55 mm, between the central axis of an objective lens 23 and the central axis of the spindle motor 12, the central axis position of the objective lens 23 is hereinafter indicated by R55.)

At the time $t_0$, the magneto-optical disk cartridge 63 is inserted into the cartridge holder 74 that is attached to the inside of the magneto-optical disk device. When the magneto-optical disk cartridge 63 is being inserted and the period of time $t_1$ has passed, the engaging section 73a of the sliding member 73 attached to the case 61 comes into contact with the pin 76a of the arm 76 that is attached to the holder frame 75 (see FIG. 47). When the magneto-optical disk cartridge 63 has been inserted and the period of time $t_2$ has passed, the shutter 72 is opened, and the openings 61a are fully opened.

Figure 41:
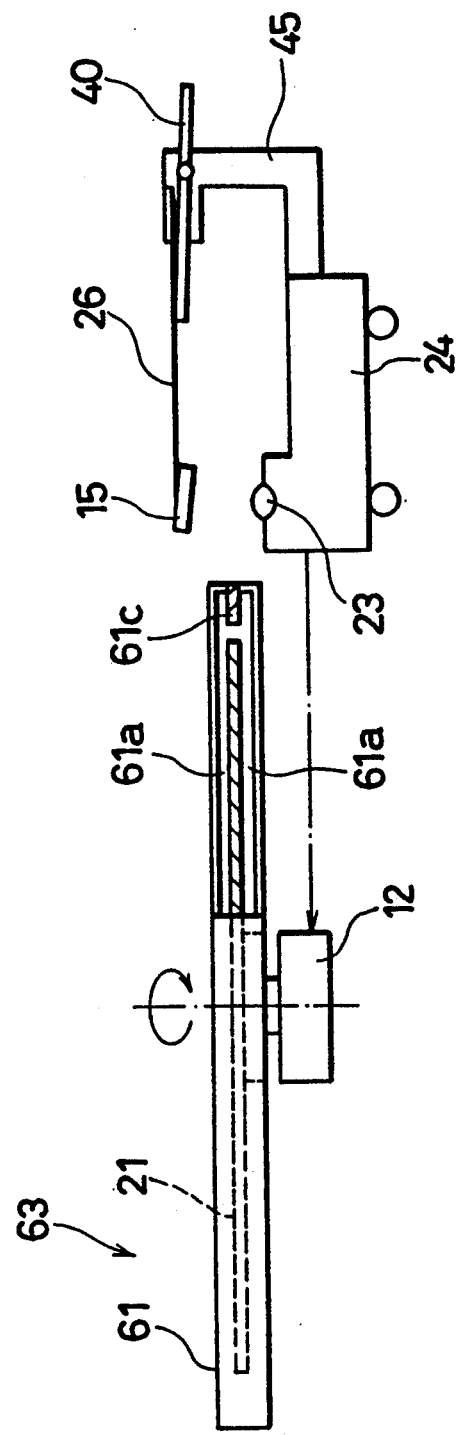

At the time $t_2$, the cartridge holder 74 containing the magneto-optical disk cartridge 63 is to be drawn into the device. As shown in FIG. 41, at the time $t_3$, the cartridge holder 74, which has reached an engaging position with the spindle motor 12, is gradually lowered. Then, at the time $t_4$, the chucking of the magneto-optical disk 21 onto the spindle motor 12 has been completed, and a signal indicating that the magneto-optical disk 21 has been placed on the predetermined station is released from, for example, a sensor. According to this signal, the spindle motor 12 starts rotating from the time $t_5$, which substantially coincides with the time $t_4$, and continues to accelerate until the time $t_7$. Additionally, after the time $t_4$, the magneto-optical disk 21 remains placed on the spindle motor 12.

On the other hand, the floating-type magnetic head 15 and the optical head 24 start moving toward a descent position (for example, R40) that is the outermost position within the operative range at the time $t_6$ that is slightly before the time $t_7$ when the spindle motor 12 reaches a steady speed (for example, 3600 rpm).

Additionally, the floating-type magnetic head 15 and the optical head 24 may be arranged to start moving toward the descent position at the time $t_5$ when the spindle motor 12 starts rotating. At this time, the floating-type magnetic head 15 is in a lifted-up state. When the floating-type magnetic head 15 and the objective lens 23 reach the descent position at the time $t_8$, the floating-type magnetic head 15 and the optical head 24 are stopped and held. At this time, a signal indicating that the floating-type magnetic head 15 has reached the descent position is released.

Thereafter, as shown in FIG. 42, at the time $t_9$, which substantially coincides with the time $t_8$, the lever 40 gradually releases the suspension 26. The suspension 26, which restores its original shape due to the elastic power, softly approaches the magneto-optical disk 21 in rotation while keeping such a position that the bottom surface of the slider is substantially parallel to the rotating surface of the magneto-optical disk 21. Then, without contacting the magneto-optical disk 21, the floating-type magnetic head 15 is floated by an air flow created by the rotation of the magneto-optical disk 21.

As a result, as shown in FIG. 43, at the time $t_{10}$, the floating-type magnetic head 15 enters a floating-state. Here, the lever 40 is stopped at a position where no contact occurs against the suspension 26. At the same time, as shown in FIG. 44, the floating-type magnetic head 15 and the optical head 24 are released, and while they are moved by the linear motor in the radial direction of the magneto-optical disk 21, recording (or reproducing) starts at the time $t_{11}$. The operative range of the floating-type magnetic head 15 and the optical head 24 with respect to, for example, a 3.5-inch magneto-optical disk 21 is set to R21-R40. The outer area from R40 is excluded so as to avoid warping that might occur along the outermost edge of the magneto-optical disk 21.

Referring to FIG. 39 and FIGS. 40 through 44, the following description will discuss the unloading method of the magneto-optical disk cartridge 63.

Here, the period from the operative state for recording (or reproducing) until the unloading of the magneto-optical disk cartridge 63 is divided into five periods. More specifically, a period of time, $t_0'-t_2'$, is referred to as a floating period of the floating-type magnetic head 15; a period of time, $t_2'-t_3'$, is referred to as a raising period of the floating-type magnetic head 15; a period of time, $t_3'-t_4'$ is referred to as a head retracting period of the floating-type magnetic head 15; a period of time, $t_4'-t_6'$ is referred to as a stopping period of the spindle motor 12; and finally a period of time, $t_6'$ and thereafter, is referred to as an unloading period of the magneto-optical disk cartridge 63.

At the time $t_0'$, the magneto-optical disk 21 is placed on the spindle motor 12 and the shutter 72 is opened. The spindle motor 12 is in a state of steady rotation (for example, 3600 rpm), and the floating-type magnetic head 15 and the optical head 24 are in operative states within the movable range of R21-R'. Further, the floating-type magnetic head 15 is floating above the magneto-optical disk 21.

When an instruction for ejecting the magneto-optical disk cartridge 63 is given at the time $t_1'$, the floating-type magnetic head 15 is returned to the descent position, R40. At the time $t_2'$ when the floating-type magnetic head 15 has returned to the descent position, the floating-type magnetic head 15 and the optical head 24 are stopped and held, and at the same time, the lever 40 raises the floating-type magnetic head 15 gently.

At the time $t_3'$, the floating-type magnetic head 15 has entered a predetermined lifted-up state and is held in the state. Simultaneously, the floating-type magnetic head 15 and the optical head 24 start withdrawing, and at the time $t_4'$, they have returned to the initial stand-by position R55, and are held in the state. At this time, a signal indicating that the floating-type magnetic head 15 and the optical head 24 have returned to the stand-by position is released. According to this signal, at the time $t_5'$, that substantially coincides with the time $t_4'$, the spindle motor, which has been steadily rotating, starts decreasing its speed, and stops at the time $t_6'$.

At the time $t_7'$ that substantially coincides with the time $t_6'$, according to a signal indicating the stoppage of the spindle motor 12, the cartridge holder 74 is raised gently, and thus the magneto-optical disk 21 is removed from the spindle motor 12. Then, in the period $t_8'-t_9'$, the cartridge holder 74 is returned back to the predetermined position, and at the time $t_9'$, the magneto-optical disk cartridge 63, which has been contained in the cartridge holder 74, starts being removed therefrom, while the shutter 72 is being closed. After the shutter 72 has been completely closed at the time $t_{10}'$, the magneto-optical disk cartridge 63 is ejected from the device.

In the above-mentioned first through eleventh embodiments, explanation has been made of the raising and lowering operations of the floating-type magnetic head 15; however, these arrangements may be widely adapted to the raising and lowering operations of a floating-type head such as a floating-type optical head that is provided with an optical lens.

Moreover, explanation has been made of the magnetic disk device and magneto-optical disk device which are capable of recording and reproducing, as examples of information reproducing apparatus; however, the present invention is applicable to laser disk devices such as compact disk devices that are used only for reproduction. Further, the present invention is also applicable to information recording apparatuses and information recording-reproduction apparatuses wherein a phase-change type recording medium, a recording medium made of photochromic material or a perforated recording medium may be employed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information reproducing apparatus comprising:
   a rotative driving means for rotating a disc-shaped recording medium;
   a floating-type head for reproducing information recorded in the recording medium while floating above the disc-shaped recording medium that is being rotated by the rotative driving means; and
   a suspension, made of an elastic member, for supporting the floating-type head,
   wherein the floating-type head comprises a slider which is floated by an air flow that is directed near the surface of the rotating disc-shaped recording medium, the slider being comprised of a bevelled portion at one side that faces the outer edge of the disc-shaped recording medium in such a manner that the slider is virtually free from contacting a ridge that exists along the outer edge area of the disc-shaped recording medium.

2. The information reproducing apparatus as set forth in claim 1, wherein:
   the bevelled portion is provided by chamfering an edge of the slider from the bottom surface that is opposite to the disc-shaped recording medium to the side face that faces the outer edge of the disc-shaped recording medium.

3. The information reproducing apparatus as set forth in claim 1, wherein:
   the bevelled portion is formed by removing a corner of the slider in a straight line, the corner being located between a front face of the slider, when seen from the rotation direction of the disc-shaped recording medium, and a side face of the slider that faces the outer edge of the disc-shaped recording medium.

4. The information reproducing apparatus as set forth in claim 1, wherein:
   the bevelled portion is formed by removing of the slider in a rounded line, the corner being located between a front face of the slider, when seen from the rotation direction of the disc-shaped recording medium, and a side face thereof, facing the outer edge of the disc-shaped recording medium.

5. The information reproducing apparatus as set forth in claim 1, further comprising:
   a raising and lowering means for moving the floating-type head away from the disc-shaped recording medium when the rotation of the disc-shaped recording medium is stopped and for allowing the floating-type head to approach a floating height above the disc-shaped recording medium when the disc-shaped recording medium is rotated.

6. The information reproducing apparatus as set forth in claim 5, further comprising:
   a control means for controlling the raising and lowering means in such a manner that the lowering speed at which the floating-type head is brought to the floating height above the disc-shaped recording medium is kept slower than a raising speed at which the floating-type head is moved away from the disc-shaped recording medium.

7. The information reproducing apparatus as set forth in claim 6, wherein:
   an elastic member is provided as the control means for applying a force in such a direction as to move the floating-type head away from the disc-shaped recording medium.

8. The information reproducing apparatus as set forth in claim 5, wherein:

the raising and lowering means has a lever that is raised and lowered while contacting the suspension, the lever being adapted so that it can elastically deflect the suspension such that raising and lowering operations of the floating-type head are executed.

9. The information reproducing apparatus as set forth in claim 8, wherein:

the lever contacts the suspension at one point, which is set to be a position that deviates from the center line of the suspension toward the air-inflow side of the slider, such that the slider is raised and lowered in a position such that the distance between the air-inflow edge of the slider and the recording medium is greater than that between an air-outflow edge of the slider and the recording medium.

10. The information reproducing apparatus as set forth in claim 8, wherein:

the lever comprises an inclining linear support section such that the slider is raised and lowered in a position such that the distance between an air-inflow edge of the slider and the recording medium is greater than that between the air-outflow edge of the slider and the recording medium.

11. The information reproducing apparatus as set forth in claim 8, wherein:

one end of the suspension, not having the slider, is fixed in an inclined manner so that the slider is raised and lowered in a position wherein the distance between the air-inflow edge of the slider and the recording medium is greater than that between the air-outflow edge of the slider and the recording medium.

12. The information reproducing apparatus as set forth in claim 1, wherein:

the floating-type head is a floating-type magnetic head whose slider is provided with a magnetic head.

13. The information reproducing apparatus as set forth in claim 1, wherein:

the floating-type head is a floating-type magnetic head whose slider is provided with an objective lens for directing a light beam onto the disc-shaped recording medium.

14. The information reproducing apparatus as set forth in claim 5, wherein:

the suspension is provided thereon with a light reflective section for detecting the inclination of the suspension during a position adjusting process of the slider, whereby the inclination of the suspension can be detected by applying light onto the reflective section and by receiving a light beam reflected off from the reflective section.

15. The information reproducing apparatus as set forth in claim 5, further comprising:

a control means for controlling the rotative driving means so as to stop the disc-shaped recording medium after the floating-type head has been moved away from the disc-shaped recording medium, and for controlling the raising and lowering means so as to move the floating-type head away from the disc-shaped recording medium when the rotating speed of the disc-shaped recording medium is reduced to not more than a predetermined value.

16. The information reproducing apparatus as set forth in claim 5, wherein:

raising and lowering operations of the floating-type head, which are executed by the raising and lowering means, are set to be performed near the outer edge of the disc-shaped recording medium, where a greater floating power can be obtained by an air flow.

* * * * *